(12) United States Patent  
Perdices-Gonzalez et al.

(10) Patent No.: US 10,554,962 B2  
(45) Date of Patent: Feb. 4, 2020

(54) MULTI-LAYER HIGH TRANSPARENCY DISPLAY FOR LIGHT FIELD GENERATION

(71) Applicant: Samsung Electronics Co., Ltd., Gyeonggi-Do (KR)

(72) Inventors: Sergio Perdices-Gonzalez, Milpitas, CA (US); Sajid Sadi, San Jose, CA (US); Ernest Rehmatulla Post, San Francisco, CA (US)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 42 days.

(21) Appl. No.: 15/649,587

(22) Filed: Jul. 13, 2017

(65) Prior Publication Data

US 2017/0310956 A1    Oct. 26, 2017

Related U.S. Application Data

(63) Continuation-in-part of application No. 15/629,091, filed on Jun. 21, 2017, which is a continuation-in-part of application No. 14/614,261, filed on Feb. 4, 2015.

(Continued)

(51) Int. Cl.
*H04N 13/398* (2018.01)
*G09G 3/3225* (2016.01)

(Continued)

(52) U.S. Cl.
CPC ....... *H04N 13/398* (2018.05); *G02B 27/2214* (2013.01); *G09G 3/003* (2013.01);

(Continued)

(58) Field of Classification Search
USPC ............................................................ 345/5
See application file for complete search history.

(56) References Cited

U.S. PATENT DOCUMENTS 6,252,707 B1    6/2001  Kleinberger et al.
6,377,321 B1 *  4/2002  Khan ................. G02F 1/13473
                                                       349/176

(Continued)

FOREIGN PATENT DOCUMENTS

CN    102498511 A    6/2012
CN    102665819 A    9/2012

(Continued)

OTHER PUBLICATIONS

US 10,347,169 B2, 07/2019, Perdices-Gonzalez et al. (withdrawn)

(Continued)

*Primary Examiner* — Chineyere D Wills-Burns
(74) *Attorney, Agent, or Firm* — Cuenot, Forsythe & Kim, LLC

(57) ABSTRACT

A display device can include a first display configured to produce an image and a plurality of transparent displays. Each of the plurality of transparent displays can be configured to produce a slice of the image to provide depth and a three-dimensional effect to the image, or at least one of the plurality of transparent displays can be configured to block, diffuse, or scatter light associated with the image produced by the first display so that different ones of a plurality of users see different content derived from the image produced by the first display. Each of the transparent displays can be substantially transparent. Further, at least one of the plurality of transparent displays can be made using Smectic A liquid crystals.

34 Claims, 41 Drawing Sheets

Related U.S. Application Data

(60) Provisional application No. 62/362,525, filed on Jul. 14, 2016, provisional application No. 62/362,527, filed on Jul. 14, 2016, provisional application No. 62/362,533, filed on Jul. 14, 2016, provisional application No. 62/362,536, filed on Jul. 14, 2016, provisional application No. 62/352,981, filed on Jun. 21, 2016, provisional application No. 62/039,880, filed on Aug. 20, 2014, provisional application No. 61/955,033, filed on Mar. 18, 2014, provisional application No. 61/937,062, filed on Feb. 7, 2014.

(51) Int. Cl.

| | |
|---|---|
| *G09G 3/32* | (2016.01) |
| *G09G 3/34* | (2006.01) |
| *G09G 3/20* | (2006.01) |
| *H04N 13/31* | (2018.01) |
| *H04N 13/366* | (2018.01) |
| *G09G 3/36* | (2006.01) |
| *G09G 3/3208* | (2016.01) |
| *H04N 13/363* | (2018.01) |
| *H04N 13/324* | (2018.01) |
| *G09G 3/00* | (2006.01) |
| *G02B 27/22* | (2018.01) |

(52) U.S. Cl.
CPC .......... *G09G 3/2092* (2013.01); *G09G 3/32* (2013.01); *G09G 3/3208* (2013.01); *G09G 3/3225* (2013.01); *G09G 3/348* (2013.01); *G09G 3/36* (2013.01); *H04N 13/31* (2018.05); *H04N 13/366* (2018.05); *G09G 3/002* (2013.01); *G09G 3/2003* (2013.01); *G09G 3/3446* (2013.01); *G09G 2300/023* (2013.01); *G09G 2300/0452* (2013.01); *G09G 2300/0456* (2013.01); *G09G 2320/066* (2013.01); *G09G 2320/0626* (2013.01); *G09G 2320/0666* (2013.01); *G09G 2320/0673* (2013.01); *G09G 2330/021* (2013.01); *G09G 2354/00* (2013.01); *G09G 2360/144* (2013.01); *H04N 13/324* (2018.05); *H04N 13/363* (2018.05)

(56) References Cited

U.S. PATENT DOCUMENTS

| | | | |
|---|---|---|---|
| 6,527,395 | B1 | 3/2003 | Raskar et al. |
| 6,757,039 | B2 | 6/2004 | Ma |
| 6,906,762 | B1 | 6/2005 | Witehira et al. |
| 7,956,820 | B2 | 6/2011 | Huitema |
| 7,999,759 | B2 | 8/2011 | Selbrede |
| 8,063,855 | B2 | 11/2011 | Takahara et al. |
| 8,089,686 | B2 | 1/2012 | Addington |
| 8,104,895 | B2 | 1/2012 | Quach |
| 8,675,273 | B2 | 3/2014 | Yang |
| 8,687,132 | B2 | 4/2014 | Nakayama |
| 8,730,278 | B2 | 5/2014 | Yamakita |
| 8,804,053 | B2 | 8/2014 | Kim |
| 8,890,771 | B2 | 11/2014 | Pance |
| 8,941,691 | B2 | 1/2015 | Baron |
| 9,000,459 | B2 | 4/2015 | Brown et al. |
| 9,013,403 | B2 | 4/2015 | Geisert et al. |
| 9,039,198 | B2 | 5/2015 | Drumm et al. |
| 9,087,801 | B2 | 7/2015 | Alvarez Rivera et al. |
| 9,148,636 | B1 | 9/2015 | Alhazme |
| 9,179,566 | B2 | 11/2015 | Kim et al. |
| 9,300,900 | B2 | 3/2016 | Allen et al. |
| 9,316,889 | B2 | 4/2016 | Baker |
| 9,349,780 | B2 | 5/2016 | Kim et al. |
| 9,354,470 | B2 | 5/2016 | Ash et al. |
| 9,366,899 | B2 | 6/2016 | Xu et al. |
| 9,373,290 | B2 | 6/2016 | Lee |
| 9,389,497 | B2 | 7/2016 | Yang |
| 9,405,768 | B2 | 8/2016 | Karasawa et al. |
| 9,437,131 | B2 | 9/2016 | Nagara |
| 9,454,241 | B2 | 9/2016 | Jesme et al. |
| 9,458,989 | B2 | 10/2016 | Hsu et al. |
| 9,495,936 | B1 | 11/2016 | Norquist |
| 9,530,381 | B1 | 12/2016 | Bozarth et al. |
| 10,170,030 | B2 | 1/2019 | Perdices-Gonzalez et al. |
| 10,375,365 | B2 | 8/2019 | Perdices-Gonzalez et al. |
| 2001/0040542 | A1* | 11/2001 | Harada ............... G02F 1/13473 345/87 |
| 2002/0122075 | A1 | 9/2002 | Karasawa et al. |
| 2003/0063370 | A1* | 4/2003 | Chen ................. G02F 1/133377 359/296 |
| 2003/0231162 | A1 | 12/2003 | Kishi |
| 2004/0135499 | A1 | 7/2004 | Cok |
| 2004/0145696 | A1 | 7/2004 | Oue et al. |
| 2004/0207569 | A1 | 10/2004 | Ho |
| 2004/0239613 | A1 | 12/2004 | Kishi |
| 2005/0094040 | A1* | 5/2005 | Wang ................ G02F 1/133621 349/19 |
| 2005/0146787 | A1* | 7/2005 | Lukyanitsa ........ G02B 27/2214 359/462 |
| 2006/0020469 | A1 | 1/2006 | Rast |
| 2006/0061530 | A1 | 3/2006 | Yuasa |
| 2006/0119568 | A1 | 6/2006 | Ikeda |
| 2007/0091432 | A1 | 4/2007 | Garner et al. |
| 2007/0127102 | A1 | 6/2007 | Obinata |
| 2007/0149281 | A1 | 6/2007 | Gadda et al. |
| 2008/0186265 | A1 | 8/2008 | Lee |
| 2008/0192013 | A1 | 8/2008 | Barrus et al. |
| 2008/0211734 | A1 | 9/2008 | Huitema |
| 2009/0111577 | A1* | 4/2009 | Mead ................. G07F 17/3211 463/31 |
| 2009/0190077 | A1* | 7/2009 | Lee ........................ C09K 19/02 349/130 |
| 2009/0243995 | A1 | 10/2009 | Kimura |
| 2009/0252485 | A1 | 10/2009 | Tsuchiya |
| 2010/0205667 | A1* | 8/2010 | Anderson ............... G06F 3/013 726/19 |
| 2010/0225986 | A1 | 9/2010 | Missbach |
| 2010/0328223 | A1 | 12/2010 | Mockarram-Dorri et al. |
| 2010/0328440 | A1 | 12/2010 | Willemsen |
| 2011/0000307 | A1 | 1/2011 | Jevons |
| 2011/0043435 | A1 | 2/2011 | Hebenstreit |
| 2011/0043549 | A1 | 2/2011 | Chestakov et al. |
| 2011/0043644 | A1 | 2/2011 | Munger et al. |
| 2011/0050545 | A1 | 3/2011 | Namm |
| 2011/0090192 | A1 | 4/2011 | Harris |
| 2011/0134205 | A1 | 6/2011 | Arney et al. |
| 2011/0157471 | A1 | 6/2011 | Seshadri et al. |
| 2011/0157680 | A1* | 6/2011 | Weng .................... G02F 1/167 359/296 |
| 2011/0163977 | A1 | 7/2011 | Barnhoefer |
| 2011/0164047 | A1* | 7/2011 | Pance ................... G06F 1/1647 345/581 |
| 2011/0169919 | A1 | 7/2011 | Karaoguz et al. |
| 2011/0175902 | A1* | 7/2011 | Mahowald ........... H04N 13/395 345/419 |
| 2011/0225366 | A1 | 9/2011 | Izadi |
| 2011/0249202 | A1 | 10/2011 | Park et al. |
| 2011/0267279 | A1 | 11/2011 | Alvarez Rivera et al. |
| 2011/0285609 | A1* | 11/2011 | Engel .................... B60K 35/00 345/4 |
| 2011/0291921 | A1 | 12/2011 | Hsiao et al. |
| 2012/0026082 | A1* | 2/2012 | Mizukoshi ............... G09G 3/20 345/156 |
| 2012/0038972 | A1 | 2/2012 | Gibson et al. |
| 2012/0060089 | A1 | 3/2012 | Heo et al. |
| 2012/0105306 | A1 | 5/2012 | Fleck |
| 2012/0105384 | A1 | 5/2012 | Clayton |
| 2012/0105482 | A1 | 5/2012 | Xu et al. |
| 2012/0140147 | A1 | 6/2012 | Satoh et al. |
| 2012/0153321 | A1* | 6/2012 | Chung ................. H01L 27/3276 257/91 |
| 2012/0188295 | A1 | 7/2012 | Joo |
| 2012/0194563 | A1 | 8/2012 | Liang et al. |

(56) References Cited

U.S. PATENT DOCUMENTS

| | | | |
|---|---|---|---|
| 2012/0229431 A1* | 9/2012 | Hiroki | G09F 19/14 345/204 |
| 2012/0249537 A1 | 10/2012 | Bae et al. | |
| 2012/0250949 A1 | 10/2012 | Abiko | |
| 2012/0314191 A1 | 12/2012 | Fujimori | |
| 2013/0009863 A1 | 1/2013 | Noda | |
| 2013/0057575 A1* | 3/2013 | An | H04N 13/356 345/619 |
| 2013/0093862 A1 | 4/2013 | Willemsen et al. | |
| 2013/0127842 A1 | 5/2013 | Lee et al. | |
| 2013/0128335 A1 | 5/2013 | Parry-Jones | |
| 2013/0155092 A1 | 6/2013 | Chuang | |
| 2013/0194167 A1 | 8/2013 | Yun et al. | |
| 2013/0194394 A1* | 8/2013 | Shintani | G02B 27/26 348/51 |
| 2013/0215365 A1 | 8/2013 | Huang et al. | |
| 2013/0242372 A1 | 9/2013 | Park et al. | |
| 2013/0249896 A1 | 9/2013 | Hamagishi | |
| 2013/0257708 A1 | 10/2013 | Wang | |
| 2013/0264728 A1 | 10/2013 | Myoung | |
| 2013/0265232 A1 | 10/2013 | Yun et al. | |
| 2013/0271445 A1* | 10/2013 | Park | G09G 5/003 345/212 |
| 2013/0285881 A1 | 10/2013 | Loo | |
| 2013/0300728 A1 | 11/2013 | Reichow et al. | |
| 2013/0314453 A1 | 11/2013 | Ko | |
| 2013/0314634 A1 | 11/2013 | Koo | |
| 2014/0009454 A1 | 1/2014 | Lee et al. | |
| 2014/0014915 A1 | 1/2014 | Koo | |
| 2014/0035942 A1 | 2/2014 | Yun et al. | |
| 2014/0184577 A1 | 7/2014 | Kim et al. | |
| 2014/0184758 A1 | 7/2014 | Lee et al. | |
| 2014/0185129 A1 | 7/2014 | Kim et al. | |
| 2014/0192281 A1* | 7/2014 | Smithwick | G02F 1/1313 349/15 |
| 2014/0253539 A1 | 9/2014 | Kline et al. | |
| 2014/0295970 A1* | 10/2014 | Gronkowski | G07F 17/3206 463/32 |
| 2014/0300830 A1 | 10/2014 | Wang | |
| 2015/0002769 A1 | 1/2015 | Kalyanasundaram | |
| 2015/0009189 A1 | 1/2015 | Nagara | |
| 2015/0058765 A1 | 2/2015 | Park et al. | |
| 2015/0062310 A1 | 3/2015 | Peng et al. | |
| 2015/0070276 A1 | 3/2015 | Pance | |
| 2015/0070748 A1 | 3/2015 | Ishino et al. | |
| 2015/0195502 A1 | 7/2015 | Sumi | |
| 2015/0228089 A1 | 8/2015 | Perdices-Gonzalez et al. | |
| 2015/0228217 A1 | 8/2015 | Perdices-Gonzalez et al. | |
| 2015/0355729 A1 | 10/2015 | Park et al. | |
| 2015/0323859 A1 | 11/2015 | Fujikawa et al. | |
| 2015/0325163 A1 | 11/2015 | Kobayashi | |
| 2015/0340655 A1 | 11/2015 | Lee et al. | |
| 2015/0349032 A1 | 12/2015 | Hack et al. | |
| 2015/0356938 A1 | 12/2015 | Yoshioka | |
| 2016/0005353 A1 | 1/2016 | Bennett | |
| 2016/0025991 A1 | 1/2016 | Johnson et al. | |
| 2016/0026039 A1 | 1/2016 | Sakai et al. | |
| 2016/0043156 A1 | 2/2016 | Ha et al. | |
| 2016/0065936 A1 | 3/2016 | Jang et al. | |
| 2016/0079319 A1 | 3/2016 | Lim et al. | |
| 2016/0197131 A1 | 7/2016 | Park et al. | |
| 2016/0204169 A1 | 7/2016 | Oh et al. | |
| 2016/0232856 A1 | 8/2016 | Hidaka | |
| 2016/0233278 A1 | 8/2016 | Yoon et al. | |
| 2016/0293894 A1 | 10/2016 | Cheng et al. | |
| 2017/0301288 A1 | 10/2017 | Perdices-Gonzalez et al. | |
| 2017/0309215 A1 | 10/2017 | Perdices-Gonzalez et al. | |
| 2017/0310940 A1 | 10/2017 | Perdices-Gonzalez et al. | |

FOREIGN PATENT DOCUMENTS

| | | |
|---|---|---|
| CN | 102763055 A | 10/2012 |
| CN | 103293754 A | 9/2013 |
| CN | 103376595 A | 10/2013 |
| EP | 1922607 A2 | 5/2008 |
| EP | 2541317 A2 | 1/2013 |
| EP | 2631949 A2 | 2/2013 |
| EP | 2669735 A1 | 12/2013 |
| EP | 2983040 A1 | 2/2016 |
| JP | 2006128241 | 5/2006 |
| JP | 2008102660 A | 5/2008 |
| JP | 2013156635 A | 8/2013 |
| KR | 20090110174 A | 10/2009 |
| KR | 20110113273 A | 10/2011 |
| KR | 20120010683 A | 2/2012 |
| KR | 20120049018 A | 5/2012 |
| KR | 20120120799 A | 11/2012 |
| KR | 20150141295 A | 12/2015 |
| WO | 2006000945 A1 | 1/2006 |
| WO | 2007030682 A2 | 3/2007 |
| WO | 2008020390 A2 | 2/2008 |
| WO | 2012004922 A1 | 1/2012 |
| WO | 2015097468 A1 | 7/2015 |
| WO | 2015119451 A1 | 8/2015 |
| WO | 2015119453 A1 | 8/2015 |
| WO | 2016020809 A1 | 2/2016 |
| WO | 2017107537 A1 | 6/2017 |

OTHER PUBLICATIONS

Hirsch, M. et al., "Build your own 3D display," In ACM SIGGRAPH ASIA 2010 Courses, 171 pg., Dec. 17, 2010.

Peterka, T. et al., "Advances in the dynallax solid-state dynamic parallax barrier autostereoscopic visualization display system." In IEEE Transactions on Visualization and Computer Graphics, vol. 14, No. 3, May 2008, pp. 487-499.

Wetzstein, G., et al., "Layered 3D: tomographic image synthesis for attenuation-based light field and high dynamic range displays," In ACM Transactions on Graphics (ToG), Aug. 2011, vol. 30, No. 4, Art. 95, 12 pg.

Lanman, D. et al., "Beyond parallax barriers: applying formal optimization methods to multilayer automultiscopic displays," SPIE—International Society for Optical Engineering, 2012, 14 pg.

Lanman, D. et al., "Content-adaptive parallax barriers: optimizing dual-layer 3D displays using low-rank light field factorization," ACM Transactions on Graphics (TOG) vol. 29, No. 6, Art. 163, 2010, 10 pg.

Perlin, K. et al., "An autostereoscopic display," In ACM Proceedings of the 27th Annual Conference on Computer Graphics and Interactive Techniques, Jul. 2000, pp. 319-326.

Wetzstein, G., "Computational 3D displays," in Classical Optics 2014, OSA Technical Digest, Optical Society of America, 2014, paper CM4C.1, Abstract only.

U.S. Appl. No. 14/614,261, Non-Final Office Action, dated Aug. 26, 2016, 40 pg.

U.S. Appl. No. 14/614,261, Final Office Action, dated Feb. 24, 2017, 30 pg.

U.S. Appl. No. 14/614,261, Non-Final Office Action, dated Jun. 23, 2017, 28 pg.

U.S. Appl. No. 14/681,280, Restriction Requirement, dated Feb. 1, 2017, 6 pg.

U.S. Appl. No. 14/681,280, Non-Final Office Action, dated Apr. 18, 2017, 19 pg.

U.S. Appl. No. 14/614,261, Final Office Action, dated Nov. 16, 2017, 32 pg.

U.S. Appl. No. 14/681,280, Non-Final Office Action, dated Nov. 24, 2017, 14 pg.

Li, K. et al., "Uniform and Fast Switching of Window-Size Smectic A Liquid Crystal Panels Utilising the Field Gradient Generated at the Fringes of Patterned Electrodes," In Liquid Crystals, vol. 43, No. 6, pp. 735-748.

WIPO Appln. No. PCT/KR2017/006521, International Search Report and Written Opinion, dated Sep. 27, 2017, 16 pg.

WIPO Appln. No. PCT/KR2017/007580, International Search Report and Written Opinion, dated Oct. 20, 2017, 13 pg.

WIPO Appln. No. PCT/KR2017/007572, International Search Report and Written Opinion, dated Oct. 19, 2017, 11 pg.

(56) References Cited

OTHER PUBLICATIONS

WIPO Appln. No. PCT/KR2017/00007574, International Search Report and Written Opinion, dated Oct. 26, 2017, 12 pg.
U.S. Appl. No. 14/614,280, Non-Final Office Action, dated Sep. 21, 2018, 14 pg.
CN Appln. 201580016728.6, Office Action, dated Jul. 23, 2018, 11 pg, [not translated].
"Proportional," Merriam-Webster Online Dictionary, definition, Wayback Machine, retrieved from the Inernet: <https://web.archive.org/web/20130517220714/www.merriam-webster.c.>, 2 pg.
U.S. Appl. No. 14/614,261, Non-Final Office Action, dated Mar. 7, 2018, 30 pg.
U.S. Appl. No. 14/614,261, Notice of Allowance, dated Aug. 27, 2018, 8 pg.
U.S. Appl. No. 14/614,280, Final Office Action, dated Apr. 2, 2018, 19 pg.
U.S. Appl. No. 15/649,561, Non-Final Office Action, dated Jun. 26, 2018, 34 pg.
U.S. Appl. No. 15/629,091, Non-Final Office Action, dated Jun. 1, 2018, 44 pg.
EP Appln. 15746493.4, Extended European Search Report, dated Sep. 19, 2017, 9 pg.
EP Appln. 15746493.4, Communication Pursuant to Article 94(3) EPC, dated Apr. 16, 2018, 5 pg.
U.S. Appl. No. 14/681,280, Final Office Action, dated Aug. 2, 2017, 2017, 15 pg.
EP Appln. No. EP15746106.2, Extended European Search Report, dated May 29, 2017, 10 pg.
U.S. Appl. No. 15/629,091, Final Office Action, dated Nov. 9, 2018, 42 pg.
U.S. Appl. No. 15/649,561, Final Office Action, dated Nov. 27, 2018, 31 pg.
U.S. Appl. No. 15/649,561, Advisory Action, dated Feb. 7, 2019, 6 pg.
U.S. Appl. No. 15/649,561, Non-Final Office Action, dated Nov. 29, 2018, 36 pg.
EPO Appln. 15746493.4, Communication Pursuant to Article 94(3) EPC, dated Nov. 5, 2018, 5 pg.
CN Appln. 201580012583.2, Office Action and Translation, dated Nov. 6, 2018, 30 pg.
U.S. Appl. No. 15/629,091, Final Office Action, dated Mar. 28, 2019, 39 pg.
U.S. Appl. No. 15/629,091, Advisory Action, dated Jun. 7, 2019, 7 pg.
U.S. Appl. No. 15/649,561, Notice of Allowance, dated Mar. 27, 2019, 9 pg.
U.S. Appl. No. 15/649,561, Corrected Notice of Allowance, dated May 9, 2019, 2 pg.
U.S. Appl. No. 15/649,576, Final Office Action, dated Mar. 29, 2019, 43 pg.
U.S. Appl. No. 15/649,576, Notice of Allowance, dated Jun. 10, 2019, 9 pg.
U.S. Appl. No. 14/614,280, Notice of Allowance, dated Feb. 28, 2019, 9 pg.
EP Appln. No. EP17815711.1 Extended European Search Report, dated Apr. 8, 2019, 12 pg.
EP Appln. No. EP17827999.8 Extended European Search Report, dated May 31, 2019, 12 pg.
EP Appln. No. EP17827996.4 Extended European Search Report, dated May 31, 2019, 13 pg.
CN Appln. 201580016728.6, 2d Office Action, dated Apr. 4, 2019, 20 pg. [Translated].
U.S. Appl. No. 15/629,091, Non-Final Office Action, dated Aug. 7, 2019, 32 Pg.
Collings, N. et al., "Evolutionary Development of Advanced Liquid Crystal Spatial Light Modulators," Applied Optics, Optical Society of America, Washington, DC., vol. 28, No. 22, Nov. 15, 1989, 8 pg.
Crossland, W.A. et al., "Liquid Crystal Spatial Light Modulators for Optical Interconnects and Space Switching," In IEE Colloquium on Optical Connection and Switching Networks for Communication and Computing, IET, May 14, 1990, 4 pg.
Clark, N.A. et al., "Modulators, Linear Arrays, and Matrix Arrays Using Ferroelectric Liquid Crystals," Proc. of the Society of Information Display, Playa Del Rey, CA, vol. 26, No. 2, Jan. 1, 1985, pp. 133-139.
EPO Appln. No. EP17827997.2, Extended European Search Report, dated Jun. 26, 2019, 20 pg.
CN Appln. 201580016728.6, Rejection Decision and Translation, dated Jul. 7, 2008, 19 pg.

* cited by examiner

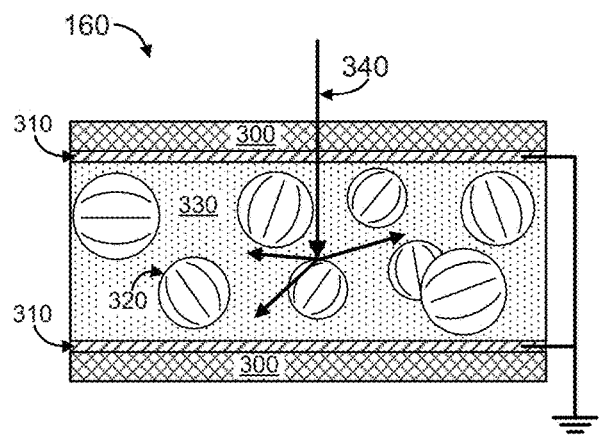 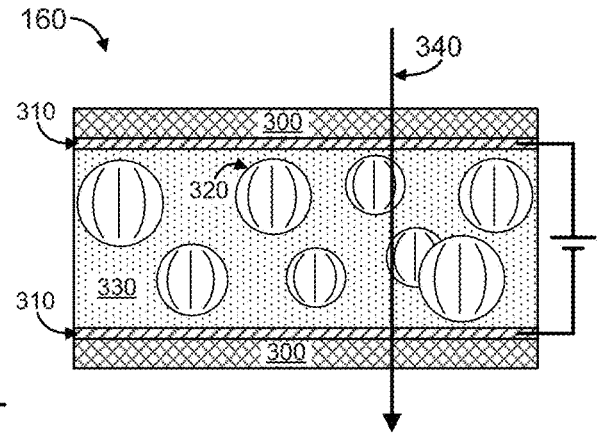
*Fig. 24A*  *Fig. 24B*
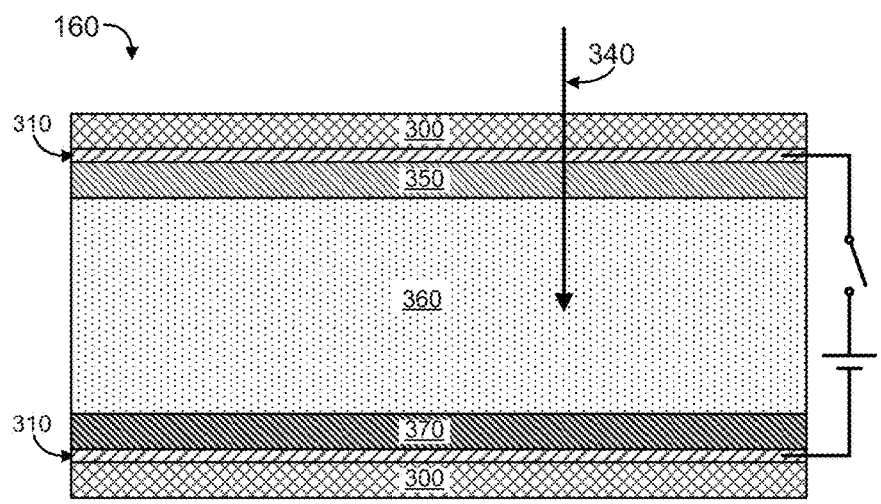
*Fig. 25*

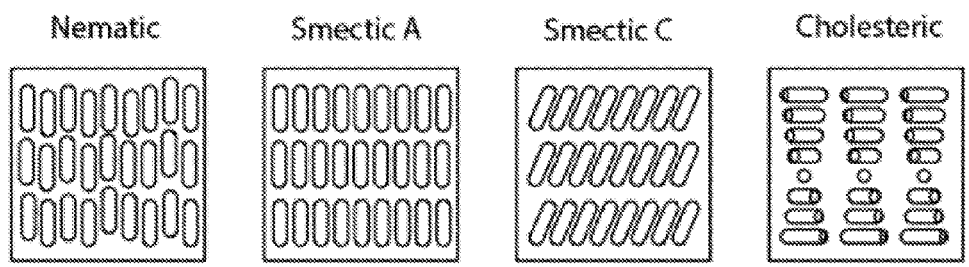
*Fig. 35A*   *Fig. 35B*   *Fig. 35C*   *Fig. 35D*
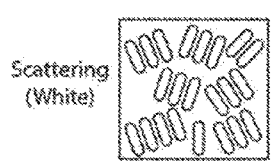 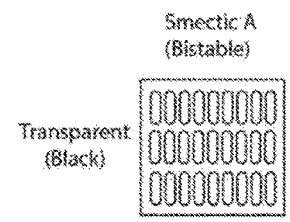
*Fig. 36A*
*Fig. 36B*

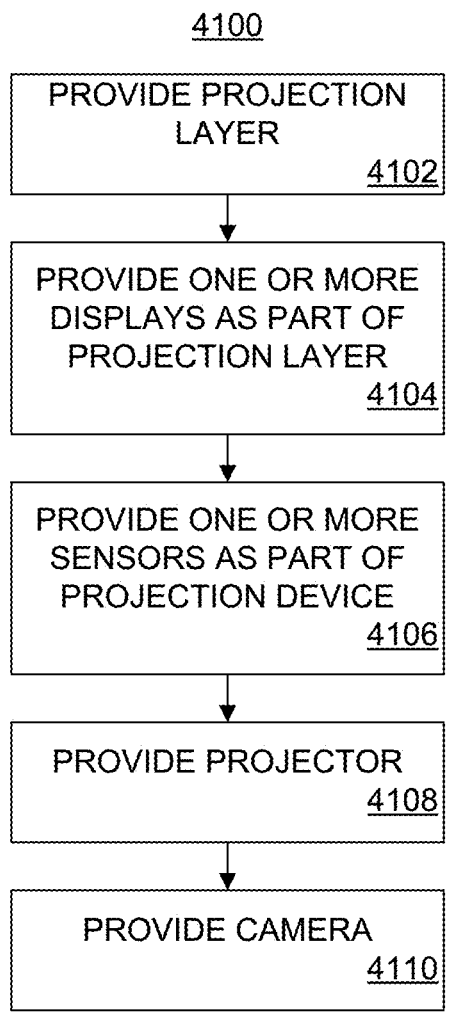
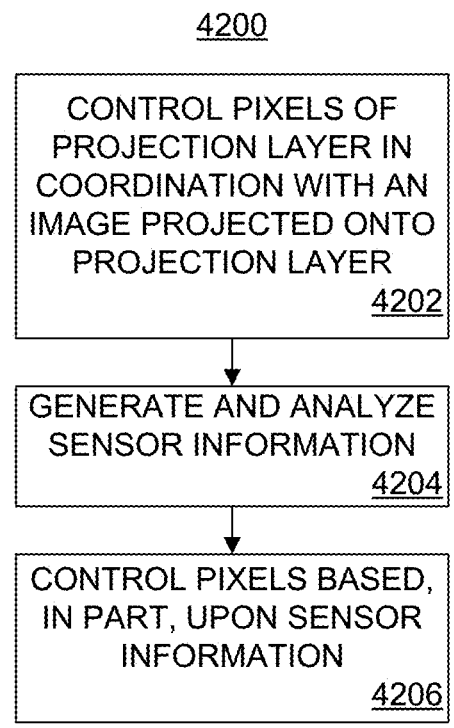
Fig. 41
Fig. 42

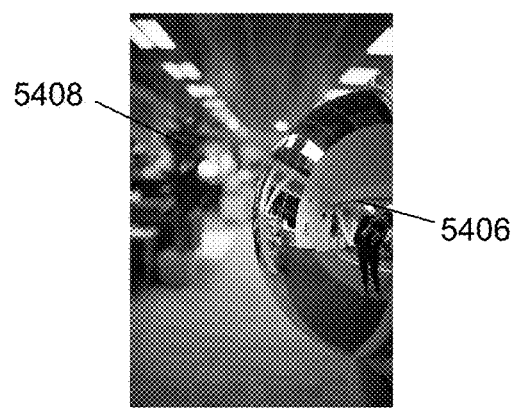
*Fig. 54C*
*Fig. 54D*
*Fig. 54E*
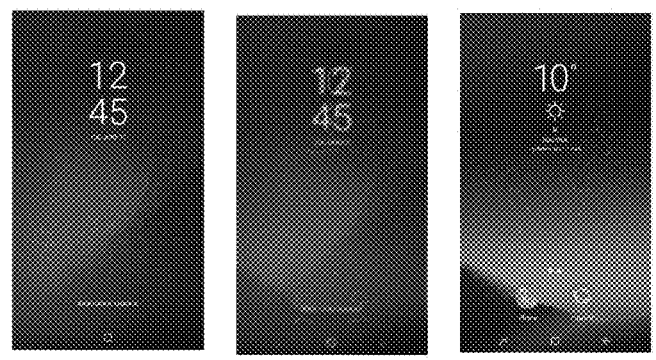
*Fig. 54F*  *Fig. 54G*  *Fig. 54H*

5420
5424
5422

5432

TICKER TAPE 5430

MULTI-LAYER HIGH TRANSPARENCY DISPLAY FOR LIGHT FIELD GENERATION

CROSS-REFERENCE TO RELATED APPLICATIONS

This application claims the benefit of U.S. Provisional Patent Application No. 62/362,525 filed on Jul. 14, 2016, which is incorporated herein by reference; U.S. Provisional Patent Application No. 62/362,527 filed on Jul. 14, 2016, which is incorporated herein by reference; U.S. Provisional Patent Application No. 62/362,533 filed on Jul. 14, 2016, which is incorporated herein by reference; and U.S. Provisional Patent Application No. 62/362,536 filed on Jul. 14, 2016, which is incorporated herein by reference.

This application is also a continuation-in-part of U.S. patent application Ser. No. 15/629,091 filed Jun. 21, 2017, which is incorporated herein by reference and which was filed as a continuation-in-part of U.S. patent application Ser. No. 14/614,261 filed Feb. 4, 2015, which is incorporated herein by reference and which claims priority to U.S. Provisional Patent Application No. 61/937,062 filed Feb. 7, 2014, which is incorporated herein by reference; U.S. Provisional Patent Application No. 61/955,033 filed Mar. 18, 2014, which is incorporated herein by reference; and U.S. Provisional Patent Application No. 62/039,880 filed Aug. 20, 2014, which is incorporated herein by reference.

U.S. patent application Ser. No. 15/629,091, which was filed Jun. 21, 2017, also claims the benefit of U.S. Provisional Patent Application No. 62/352,981 filed on Jun. 21, 2016, which is incorporated herein by reference; U.S. Provisional Patent Application No. 62/362,525 filed on Jul. 14, 2016, which is incorporated herein by reference; U.S. Provisional Patent Application No. 62/362,527 filed on Jul. 14, 2016, which is incorporated herein by reference; U.S. Provisional Patent Application No. 62/362,533 filed on Jul. 14, 2016, which is incorporated herein by reference; and U.S. Provisional Patent Application No. 62/362,536 filed on Jul. 14, 2016, which is incorporated herein by reference.

TECHNICAL FIELD

This disclosure relates generally to electronic displays.

BACKGROUND

There are a number of different types of electronic visual displays, such as for example, liquid-crystal displays (LCDs), light-emitting diode (LED) displays, organic light-emitting diode (OLED) displays, polymer-dispersed liquid-crystal displays, electrochromic displays, electrophoretic displays, and electrowetting displays. Some displays are configured to reproduce color images or video at particular frame rates, while other displays may show static or semi-static content in color or black and white. A display may be provided as part of a desktop computer, laptop computer, tablet computer, personal digital assistant (PDA), smartphone, wearable device (e.g., smartwatch), satellite navigation device, portable media player, portable game console, digital signage, billboard, kiosk computer, point-of-sale device, or other suitable device. A control panel or status screen in an automobile or on a household or other appliance may include a display. Displays may include a touch sensor that may detect the presence or location of a touch or an object (e.g., a user's finger or a stylus) within a touch-sensitive area of the touch sensor. A touch sensor may enable a user to interact directly with what is displayed on a display.

SUMMARY

One or more embodiments are directed to a display device. In an aspect, a display device can include a first display configured to produce an image and a plurality of transparent displays. Each of the plurality of transparent displays can be configured to produce a slice of the image to provide depth and a three-dimensional effect to the image, or at least one of the plurality of transparent displays can be configured to block, diffuse, or scatter light associated with the image produced by the first display so that different ones of a plurality of users see different content derived from the image produced by the first display. Each of the transparent displays can be substantially transparent. Each of the transparent displays can be substantially transparent. Further, at least one of the plurality of transparent displays can be made using Smectic A liquid crystals.

One or more embodiments are directed to a method. In an aspect, a method can include providing a first display configured to produce an image and providing a plurality of transparent displays. Each of the plurality of transparent displays can be configured to produce a slice of the image to provide depth and a three-dimensional effect to the image, or at least one of the plurality of transparent displays can be configured to block, diffuse, or scatter light associated with the image produced by the first display so that different ones of a plurality of users see different content derived from the image produced by the first display. Each of the transparent displays can be substantially transparent. At least one of the plurality of transparent displays can be made using Smectic A liquid crystals.

One or more other embodiments are directed to a method. In an aspect, a method can include displaying an image using a first display. The method can also include displaying the image by generating a slice of the image on each of a plurality of transparent displays to provide depth and a three-dimensional effect to the image, or blocking, diffusing, or scattering light associated with the image produced by the first display using at least one of the plurality of transparent displays so that different ones of a plurality of users see different content derived from the image produced by the first display. Each of the plurality of transparent displays can be substantially transparent. At least one of the plurality of transparent displays can be made using Smectic A liquid crystals.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIGS. 24A-24B each illustrate a side view of an example polymer-dispersed liquid-crystal (PDLC) pixel.

FIG. 25 illustrates a side view of an example electrochromic pixel.

FIG. 35A-35D each illustrates example liquid crystals.

FIG. 36A-36B illustrate example Smectic A liquid crystals in scattering and transparent states, respectively.

FIG. 41 illustrates an example method of implementing a projection system.

FIG. 42 illustrates an example method of operation for a projection device.

FIGS. 54A-54L illustrate examples of visual effects implemented by the example displays of FIGS. 50-53.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

Figure 1:
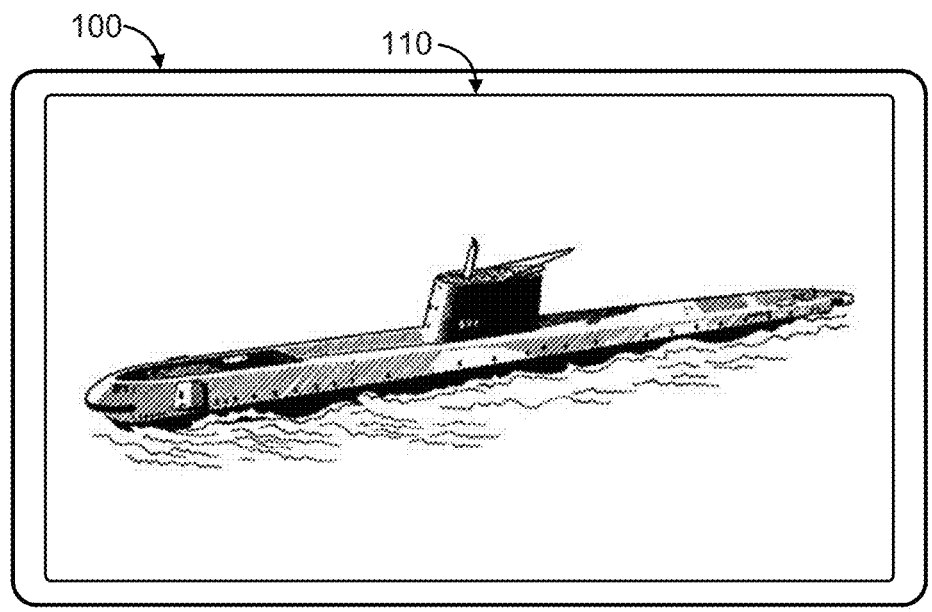
FIG. 1 illustrates an example display device with a display showing an image of a submarine.

FIG. 1 illustrates example display device 100 with display 110 showing an image of a submarine. As an example and not by way of limitation, display 110 in FIG. 1 may be showing a movie in color with high-definition video at a frame rate of 30 frames per second (FPS). In particular embodiments, display device 100 may be configured to operate as an e-book reader, global positioning system (GPS) device, camera, personal digital assistant (PDA), computer monitor, television, video screen, conference-room display, large-format display (e.g., information sign or billboard), handheld electronic device, mobile device (e.g., cellular telephone or smartphone), tablet device, wearable device (e.g., smartwatch), head-mountable display (e.g., virtual reality headset, augmented reality headset, or the like), electronic window (e.g., a window having electronically controlled opacity or graphics), electronic display system, other suitable electronic device, or any suitable combination thereof. In particular embodiments, display device 100 may include electronic visual display 110, which may be referred to as a display screen or as display 110. In particular embodiments, display device 100 may include a power source (e.g., a battery), a wireless device for sending or receiving information using a wireless communication protocol (e.g., BLUETOOTH, WI-FI, or cellular), a processor, a computer system, a touch sensor, a display controller for controlling display 110, or any other suitable device or component. As an example and not by way of limitation, display device 100 may include display 110 and a touch sensor that allows a user to interact with what is displayed on display 110 using a stylus or the user's finger. In particular embodiments, display device 100 may include a device body, such as for example an enclosure, chassis, or case that holds or contains one or more components or parts of display device 100. As an example and not by way of limitation, display 110 may include a front and rear display (as described below), and the front and rear displays (as well as other devices) may each be coupled (e.g., mechanically affixed, connected, or attached, such as for example with epoxy or with one or more mechanical fasteners) to a device body of display device 100.

In particular embodiments, display 110 may include any suitable type of display, such as for example, a liquid-crystal display (LCD) in any of its phases (e.g., nematic (which can be used also as twisted nematic (TN), super twisted nematic (STN), etc.), Smectic A (SmA), Smectic B (SmB), Smectic C (SmC), or Cholesteric), light-emitting diode (LED) display, organic light-emitting diode (OLED) display, quantum dot display (QD), polymer-dispersed liquid-crystal (PDLC) display, electrochromic display, electrophoretic display, electro-dispersive display, or electrowetting display.

Examples of a liquid crystal (LC) nematic includes LC material including calamitic shaped (e.g., rod shaped) molecules that can be oriented one-dimensionally. For example, the calamitic molecules may self-align to have long-range directional order with their long axes roughly parallel. Applying an electrical field to the LC material can control of the molecular orientation. Additionally, the calamitic molecules may have weak or even lack positional order.

A liquid crystal display of a TN system is fabricated from a nematic liquid crystal, wherein the nematic LC molecules are precisely twisted (e.g., helix) in a first state so as to polarize light passing through the LC material. In an example, the TN LC has a 90 degree twisted structure. In a second state, an applied electric field reconfigures the nematic LC molecules to align with the electric field. In this configuration, the LC material does not change the polarization of light passed through the LC material.

A liquid crystal display of a STN system is similar to a TN system. However, the nematic LC molecules of the STN system are precisely twisted from about 180 degrees to about 270 degrees.

Examples of a liquid crystal (LC) smectic include LC material that has positional order along one direction thereby having defined layers. The LC material can be liquid-like within the layers. SmA LC, for example, has molecules oriented along the layer normal. Applying an electrical field to the LC material can control the molecular orientation. It will be appreciated that there are different smectic phases, each having a position and an orientation order.

Examples of nematic and smectic liquid crystals include biphenyls and analogs, such as, but not limited to, one or more of the following materials: Chemical Abstracts Service (CAS) Number: 61204-01-1 (4-(trans-4-Amylcyclohexyl)benzonitrile); CAS Number: 68065-81-6 (4'-(trans-4-Amylcyclohexyl)biphenyl-4-carbonitrile); CAS Number: 52709-87-2 (4-Butoxy-4'-cyanobiphenyl); CAS Number: 52709-83-8 (4-Butyl-4'-cyanobiphenyl); CAS Number: 61204-00-0 (4-(trans-4-Butylcyclohexyl)benzonitrile); CAS Number: 82832-58-4 (trans,trans-4'-Butyl-4-(3,4-difluorophenyl)bicyclohexyl); CAS Number: 40817-08-1 (4-Cyano-4'-pentylbiphenyl); CAS Number: 52364-71-3 (4-Cyano-4'-pentyloxybiphenyl); CAS Number: 52364-72-4 (4-Cyano-4'-heptyloxybiphenyl); CAS Number: 52364-73-5 (4-Cyano-4'-n-octyloxybiphenyl); CAS Number: 54211-46-0 (4-Cyano-4"-pentyl-p-terphenyl); CAS Number: 52709-86-1 (4-Cyano-4'-propoxy-1,1'-biphenyl; CAS Number: 63799-11-1 ((S)-4-Cyano-4'-(2-methylbutyl)biphenyl)); CAS Number: 58743-78-5 (4-Cyano-4'-ethoxybiphenyl); CAS Number: 41424-11-7 (4'-Cyano-4-hexyloxybiphenyl); CAS Number: 52709-84-9 (4-Cyano-4'-n-octylbiphenyl); CAS Number: 57125-49-2 (4-Cyano-4'-dodecylbiphenyl); CAS Number: 52709-85-0 (4-Cyano-4'-nonylbiphenyl); CAS Number: 70247-25-5 (4'-Cyano-4-decyloxybiphenyl); CAS Number: 57125-50-5 (4'-Cyano-4-dodecyloxybiphenyl); CAS Number: 54296-25-2 (4-Cyano-4"-propyl-p-terphenyl); CAS Number: 58932-13-1 (4'-Cyano-4-nonyloxybiphenyl); CAS Number: 134412-17-2 (3,4-Difluoro-4'-(trans-4-pentylcyclohexyl)biphenyl); CAS Number: 85312-59-0 (3,4-Difluoro-4'-(trans-4-propylcyclohexyl)biphenyl); CAS Number: 82832-57-3 (trans,trans-4-(3,4-Difluorophenyl)-4'-propylbicyclohexyl); CAS Number: 118164-51-5 (trans,trans-4-(3,4-Difluorophenyl)-4'-pentylbicyclohexyl); CAS Number: 134412-18-3 (3,4-Difluoro-4'-(trans-4-ethylcyclohexyl)biphenyl); CAS Number: 1373116-00-7 (2,3-Difluoro-4-[(trans-4-propylcyclohexyl)methoxy]anisole); CAS Number: 139215-80-8 (trans,trans-4'-Ethyl-4-(3,4,5-trifluorophenyl)bicyclohexyl); CAS Number: 123560-48-5 (trans,trans-4-(4-Ethoxy-2,3-difluorophenyl)-4'-propylbicyclohexyl); CAS Number: 189750-98-9 (4-Ethoxy-2,3-difluoro-4'-(trans-4-propylcyclohexyl)biphenyl); CAS Number: 84540-37-4 (4-Ethyl-4'-(trans-4-propylcyclohexyl)biphenyl); CAS Number: 135734-59-7 (trans,trans-4'-Ethyl-4-(4-trifluoromethoxyphenyl)bicyclohexyl); CAS Number: 95759-51-6 (2'-Fluoro-4-pentyl-4"-propyl-1,1':4',1"-terphenyl); CAS Number: 41122-71-8 (4-Cyano-4'-heptylbiphenyl); CAS Number: 61203-99-4 (4-(trans-4-Propylcyclohexyl)benzonitrile); CAS Number: 154102-21-3 ((R)-1-Phenyl-1,2-ethanediyl Bis[4-(trans-4-pentylcyclohexyl)benzoate]); CAS Number: 131819-23-3 (trans,trans-4'-Propyl-4-(3,4,5-trifluorophenyl)bicyclohexyl); CAS Number: 137644-54-3 (trans,trans-4'-Pentyl-4-(3,4,5-trifluorophenyl)bicyclohexyl); CAS Number: 96184-40-6 (4-[trans-4-[(E)-1-Propenyl]cyclohexyl]benzonitrile); CAS Number: 132123-39-8 (3,4,5-Trifluoro-4'-(trans-4-propylcyclohexyl)biphenyl); CAS Number: 173837-35-9 (2%3,4,5-Tetrafluoro-4'-(trans-4-propylcyclohexyl)biphenyl); and CAS Number: 137529-41-0 (trans,trans-3,4,5-Trifluoro-4'-(4'-propylbicyclohexyl-4-yl)biphenyl).

Further examples of nematic and smectic liquid crystals include carbonates, such as, but not limited to, one or more of the following materials: CAS Number: 33926-46-4 (Amyl 4-(4-Ethoxyphenoxycarbonyl)phenyl Carbonate); and CAS Number: 33926-25-9 (4-(4-Ethoxyphenoxycarbonyl)phenyl Ethyl Carbonate).

Further examples of nematic and smectic liquid crystals include phenyl esters, such as, but not limited to, one or more of the following materials: CAS Number: 62716-65-8 (4-Ethoxyphenyl 4-Butylbenzoate); CAS Number: 38454-28-3 (4-(Hexyloxy)phenyl 4-Butylbenzoate); CAS Number: 42815-59-8 (4-n-Octyloxyphenyl 4-Butylbenzoate [Liquid Crystal]); CAS Number: 114482-57-4 (4-Cyanophenyl 4-(3-Butenyloxy)benzoate); CAS Number: 38690-76-5 (4-Cyanophenyl 4-Heptylbenzoate M2106 4-Methoxyphenyl 4-(3-Butenyloxy)benzoate); CAS Number: 133676-09-2 ((R)-2-Octyl 4-[4-(Hexyloxy)benzoyloxy]benzoate); CAS Number: 87321-20-8 ((S)-2-Octyl 4-[4-(Hexyl oxy)benzoyl oxy]benzoate); CAS Number: 51128-24-6 (4-Butoxyphenyl 4-Pentylbenzoate); CAS Number: 50802-52-3 (4-Hexyloxyphenyl 4-Pentylbenzoate); CAS Number: 50649-64-4 (4-n-Octyloxyphenyl 4-Pentylbenzoate); and CAS Number: 2512-56-3 (4-Octylphenyl Salicylate).

Further examples of nematic and smectic liquid crystals include schiff bases, such as, but not limited to, one or more of the following materials: CAS Number: 30633-94-4 (N-(4-Methoxy-2-hydroxybenzylidene)-4-butylaniline); CAS Number: 36405-17-1 (4'-Butoxybenzylidene-4-cyanoaniline); CAS Number: 37075-25-5 (4'-(Amyloxy)benzylidene-4-cyanoaniline); CAS Number: 16833-17-3 (Butyl 4-[(4-Methoxybenzylidene)amino]cinnamate); CAS Number: 17224-18-9 (N-(4-Butoxybenzylidene)-4-acetylaniline); CAS Number: 17696-60-5 (Terephthalbis(p-phenetidine)); CAS Number: 55873-21-7 (4'-Cyanobenzylidene-4-butoxyaniline); CAS Number: 34128-02-4 (4'-Cyanobenzylidene-4-ethoxyaniline); CAS Number: 24742-30-1 (4'-Ethoxybenzylidene-4-cyanoaniline); CAS Number: 17224-17-8 (N-(4-Ethoxybenzylidene)-4-acetylaniline); CAS Number: 29743-08-6 (4'-Ethoxybenzylidene-4-butylaniline); CAS Number: 35280-78-5 (4'-Hexyloxybenzylidene-4-cyanoaniline); CAS Number: 26227-73-6 (N-(4-Methoxybenzylidene)-4-butylaniline); CAS Number: 10484-13-6 (N-(4-Methoxybenzylidene)-4-acetoxyaniline); CAS Number: 836-41-9 (N-(4-Methoxybenzylidene)aniline); CAS Number: 6421-30-3 (Ethyl 4-[(4-Methoxybenzylidene)amino]cinnamate); CAS Number: 322413-12-7 (4-[(Methoxybenzylidene)amino]stilbene); and CAS Number: 13036-19-6 (4-[(4-Methoxybenzylidene)amino]benzonitrile).

Further examples of nematic and smectic liquid crystals include azoxybenzenes, such as, but not limited to, one or more of the following materials: CAS Number: 1562-94-3 (4,4'-Azoxydianisole); CAS Number: 4792-83-0 (4,4'-Azoxydiphenetole); CAS Number: 6421-04-1 (Diethyl Azoxybenzene-4,4'-dicarboxylate); CAS Number: 2312-14-3 (4,4'-Didodecyloxyazoxybenzene); CAS Number: 2587-42-0 (4,4'-Bis(hexyloxy)azoxybenzene); CAS Number: 19482-05-4 (4,4'-Diamyloxyazoxybenzene); CAS Number: 23315-55-1 (4,4'-Dipropoxyazoxybenzene); CAS Number: 23315-55-1 (4,4'-Dibutoxyazoxybenzene); CAS Number: 25729-12-8 (4,4'-Di-n-octyloxyazoxybenzene); and CAS Number: 25729-13-9 (4,4'-Dinonyloxyazoxybenzene).

Further examples of nematic and smectic liquid crystals include other chemical groups, such as, but not limited to, the following materials: Liquid Crystal, TK-LQ 2040 Electric effect type, Mesomorphic range: 20-40° C. [Nematic Liquid Crystal] from TCI AMERICA (Portland, Oreg.) as Product Number T0697; and Liquid Crystal, TK-LQ 3858 Electric effect type, Mesomorphic range: 38-58° C. [Nematic Liquid Crystal] from TCI AMERICA (Portland, Oreg.) as Product Number T0699.

Examples of cholesteric liquid crystals include cholesteryl compounds, such as, but not limited to, the following materials: CAS Number: 604-35-3 (Cholesterol Acetate); CAS Number: 604-32-0 (Cholesterol Benzoate); CAS Number: 604-33-1 Cholesterol Linoleate; CAS Number: 1182-42-9 (Cholesterol n-Octanoate); CAS Number: 303-43-5 (Cholesterol Oleate); CAS Number: 1183-04-6 (Cholesterol Decanoate); CAS Number: 1908-11-8 (Cholesterol Laurate); CAS Number: 4351-55-7 (Cholesterol Formate); CAS Number: 1510-21-0 (Cholesterol Hydrogen Succinate); CAS Number: 633-31-8 (Cholesterol Propionate); CAS Number: 6732-01-0 (Cholesterol Hydrogen Phthalate); CAS Number: 32832-01-2 (Cholesterol 2,4-Dichlorobenzoate); and CAS Number: 1182-66-7 (Cholesterol Pelargonate).

Examples of cholesteric liquid crystals include cholesteryl carbonates, such as, but not limited to, the following materials: CAS Number: 15455-83-1 (Cholesterol Nonyl Carbonate); CAS Number: 15455-81-9 (Cholesterol Heptyl Carbonate); CAS Number: 17110-51-9 (Cholesterol Oleyl Carbonate); CAS Number: 23836-43-3 (Cholesterol Ethyl Carbonate); CAS Number: 78916-25-3 (Cholesterol Isopropyl Carbonate); CAS Number: 41371-14-6 (Cholesterol Butyl Carbonate); CAS Number: 15455-79-5 (Cholesterol Amyl Carbonate); CAS Number: 15455-82-0 (Cholesterol n-Octyl Carbonate); and CAS Number: 15455-80-8 (Cholesterol Hexyl Carbonate).

Further examples of cholesteric liquid crystals include discotic liquid crystals, such as, but not limited to, the following materials: CAS Number: 70351-86-9 (2,3,6,7,10,11-Hexakis(hexyloxy)triphenylene); and CAS Number: 70351-87-0 (2,3,6,7,10,11-Hexakis[(n-octyl)oxy]triphenylene).

In particular embodiments, display 110 may include any suitable combination of two or more suitable types of displays. As an example and not by way of limitation, display 110 may include an LCD, OLED or QD display combined with an electrophoretic, electrowetting, or LC SmA display. In particular embodiments, display 110 may include an emissive display, where an emissive display includes emissive pixels that are configured to emit or modulate visible light. This disclosure contemplates any suitable type of emissive displays, such as for example, LCDs, LED displays, or OLED displays. In particular embodiments, display 110 may include a non-emissive display, where a non-emissive display includes non-emissive pixels that may be configured to absorb, transmit, or reflect ambient visible light. This disclosure contemplates any suitable type of non-emissive displays, such as for example, PDLC displays, LC SmA displays, electrochromic displays, electrophoretic displays, electro-dispersive displays, or electrowetting displays. In particular embodiments, a non-emissive display may include non-emissive pixels that may be configured to be substantially transparent (e.g., the pixels may transmit greater than 70%, 80%, 90%, 95%, or any suitable percentage of light incident on the display). A display with pixels that may be configured to be substantially transparent may be referred to as a display with high transparency or a high-transparency display. In particular embodiments, ambient light may refer to light originating from one or more sources located outside of display device 100, such as for example room light or sunlight. In particular embodiments, visible light (or, light) may refer to light that is visible to a human eye, such as for example light with a wavelength in the range of approximately 400 to 750 nanometers. Although this disclosure describes and illustrates particular displays having particular display types, this disclosure contemplates any suitable displays having any suitable display types.

In particular embodiments, display 110 may be configured to display any suitable information or media content, such as for example, digital images, video (e.g., a movie or a live video chat), websites, text (e.g., an e-book or a text message), or applications (e.g., a video game), or any suitable combination of media content. In particular embodiments, display 110 may display information in color, black and white, or a combination of color and black and white. In particular embodiments, display 110 may display information that changes frequently (e.g., a video with a frame rate of 30 or 60 FPS) or may display semi-static information that changes relatively infrequently (e.g., text or a digital image that may be updated approximately once per hour, once per minute, once per second, or any suitable update interval). As an example and not by way of limitation, one or more portions of display 110 may be configured to display a video in color, and one or more other portions of display 110 may be configured to display semi-static information in black and white (e.g., a clock that is updated once per second or once per minute). Although this disclosure describes and illustrates particular displays configured to display particular information in a particular manner, this disclosure contemplates any suitable displays configured to display any suitable information in any suitable manner.

Figure 2:
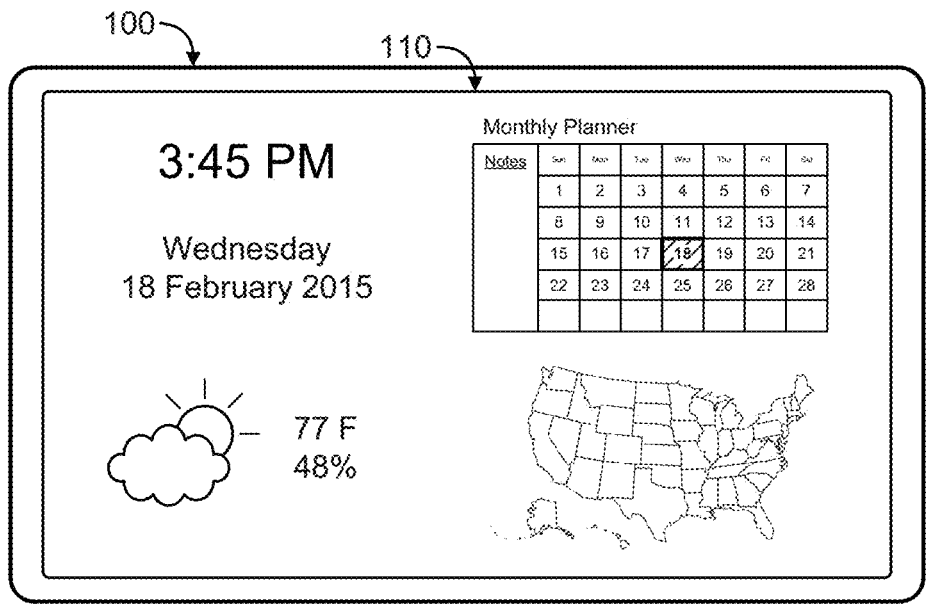
FIG. 2 illustrates the example display device of FIG. 1 with the display presenting information in a semi-static mode.

FIG. 2 illustrates the example display device 100 of FIG. 1 with display 110 presenting information in a semi-static mode. In particular embodiments, display 110 may be configured to have two modes of operation, a dynamic (or, emissive) mode and a semi-static (or, non-emissive) mode. In the example of FIG. 1, display 110 may be operating in a dynamic mode (e.g., showing a video), and in the example of FIG. 2, display 110 may be operating in a semi-static mode displaying the time, date, weather, a monthly planner, and a map. In FIG. 2, the information displayed in semi-static mode may be updated at relatively long intervals (e.g., every 1, 10, or 60 seconds).

When operating in a dynamic mode (as illustrated in FIG. 1), display 110 may have one or more of the following attributes: display 110 may display content (e.g., text, images, or video) in bright or vivid color, with high resolution, or at a high frame rate (e.g., a frame rate greater than or equal to 20 FPS); or display 110 may operate in an emissive mode where display device 100 or display 110 includes a light source or illumination source. Operating in an emissive mode may allow display 110 to display information without need for an external source of light (e.g., display 110 may be viewable in a darkened room). For an LCD, the light source may be a frontlight or backlight that illuminates the LCD which then modulates the light source to generate (or emit) an image. For an OLED display, the pixels of the OLED display may each produce light (e.g., from red, green, and blue subpixels) that results in an emitted image. In particular embodiments, when operating in a dynamic mode, display 110 may display content in color, black and white, or both color and black and white.

When operating in a semi-static mode (as illustrated in FIG. 2), display 110 may have one or more of the following attributes: display 110 may display text or images in color or black and white; display 110 may operate in a non-emissive mode; display 110 may appear reflective; display 110 may have a relatively low update rate (e.g., a frame rate or update rate less than 0.1, 1, or 10 FPS); or display 110 may consume little or no power. As an example and not by way of limitation, display 110 operating in a dynamic mode may consume approximately 1-50 watts of power (depending, at least in part, on the type and size of display 110), while, when operating in a semi-static mode, display 110 may consume less than 0.1, 1, 10, or 100 milliwatts of power. As another example and not by way of limitation, display 110 operating in a semi-static mode may only consume power when updating the content being displayed and may consume no power or negligible power (e.g., less than 10 μW) while displaying static, unchanging content. Display 110 operating in a non-emissive mode may refer to the use of external ambient light (e.g., room light or sunlight) to provide illumination for display 110 without using an internal light source that is included in display device 100 or display 110. As an example and not by way of limitation, display 110 may include an electro-dispersive or electrowetting display that uses ambient light as an illumination source. In particular embodiments, display 110 operating in a non-emissive mode may refer to information being displayed with non-emissive pixels. In particular embodiments, a non-emissive pixel may refer to a pixel that absorbs, transmits, or reflects light. In particular embodiments, a non-emissive pixel may refer to a pixel that does not emit visible light or a pixel that does not modulate an amount (e.g., an intensity) of light or an amount of a particular color of visible light.

In particular embodiments, display device 100 may be configured as a conference-room display or information sign, and when operating in a semi-static mode, display 110 may display a clock, weather information, a meeting calendar, artwork, a poster, meeting notes, or a company logo, or any other suitable information or suitable combination of information. In particular embodiments, display device 100 may be configured as a personal display device (e.g., a television, tablet, or smartphone), and when operating in a semi-static mode, display 110 may display personalized content, such as for example, favorite TV show reminders, family photo album, customized widget tiles, headline news, stock prices, social-network feeds, daily coupons, favorite sports scores, a clock, weather information, or traffic conditions, or any other suitable information or suitable combination of information. As an example and not by way of limitation, while a person is getting ready for work in the morning, their television or smartphone may display (in a semi-static mode) the time, the weather, or traffic conditions related to the person's commute. In particular embodiments, display device 100 may include a touch sensor, and display 110 may display (in a semi-static mode) a bookshelf or a white board that a user can interact with through the touch sensor. In particular embodiments, a user may be able to select a particular operating mode for display 110, or display 110 may automatically switch between dynamic and semi-static modes. As an example and not by way of limitation, when display device 100 goes into a sleep state, display 110 may automatically switch to operating in a low-power, semi-static mode. In particular embodiments, when operating in a semi-static mode, display 110 may be reflective and may act as a mirror. As an example and not by way of limitation, one or more surfaces or layers in display 110 may include a reflector or a surface with a reflective coating, and when display 110 is in a semi-static mode, display 110 may act as a mirror.

In particular embodiments, display 110 may include a combination of two or more types of displays oriented substantially parallel to one another with one display located behind the other display. As examples and not by way of limitation, display 110 may include an LCD located behind a PDLC display, an OLED display located behind an electrochromic display, an LCD located behind an electrowetting display, or an LCD behind a SmA display. In particular embodiments, display 110 may include two different types of displays, and display 110 may be referred to as a dual-mode display or a dual display. In particular embodiments, dual-mode display 110 may include a dynamic (or, emissive) display and a semi-static (or, non-emissive) display. As an example and not by way of limitation, display 110 may include a dynamic color display configured to show videos in an emissive mode and at a high frame rate (e.g., 24, 25, 30, 60, 120, or 240 FPS, or any other suitable frame rate), as illustrated in FIG. 1. Display 110 may also include a semi-static display configured to show information in black and white or color in a low-power, non-emissive mode with relatively low frame rate or update rate (e.g., 0.1, 1, or 10 FPS), as illustrated in FIG. 2. For such an example dual-mode display 110, the dynamic display may be located in front of or behind the semi-static display. As an example and not by way of limitation, the dynamic display may be located behind the semi-static display, and when the dynamic display is active, the semi-static display may be configured to be substantially transparent so that the dynamic display is viewable. Additionally, when display 110 is operating in a semi-static mode, the semi-static display may display information (e.g., text or images), and the dynamic display may be inactive or powered off. In particular embodiments, a dynamic display may appear white, reflective, dark or black (e.g., optically absorbing), or substantially transparent when the dynamic display is inactive or powered off. In particular embodiments, a display that is inactive or powered off may refer to a display that is receiving little or no electrical power (e.g., from a display controller), and in an inactive or powered-off state, a display may consume little (e.g., less than 10 µW) or no electrical power. In particular embodiments, a dynamic display may be referred to as an emissive display, and a semi-static display may be referred to as a non-emissive display. Although this disclosure describes and illustrates particular combinations of particular display types, this disclosure contemplates any suitable combinations of any suitable display types.

In particular embodiments, dual-mode display 110 may include a single type of display that has two or more operating modes (e.g., a dynamic display mode and a low-power, semi-static display mode). As an example and not by way of limitation, display 110 may include an LCD that, in a dynamic mode of operation, operates as an emissive display that modulates light from a backlight or frontlight. In a semi-static mode of operation, display 110 may operate as a low-power, non-emissive display that uses ambient light (e.g., room light or sunlight) to provide illumination for the LCD (with the backlight or frontlight turned off).

Figure 3:
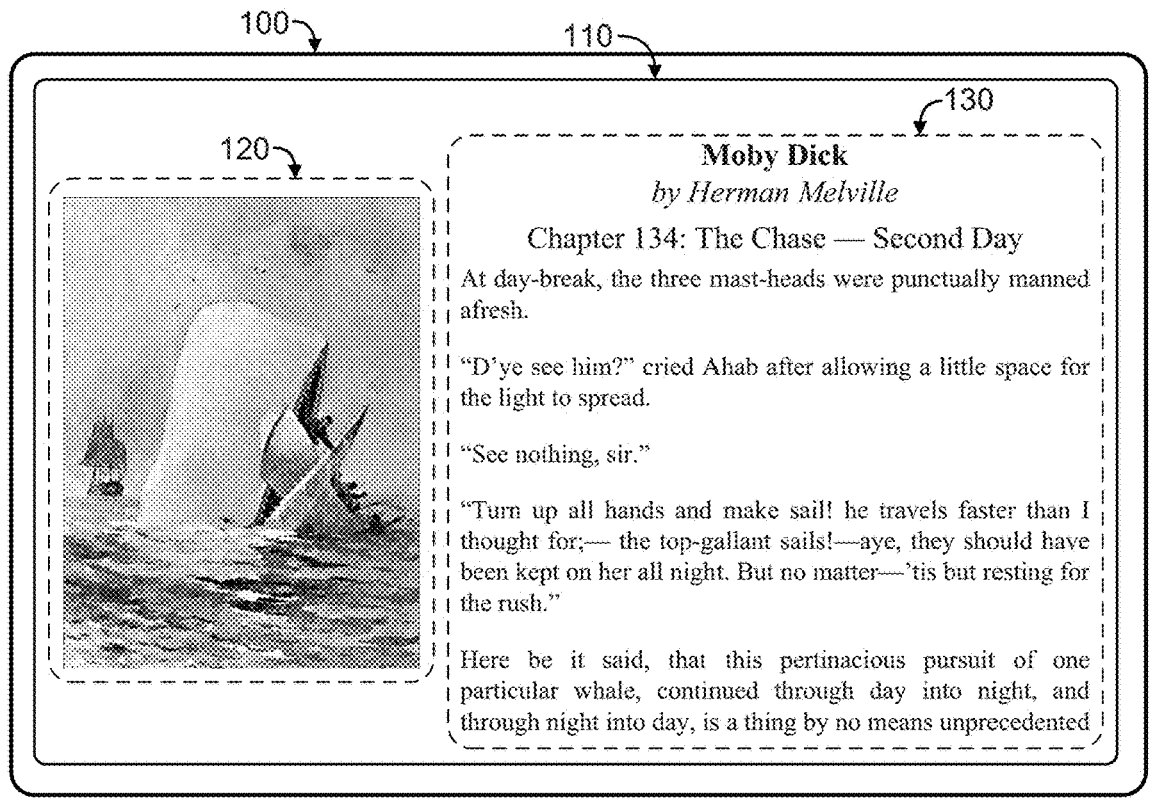
FIGS. 3 and 4 each illustrate an example display device with a display having different regions configured to operate in different display modes.
Figure 4:
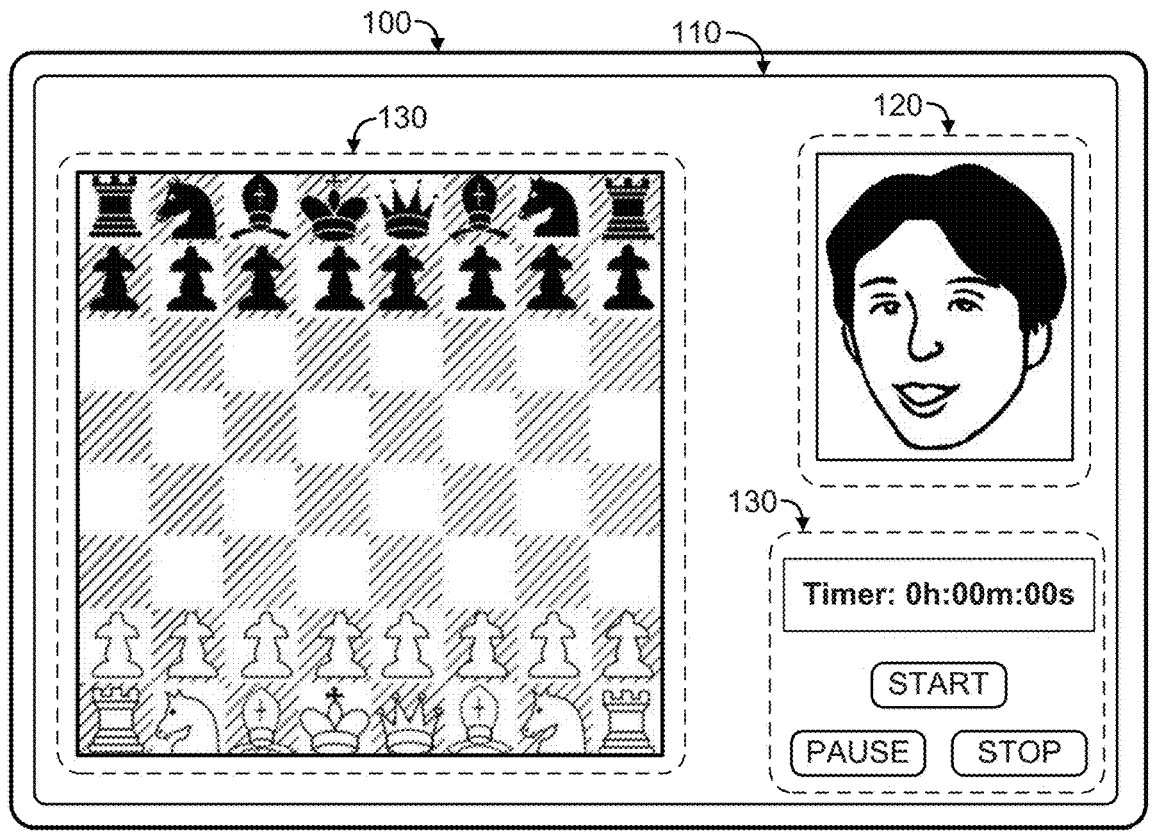

FIGS. 3 and 4 each illustrate example display device 100 with display 110 having different regions configured to operate in different display modes. In particular embodiments and as illustrated in FIGS. 3 and 4, dual-mode display 110 may operate in a hybrid-display mode, where display 110 includes multiple portions, areas, or regions, and each portion of display 110 is configured to operate in a dynamic or semi-static mode. In particular embodiments, one or more dynamic portions 120 of display 110 may be configured to operate in a dynamic mode (e.g., displaying an image or video using light generated by display device 100 or display 110), and one or more semi-static portions 130 of display 110 may be configured to operate in a semi-static mode (e.g., displaying text or an image in a non-emissive mode with a low update rate). As an example and not by way of limitation, a dynamic portion 120 of display 110 may display an image or video in high resolution or with vivid or bright color, and a semi-static portion 130 of display 110 may display information in black and white with a relatively low update rate (e.g., text, a game board, or a clock that may be updated approximately once per second or once per minute). The semi-static portions 130 may be illuminated using an external light source, such as for example, ambient room light. In particular embodiments, dual-mode display 110 may include a dynamic display for displaying dynamic portions 120 and a semi-static display for displaying semi-static portions 130. As an example and not by way of limitation, the dynamic display may be located behind the semi-static display, and the portions of the semi-static display located directly in front of dynamic portions 120 may be configured to be substantially transparent so that dynamic portions 120 are viewable through those portions of the semi-static display. Additionally, areas of the dynamic display located outside dynamic portions 120 may be inactive or turned off. As another example and not by way of limitation, the semi-static display may be located behind the dynamic display, and the portions of the dynamic display located directly in front of semi-static portions 130 may be configured to be substantially transparent so that semi-static portions 130 are viewable through those portions of the dynamic display.

In the example of FIG. 3, display device 100 is operating as an e-book reader showing an image and a portion of text from the book Moby Dick. Display 110 has a dynamic portion 120 showing the image, which may be displayed in an emissive mode with vivid or bright color, and display 110 has a semi-static portion 130 showing the text, which may be displayed in black and white and in a non-emissive mode (e.g., illuminated with ambient light). In particular embodiments, the areas of the dynamic display outside of dynamic portion 120 may be inactive or turned off (e.g., pixels or backlight located outside of dynamic portion 120 may be turned off). In the example of FIG. 4, display device 100 is operating as a chess game where two players can play remotely. Display 110 has a dynamic portion 120 that shows a live video of the other player, which allows the two players to interact during a chess match. Display 110 also has two semi-static portions 130 showing the chess board, a timer, and game controls. In particular embodiments, display 110 may be reconfigurable so that dynamic portions 120 and semi-static portions 130 may be moved or resized depending on the application that is being run on display device 100. As an example and not by way of limitation, display device 100 illustrated in FIGS. 3 and 4 may be the same device configured to operate as an e-reader (in FIG. 3) and as a remote game player (in FIG. 4). In particular embodiments, display 110 may have any suitable number of dynamic portions 120 and any suitable number of semi-static portions 130, and each dynamic portion 120 and semi-static portion 130 may have any suitable size and any suitable shape. As an example and not by way of limitation, a dynamic portion 120 or a semi-static portion 130 may cover approximately one-sixteenth, one-eighth, one-fourth, one-half, or all of display 110 and may have a square, rectangular, or circular shape. As another example and not by way of limitation, a dynamic portion 120 or a semi-static portion 130 may include 1, 2, 10, 100, or any suitable number of pixels. Although this disclosure describes and illustrates particular displays having particular numbers of regions operating in particular display modes and having particular sizes and shapes, this disclosure contemplates any suitable displays having any suitable numbers of regions operating in any suitable display modes and having any suitable sizes and shapes.

Figure 5:
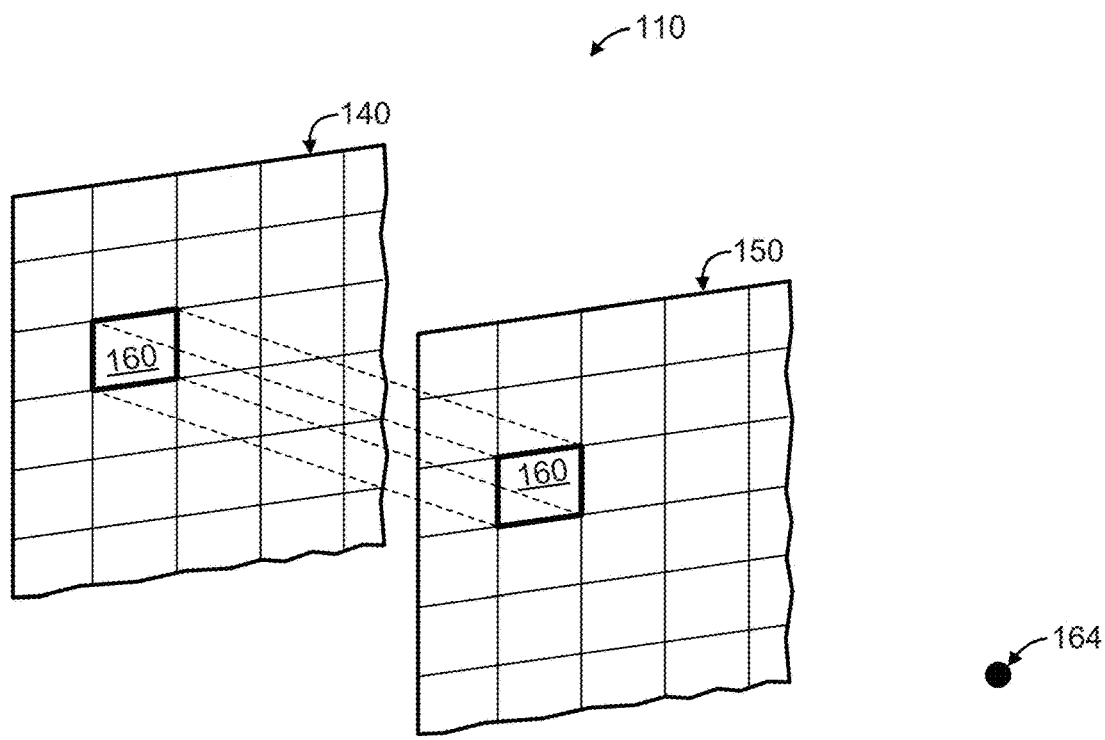
FIGS. 5 and 6 each illustrate an exploded view of a portion of an example display.
Figure 6:
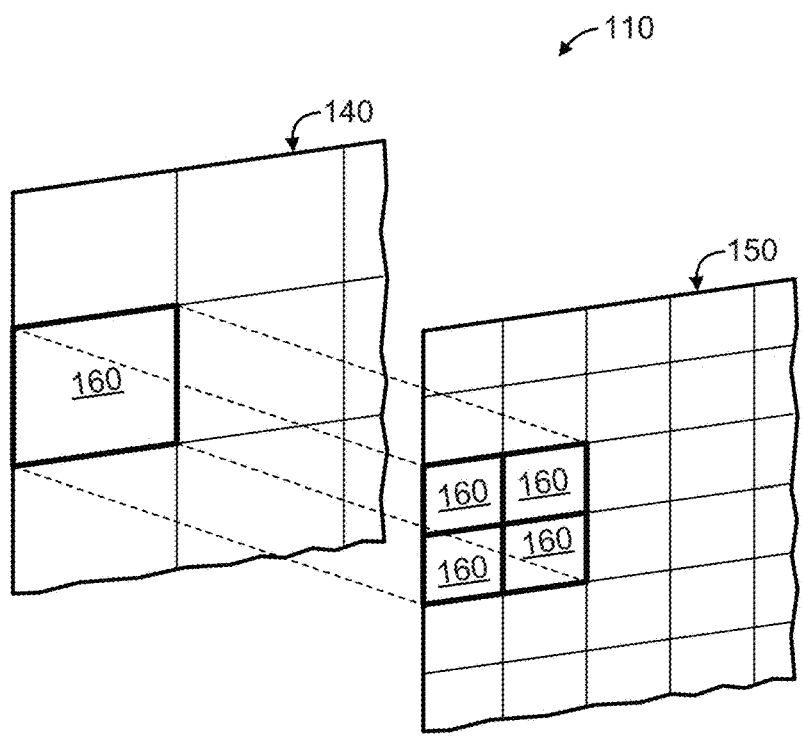

FIGS. 5 and 6 each illustrate an exploded view of a portion of example display 110. In particular embodiments, display 110 may include front display 150 and rear display 140, where rear display 140 is located behind front display 150. As an example and not by way of limitation, front display 150 may be an electrowetting display, and rear display 140 may be an OLED display located directly behind front display 150. In particular embodiments, front display 150 or rear display 140 may each be referred to as layers, and each layer of display 110 may include one or more displays. As an example and not by way of limitation, a first layer of display 110 may include or may be referred to as front display 150, and a second layer of display 110 may include or may be referred to as rear display 140. In particular embodiments, display 110 may include other surfaces, layers, or devices not shown in FIG. 5 or 6, where the other surfaces, layers, or devices may be disposed between displays 140 and 150, behind rear display 140, or in front of front display 150. As an example and not by way of limitation, display 110 may include a protective cover, a glare-reduction layer (e.g., a polarizer or a layer with an antireflection coating), or a touch-sensor layer located in front of front display 150. As another example and not by way of limitation, display 110 may include a backlight located behind rear display 140 or a frontlight located between displays 140 and 150.

In particular embodiments, display 110 of display device 100 may have an associated viewing cone, e.g., an angular region or a solid angle within which display 110 can be reasonably viewed. In particular embodiments, relative positions of surfaces, layers, or devices of display 110 may be referenced with respect to a person viewing display 110 from within an associated viewing cone. In the example of FIG. 5, a person viewing display 110 from point 164 may be referred to as viewing display 110 from within its viewing cone and may be referred to as viewing display 110 from the front of display 110. With respect to point 164 in FIG. 5, front display 150 is disposed or located in front of rear display 140, and similarly, rear display 140 is disposed or located behind front display 150.

In particular embodiments, display 110 may form a sandwich-type structure that includes displays 140 and 150 (as well as any additional surfaces, layers, or devices that are part of display 110) combined together in a layered manner. As an example and not by way of limitation, displays 140 and 150 may overlay one another with a small air gap between facing surfaces (e.g., a front surface of display 140 and a back surface of display 150) or with facing surfaces in contact with, adhered to, or bonded to one another. In particular embodiments, displays 140 and 150 may be bonded together with a substantially transparent adhesive, such as for example, an optically clear adhesive. Although this disclosure describes and illustrates particular displays having particular layers and particular structures, this disclosure contemplates any suitable displays having any suitable layers and any suitable structures. Moreover, while this disclosure describes specific examples of a rear display behind a front display, this disclosure contemplates any suitable number of displays located behind any suitable number of other displays. For example, this disclosure contemplates any suitable number of displays located between displays 140 and 150 of FIG. 5, and that those displays may have any suitable characteristics of the displays described herein. Thus, for example, a device may include three displays: a front display, a middle display behind the front display, and a rear display behind the middle display. Portions of the middle display may be viewable through the front display when corresponding portions of the front display are transparent, and portions of the rear display may be viewable through the middle and front displays when corresponding portions of the middle and front displays are transparent.

In particular embodiments, front display 150 and rear display 140 may each include multiple pixels 160 arranged in a regular or repeating pattern across a surface of display 140 or 150. This disclosure contemplates any suitable type of pixel 160, such as for example, emissive pixels (e.g., an LCD or an OLED pixel) or non-emissive pixels (e.g., an electrophoretic or electrowetting pixel). Moreover, pixels 160 may have any suitable size (e.g., a width or height of 25 µm, 50 µm, 100 µm, 200 µm, or 500 µm) and any suitable shape (e.g., square, rectangular, or circular). In particular embodiments, each pixel 160 may be an individually addressable or controllable element of display 140 or 150 such that a state of a pixel 160 may be set (e.g., by a display controller) independent of the states of other pixels 160. In particular embodiments, the addressability of each pixel 160 may be provided by one or more control lines coupled from each pixel 160 to a display controller. In particular embodiments, each pixel 160 may have its own dedicated control line, or each pixel 160 may share one or more control lines with other pixels 160. As an example and not by way of limitation, each pixel 160 may have one or more electrodes or electrical contacts connected by a control line to a display controller, and one or more corresponding voltages or currents provided by the display controller to pixel 160 may set the state of pixel 160. In particular embodiments, pixel 160 may be a black-and-white pixel that may be set to various states, such as for example, black, white, partially transparent, transparent, reflective, or opaque. As an example and not by way of limitation, a black-and-white pixel may be addressed using one control signal (e.g., the pixel is off, or black, when 0 V is applied to a pixel control line, and the pixel appears white or transparent when 5 V is applied). In particular embodiments, pixel 160 may be a color pixel that may include three or more subpixels (e.g., a red, green, and blue subpixel), and pixel 160 may be set to various color states (e.g., red, yellow, orange, etc.) as well as black, white, partially transparent, transparent, reflective, or opaque. As an example and not by way of limitation, a color pixel may have associated control lines that provide control signals to each of the corresponding subpixels of the color pixel.

In particular embodiments, a display controller may be configured to individually or separately address each pixel 160 of front display 150 and rear display 140. As an example and not by way of limitation, a display controller may configure a particular pixel 160 of front display 150 to be in an active or emissive state, and the display controller may configure one or more corresponding pixels 160 of rear display 140 to be in an off or inactive state. In particular embodiments, pixels 160 may be arranged along rows and columns, and an active-matrix scheme may be used to provide drive signals to each pixel 160 (or the subpixels of each pixel 160). In an active-matrix approach, each pixel 160 (or each subpixel) has an associated capacitor and transistor deposited on a display's substrate, where the capacitor holds charge (e.g., for one screen refresh cycle) and the transistor supplies current to the pixel 160. To activate a particular pixel 160, an appropriate row control line is turned on while a drive signal is transmitted along a corresponding column control line. In other particular embodiments, a passive-matrix scheme may be used to address pixels 160, where a passive matrix includes a grid of columns and rows of conductive metal configured to selectively activate each pixel. To turn on a particular pixel 160, a particular column is activated (e.g., charge is sent down that column), and a particular row is coupled to ground. The particular row and column intersect at the designated pixel 160, and the pixel 160 is then activated. Although this disclosure describes and illustrates particular pixels that are addressed in particular manners, this disclosure contemplates any suitable pixels that are addressed in any suitable manner.

In particular embodiments, front display 150 or rear display 140 may each be a color display or a black and white display, and front display 150 or rear display 140 may each be an emissive or a non-emissive display. As an example and not by way of limitation, front display 150 may be a non-emissive black-and-white display, and rear display 140 may be an emissive color display. In particular embodiments, a color display may use additive or subtractive color techniques to generate color images or text, and the color display may generate colors based on any suitable color system, such as for example a red/green/blue or cyan/magenta/yellow/black color system. In particular embodiments, each pixel of an emissive color display may have three or more subpixels, each subpixel configured to emit a particular color (e.g., red, green, or blue). In particular embodiments, each pixel of a non-emissive color display may have three or more subpixels, each subpixel configured to absorb, reflect, or scatter a particular color (e.g., red, green, or blue).

In particular embodiments, a size or dimension of pixels 160 of front display 150 may be an integral multiple of a corresponding size or dimension of pixels 160 of rear display 140, or vice versa. As an example and not by way of limitation, pixels 160 of front display 150 may be the same size as pixels 160 of rear display 140, or pixels 160 of front display 150 may be twice, three times, or any suitable integral multiple of the size of pixels 160 of rear display 140. As another example and not by way of limitation, pixels 160 of rear display 140 may be twice, three times, or any suitable integral multiple of the size of pixels 160 of front display 150. In the example of FIG. 5, pixels 160 of front display 150 are approximately the same size as pixels 160 of rear display 140. In the example of FIG. 6, pixels 160 of rear display 140 are approximately four times the size (e.g., four times the area) of pixels 160 of front display 150. Although this disclosure describes and illustrates particular pixels having particular sizes, this disclosure contemplates any suitable pixels having any suitable sizes.

In particular embodiments, front display 150 and rear display 140 may be substantially aligned with respect to one another. Front display 150 and rear display 140 may be combined together to form display 110 such that one or more pixels 160 of front display 150 are superposed or overlay one or more pixels 160 of rear display 140. In FIGS. 5 and 6, pixels 160 of front display 150 are aligned with respect to pixels 160 of rear display 140 such that portions of borders of rear-display pixels 160 are situated directly under corresponding portions of borders of front-display pixels 160. In FIG. 5, pixels 160 of front display 150 and rear display 140 have approximately the same size and shape, and, as illustrated by the four dashed lines, pixels 160 are superposed so that each pixel 160 of front display 150 is situated directly over a corresponding pixel 160 of rear display 140 and their borders are substantially aligned. In FIG. 6, front display 150 and rear display 140 are aligned so that each pixel 160 of rear display 140 is situated directly under four corresponding pixels 160 of front display 150, and the borders of each rear-display pixel 160 are situated directly under portions of borders of front-display pixels 160. Although this disclosure describes and illustrates particular displays having particular pixels aligned in particular manners, this disclosure contemplates any suitable displays having any suitable pixels aligned in any suitable manner.

In particular embodiments, front display 150 may include one or more portions, each portion being an area or a part of front display 150 that includes one or more front-display pixels 160. As an example and not by way of limitation, a front-display portion may include a single pixel 160 or a group of multiple contiguous pixels 160 (e.g., 2, 4, 10, 100, 1,000 or any suitable number of pixels 160). As another example and not by way of limitation, a front-display portion may include an area of front display 150, such as for example, an area occupying approximately one tenth, one quarter, one half, or substantially all the area of front display 150. In particular embodiments, a front-display portion may be referred to as a multi-mode portion and may include one or more front-display pixels that are each configured to operate in multiple modes. As an example and not by way of limitation, a multi-mode portion of front display 150 may have one or more front-display pixels that operate in a first mode in which the pixels emit, modulate, absorb, or reflect visible light. Additionally, a multi-mode portion may have one or more front-display pixels that operate in a second mode in which the one or more front-display pixels are substantially transparent to visible light. In particular embodiments, rear display 140 may include one or more rear-display portions located behind at least one multi-mode portion, each rear-display portion including pixels configured to emit, modulate, absorb, or reflect visible light. As an example and not by way of limitation, in FIG. 5, pixel 160 of front display 150 may be configured to be substantially transparent, and the corresponding rear-display pixel 160 (located directly behind front-display pixel 160) may be configured to emit visible light. As another example and not by way of limitation, in FIG. 5, pixel 160 of front display 150 may be configured to absorb or reflect incident visible light (e.g., pixel 160 may be configured as a semi-static portion 130), and the corresponding pixel 160 of rear display 140 may be inactive or turned off. In the example of FIG. 6, pixel 160 of rear display 140 may be configured to emit, modulate, absorb, or reflect visible light, and the four superposed pixels 160 of front display 150 may be configured to be substantially transparent. In the example of FIG. 3, display 110 may include an emissive rear display (e.g., an LCD) and a non-emissive front display (e.g., an electrowetting display). In portion 120 of FIG. 3, the pixels of the rear display may be configured to emit the image illustrated in FIG. 3, while the pixels of the corresponding multi-mode front-display portion may be configured to be substantially transparent. In portion 130 of FIG. 3, the pixels of the front display may be configured to display the text as illustrated, while the pixels of the corresponding rear-display portion may be configured to be inactive or turned off.

Figure 7:
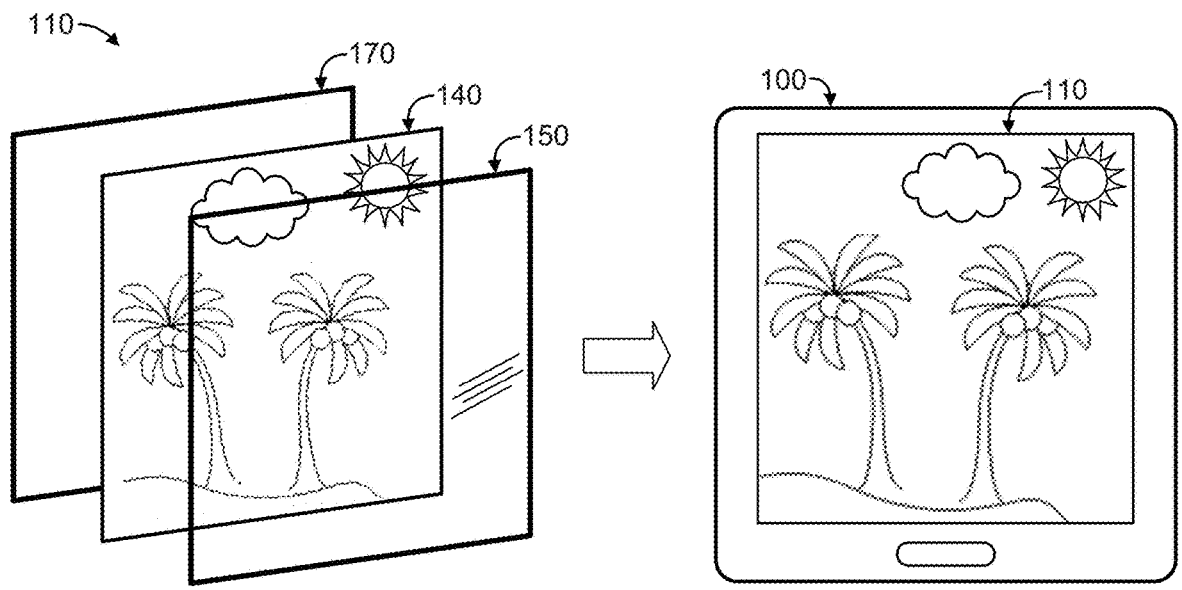
FIGS. 7 and 8 each illustrate an exploded view (on the left) of an example display and (on the right) a front view of an example display device with the example display.
Figure 8:
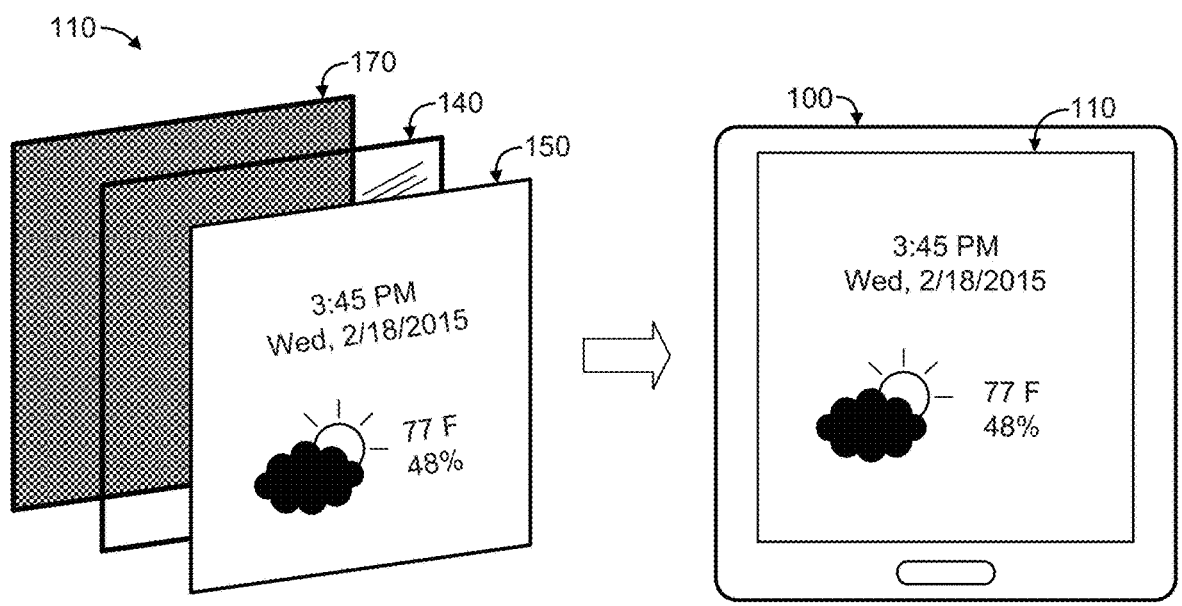

FIGS. 7 and 8 each illustrate an exploded view (on the left) of example display 110 and (on the right) a front view of example display device 100 with example display 110. In FIGS. 7 and 8 (as well as other figures described below), an exploded view illustrates the various layers or devices that make up example display 110, while a front view shows how example display 110 may appear when viewed from the front of display device 100. In particular embodiments, display 110 may include front display 150, rear display 140

(located behind front display 150), and backlight 170 (located behind rear display 140). In the example of FIGS. 7 and 8, front display 150 is a semi-static display, and rear display 140 is an LCD configured to operate as a dynamic display. In FIG. 7, display 110 is operating in a dynamic mode, and in FIG. 8, display 110 is operating in a semi-static mode. In FIG. 7, LCD 140 is showing an image of a tropical scene, and backlight 170 acts as an illumination source, providing light which is selectively modulated by LCD 140.

In particular embodiments, an LCD may include a layer of liquid-crystal molecules positioned between two optical polarizers. As an example and not by way of limitation, an LCD pixel may employ a twisted nematic effect where a twisted nematic cell is positioned between two linear polarizers with their polarization axes arranged at right angles to one another. Based on an applied electric field, the liquid-crystal molecules of an LCD pixel may alter the polarization of light propagating through the pixel causing the light to be blocked, passed, or partially passed by one of the polarizers. In particular embodiments, LCD pixels may be arranged in a matrix (e.g., rows and columns), and individual pixels may be addressed using passive-matrix or active-matrix schemes. In particular embodiments, each LCD pixel may include three or more subpixels, each subpixel configured to produce a particular color component (e.g., red, green, or blue) by selectively modulating color components of a white-light illumination source. As an example and not by way of limitation, white light from a backlight may illuminate an LCD, and each subpixel of an LCD pixel may include a color filter that transmits a particular color (e.g., red, green, or blue) and removes or filters other color components (e.g., a red filter may transmit red light and remove green and blue color components). The subpixels of an LCD pixel may each selectively modulate their associated color components, and the LCD pixel may emit a particular color. The modulation of light by an LCD pixel may refer to an LCD pixel that filters or removes particular amounts of particular color components from an incident illumination source. As an example and not by way of limitation, an LCD pixel may appear white when each of its subpixels (e.g., red, green, and blue subpixels) is configured to transmit substantially all incident light of its respective color component, and an LCD pixel may appear black when it filters or blocks substantially all color components of incident light. As another example and not by way of limitation, an LCD pixel may appear a particular color when it removes or filters out other color components from an illumination source and lets the particular color component propagate through the pixel with little or no attenuation. An LCD pixel may appear blue when its blue subpixel is configured to transmit substantially all blue light, while its red and green subpixels are configured to block substantially all light. Although this disclosure describes and illustrates particular liquid-crystal displays configured to operate in particular manners, this disclosure contemplates any suitable liquid-crystal displays configured to operate in any suitable manner.

In particular embodiments, incident light may refer to light from one or more sources that interacts with or impinges on a surface, such as for example a surface of a display or a pixel. As an example and not by way of limitation, incident light that impinges on a pixel may be partially transmitted through the pixel or partially reflected or scattered from the pixel. In particular embodiments, incident light may strike a surface at an angle that is approximately orthogonal to the surface, or incident light may strike a surface within a range of angles (e.g., within 45 degrees of orthogonal to the surface). Sources of incident light may include external light sources (e.g., ambient light) or internal light sources (e.g., light from a backlight or frontlight).

In particular embodiments, backlight 170 may be a substantially opaque or non-transparent illumination layer located behind LCD 140. In particular embodiments, backlight 170 may use one or more LEDs or fluorescent lamps to produce illumination for LCD 140. These illumination sources may be located directly behind LCD 140 or located on a side or edge of backlight 170 and directed to LCD 140 by one or more light guides, diffusers, or reflectors. In other particular embodiments, display 110 may include a frontlight (not illustrated in FIG. 7 or 8) instead of or in addition to backlight 170. As an example and not by way of limitation, a frontlight may be located between displays 140 and 150 or in front of front display 150, and the frontlight may provide illumination for LCD 140. In particular embodiments, a frontlight may include a substantially transparent layer that allows light to pass through the frontlight. Additionally, a frontlight may include illumination sources (e.g., LEDs) located at one or more edges, and the illumination sources may provide light to LCD 140 through reflection from one or more surfaces within the frontlight. Although this disclosure describes and illustrates particular frontlights and backlights having particular configurations, this disclosure contemplates any suitable frontlights and backlights having any suitable configurations.

FIG. 7 illustrates display 110 operating in a dynamic mode with LCD 140 showing an image which may be a digital picture or part of a video and may be displayed in vivid color using backlight 170 as an illumination source. When display 110 is operating in a dynamic mode, semi-static display 150 may be configured to be substantially transparent allowing light from backlight 170 and LCD 140 to pass through semi-static display 150 so the image from LCD 140 can be viewed. In particular embodiments, display 140 or 150 being substantially transparent may refer to display 140 or 150 transmitting greater than or equal to 70%, 80%, 90%, 95%, or 99% of incident visible light, or transmitting greater than or equal to any suitable percentage of incident visible light. As an example and not by way of limitation, when operating in a transparent mode, semi-static display 150 may transmit approximately 90% of visible light from LCD 140 to a viewing cone of display 110. FIG. 8 illustrates example display 110 of FIG. 7 operating in a semi-static mode with semi-static display 150 showing the time, date, and weather. In particular embodiments, when display 110 is operating in a semi-static mode, LCD 140 and backlight 170 may be inactive or turned off, and LCD 140 or backlight 170 may appear substantially transparent, substantially black (e.g., optically absorbing), or substantially white (e.g., optically reflecting or scattering). As an example and not by way of limitation, when in an off state, LCD 140 may be substantially transparent, and backlight 170 may appear substantially black. As another example and not by way of limitation, LCD 140 may have a partially reflective coating (e.g., on a front or rear surface) that causes LCD 140 to appear reflective or white when backlight 170 and LCD are turned off.

In particular embodiments, semi-static display 150 illustrated in FIGS. 7 and 8 may be an LC SmA display, and dual-mode display 110 illustrated in FIGS. 7 and 8 may include a combination of LCD 140 (with backlight 170) and LC SmA display 150. As illustrated in FIGS. 7 and 8, LCD 140 may be located behind SmA display 150. As described in further detail below, SmA display 150 may have pixels 160 configured to appear substantially transparent or appear substantially white or black (e.g., no applied voltage). The SmA pixels can maintain their state (bi-stability) without applying an electric field or it might need an electric field to maintain its state. Applying an electric field the state can be changed from substantially transparent to substantially white or black. In FIG. 7, where display 110 is operating in a dynamic mode, pixels of SmA display 150 are configured to appear substantially transparent so that LCD 140 may be viewed. In particular embodiments, and as illustrated in FIG. 8, when display 110 is operating in a semi-static mode, pixels of SmA display 150 may be individually addressed (e.g., by a display controller) to change or maintain the state (if needed) of each pixel to appear transparent or white. The pixels that form the text and the sun/cloud image displayed by SmA display 150 in FIG. 8 may be configured to be substantially transparent. Those transparent pixels may appear dark or black since they show a black or optically absorbing surface of LCD 140 or backlight 170. The other pixels of SmA display 150 may be configured to be in an off state to form a substantially white background. In other particular embodiments, when display 110 is operating in a semi-static mode, pixels of SmA display 150 are addressed so that each pixel appears transparent or black. The pixels that form the text and the sun/cloud image may be configured to be substantially black (or, optically absorbing), while the pixels that form white background pixels of SmA display 150 may be configured to be in an on state so they are substantially transparent. LCD 140 or backlight 170 may be configured to reflect or scatter incident light so that the corresponding transparent pixels of SmA display 150 appear white.

In particular embodiments, semi-static display 150 illustrated in FIGS. 7 and 8 may be a PDLC display, and dual-mode display 110 illustrated in FIGS. 7 and 8 may include a combination of LCD 140 (with backlight 170) and PDLC display 150. As illustrated in FIGS. 7 and 8, LCD 140 may be located behind PDLC display 150. As described in further detail below, PDLC display 150 may have pixels 160 configured to appear substantially transparent when a voltage is applied to pixel 160 and configured to appear substantially white or black when in an off state (e.g., no applied voltage). In FIG. 7, where display 110 is operating in a dynamic mode, pixels of PDLC display 150 are configured to appear substantially transparent so that LCD 140 may be viewed. In particular embodiments, and as illustrated in FIG. 8, when display 110 is operating in a semi-static mode, pixels of PDLC display 150 may be individually addressed (e.g., by a display controller) so that each pixel appears transparent or white. The pixels that form the text and the sun/cloud image displayed by PDLC display 150 in FIG. 8 may be configured to be substantially transparent. Those transparent pixels may appear dark or black since they show a black or optically absorbing surface of LCD 140 or backlight 170. The other pixels of PDLC display 150 may be configured to be in an off state to form a substantially white background. In other particular embodiments, when display 110 is operating in a semi-static mode, pixels of PDLC display 150 are addressed so that each pixel appears transparent or black. The pixels that form the text and the sun/cloud image may be configured to be substantially black (or, optically absorbing), while the pixels that form white background pixels of PDLC display 150 may be configured to be in an on state so they are substantially transparent. LCD 140 or backlight 170 may be configured to reflect or scatter incident light so that the corresponding transparent pixels of PDLC display 150 appear white.

In particular embodiments, semi-static display 150 illustrated in FIGS. 7 and 8 may be an electrochromic display, and dual-mode display 110 illustrated in FIGS. 7 and 8 may be a combination of LCD 140 (with backlight 170) and electrochromic display 150. As illustrated in FIGS. 7 and 8, LCD 140 may be located behind electrochromic display 150. As described in further detail below, electrochromic display 150 may have pixels 160 configured to appear substantially transparent or substantially blue, silver, black, or white, and the state of an electrochromic pixel may be changed (e.g., from transparent to white) by applying a burst of charge to the pixel's electrodes. In FIG. 7, where display 110 is operating in a dynamic mode, pixels of electrochromic display 150 are configured to appear substantially transparent so that LCD 140 may be viewed. In FIG. 8, where display 110 is operating in a semi-static mode, pixels of electrochromic display 150 are individually addressed (e.g., by a display controller) so that each pixel appears transparent or white. The pixels that form the text and the sun/cloud image displayed by electrochromic display 150 in FIG. 8 may be configured to be substantially transparent. Those transparent pixels may appear dark or black since they show a black or optically absorbing surface of LCD 140 or backlight 170. The other pixels of electrochromic display 150 may be configured to appear substantially white.

In particular embodiments, semi-static display 150 illustrated in FIGS. 7 and 8 may be an electro-dispersive display, and dual-mode display 110 illustrated in FIGS. 7 and 8 may include a combination of LCD 140 (with backlight 170) and electro-dispersive display 150. As illustrated in FIGS. 7 and 8, LCD 140 may be located behind electro-dispersive display 150. As described in further detail below, pixels 160 of electro-dispersive display 150 may appear substantially transparent, opaque, black, or white based on the color, movement, or location of small particles contained within pixels 160 of electro-dispersive display 150. The movement or location of the small particles within a pixel may be controlled by voltages applied to one or more electrodes of the pixel. In FIG. 7, where display 110 is operating in a dynamic mode, pixels of electro-dispersive display 150 are configured to appear substantially transparent so that LCD 140 may be viewed. In particular embodiments, and as illustrated in FIG. 8, when display 110 is operating in a semi-static mode, pixels of electro-dispersive display 150 may be individually addressed (e.g., by a display controller) so that each pixel appears transparent or white. The pixels that form the text and the sun/cloud image displayed by electro-dispersive display 150 in FIG. 8 may be configured to be substantially transparent. Those transparent pixels may appear dark or black since they show a black or optically absorbing surface of LCD 140 or backlight 170. The other pixels of electro-dispersive display 150 may be configured to appear substantially opaque or white (e.g., the small particles contained within the pixels may be white or reflective, and those particles may be located so that the pixels appear white). In other particular embodiments, when display 110 is operating in a semi-static mode, pixels that form the text and sun/cloud image displayed by electro-dispersive display 150 in FIG. 8 may be configured to be substantially dark or black (e.g., the small particles contained within the pixels may be black, and those particles may be located so that the pixels appear black). Additionally, the other pixels of electro-dispersive display 150 may be configured to be substantially transparent, and these transparent pixels may appear white by showing a white or reflective surface of LCD 140 or backlight 170. In particular embodiments, LCD 140 or backlight 170 may have a reflective or a partially reflective front coating, or LCD 140 or backlight 170 may be configured to appear white when inactive or turned off.

In particular embodiments, semi-static display 150 illustrated in FIGS. 7 and 8 may be an electrowetting display, and dual-mode display 110 illustrated in FIGS. 7 and 8 may include a combination of LCD 140 (with backlight 170) and electrowetting display 150. As illustrated in FIGS. 7 and 8, LCD 140 may be located behind electrowetting display 150. As described in further detail below, electrowetting display 150 may have pixels 160 that each contains an electrowetting fluid that can be controlled to make the pixels 160 appear substantially transparent, opaque, black, or white. Based on one or more voltages applied to electrodes of an electrowetting pixel, the electrowetting fluid contained within the pixel can be moved to change the appearance of the pixel. In FIG. 7, where display 110 is operating in a dynamic mode, pixels of electrowetting display 150 are configured to appear substantially transparent so that light from LCD 140 may pass through electrowetting display 150 and be viewed from front of display device 100. In particular embodiments, and as illustrated in FIG. 8, when display 110 is operating in a semi-static mode, pixels of electrowetting display 150 may be individually addressed (e.g., by a display controller) so that each pixel appears transparent or white. The pixels that form the text and the sun/cloud image displayed by electrowetting display 150 in FIG. 8 may be configured to be substantially transparent. Those transparent pixels may appear dark or black since they show a black or optically absorbing surface of LCD 140 or backlight 170. The other pixels of electrowetting display 150 may be configured to appear substantially opaque or white (e.g., the electrowetting fluid may be white and may be located so the pixels appear white). In other particular embodiments, when display 110 is operating in a semi-static mode, pixels that form the text and sun/cloud image displayed by electro-dispersive display 150 in FIG. 8 may be configured to be substantially dark or black (e.g., the electrowetting fluid may be black or optically absorbing). Additionally, the other pixels of electro-dispersive display 150 may be configured to be substantially transparent, and these transparent pixels may appear white by showing a white or reflective surface of LCD 140 or backlight 170.

Figure 9:
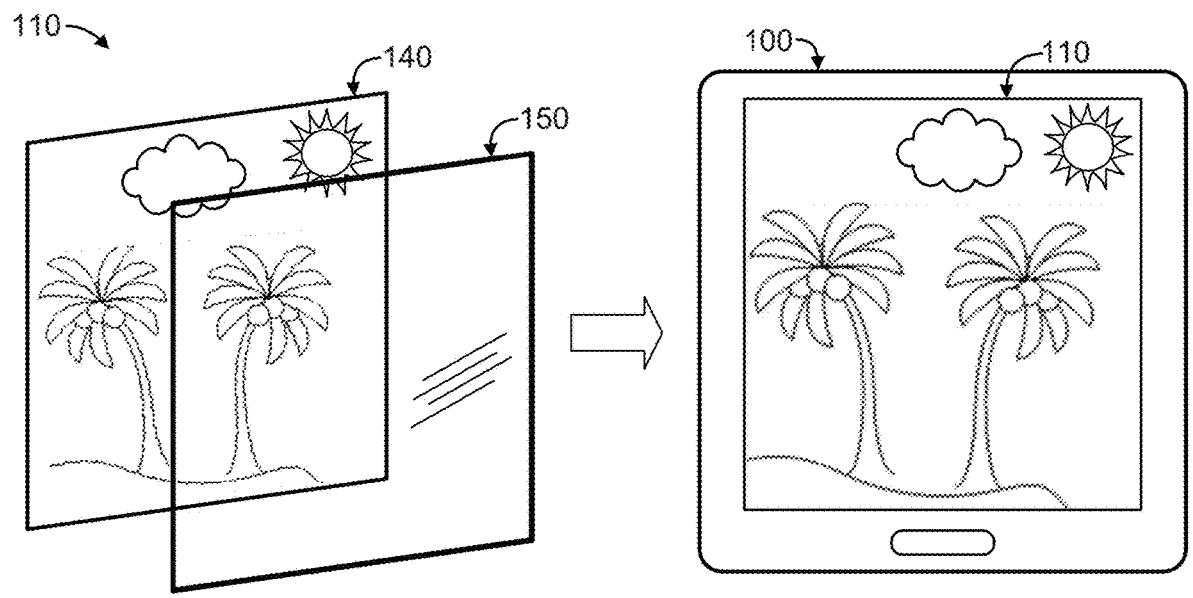
FIGS. 9 and 10 each illustrate an exploded view (on the left) of another example display and (on the right) a front view of an example display device with the example display.
Figure 10:
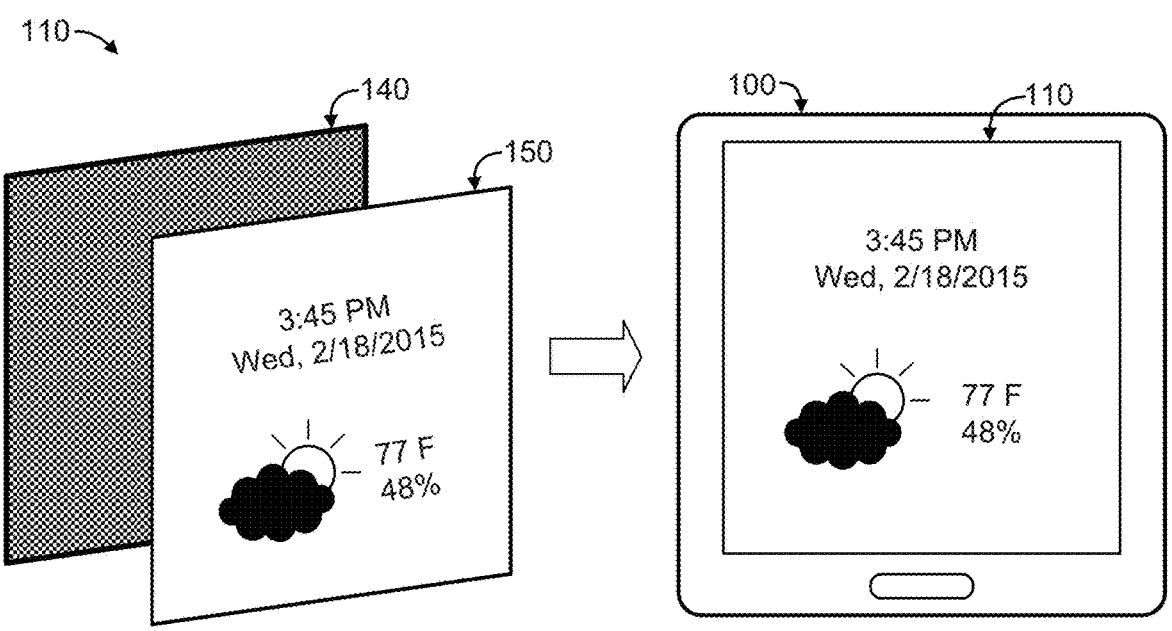

FIGS. 9 and 10 each illustrate an exploded view (on the left) of another example display 110 and (on the right) a front view of example display device 100 with the example display 110. In particular embodiments, display 110 may include front display 150 (which may be a semi-static, or non-emissive, display) and rear display 140 (which may be an emissive display, such as for example, an LED, an OLED, or QD display). In the example of FIG. 9, display 110 is operating in a dynamic mode and showing an image of a tropical scene, and in the example of FIG. 10, display 110 is operating in a semi-static mode. In FIGS. 9 and 10, rear display 140 may be an OLED display in which each pixel includes one or more films of organic compound that emit light in response to an electric current. As an example and not by way of limitation, each OLED pixel may include three or more subpixels, each subpixel including a particular organic compound configured to emit a particular color component (e.g., red, green, or blue) when an electric current is passed through the subpixel. When the red, green, and blue subpixels of an OLED pixel are each turned on by an equal amount, the pixel may appear white. When one or more subpixels of an OLED pixel are each turned on with a particular amount of current, the pixel may appear a particular color (e.g., red, green, yellow, orange, etc.). Although this disclosure describes and illustrates particular OLED displays configured to operate in particular manners, this disclosure contemplates any suitable OLED displays configured to operate in any suitable manner.

FIG. 9 illustrates display 110 operating in a dynamic mode with OLED display 140 showing an image which may be a digital picture or part of a video. When display 110 is operating in a dynamic mode, semi-static display 150 may be configured to be substantially transparent allowing light from OLED display 140 to pass through semi-static display 150 so the image from OLED display 140 can be viewed. FIG. 10 illustrates example display 110 of FIG. 9 operating in a semi-static mode with semi-static display 150 showing the time, date, and weather. In particular embodiments, when display 110 is operating in a semi-static mode, OLED display 140 may be inactive or turned off, and OLED display 140 may appear substantially transparent, substantially black (e.g., optically absorbing), or substantially white (e.g., optically reflecting or scattering). As an example and not by way of limitation, when turned off, OLED display 140 may absorb most light that is incident on its front surface, and OLED display 140 may appear dark or black. As another example and not by way of limitation, when turned off, OLED display 140 may reflect or scatter most incident light, and OLED display 140 may appear reflective or white.

In the example of FIGS. 9 and 10, front display 150 may be any suitable non-emissive (or, semi-static) display, such as for example, a PDLC display, an electrochromic display, an electro-dispersive display, LCD in any of its phases (e.g., nematic, TN, STN, SmA, etc.), or an electrowetting display. In FIGS. 9 and 10, front display 150 may be a PDLC display, an electrochromic display, an electro-dispersive display, or an electrowetting display, and the pixels of front display 150 may be configured to be substantially transparent when OLED display 140 is operating, allowing light emitted by OLED display 140 to pass through front display 150. In particular embodiments, and as illustrated in FIG. 10, when display 110 is operating in a semi-static mode, pixels of front display 150 (which may be a PDLC display, an electrochromic display, an electro-dispersive display, an electrowetting display or an LCD in any of its phases (e.g., nematic, TN, STN, SmA, etc.) may be individually addressed so that each pixel appears transparent or white. The pixels that form the text and the sun/cloud image displayed by front display 150 in FIG. 10 may be configured to be substantially transparent. Those transparent pixels may appear dark or black by showing a black or optically absorbing surface of OLED display 140. The other pixels of front display 150 may be configured to appear substantially opaque or white, forming the white background illustrated in FIG. 10. In other particular embodiments, when display 110 is operating in a semi-static mode, pixels of front display 150 (which may a PDLC display, an electrochromic display, an electro-dispersive display, an electrowetting display, or an LCD in any of its phases (e.g., nematic, TN, STN, SmA, etc.) may be addressed so that each pixel appears transparent or black. The pixels that form the text and the sun/cloud image may be configured to be substantially black (or, optically absorbing), while the pixels that form white background pixels of front display 150 may be configured to be substantially transparent. OLED display 140 may be configured to reflect or scatter incident light so that the corresponding transparent pixels of front display 150 appear white.

Figure 11:
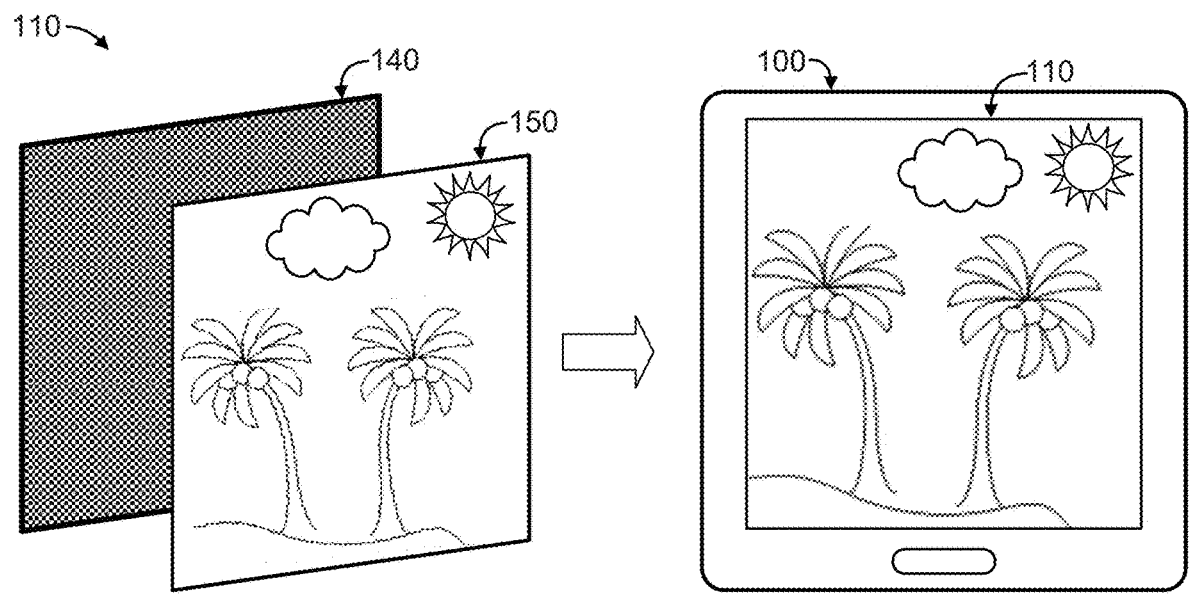
FIGS. 11 and 12 each illustrate an exploded view (on the left) of another example display and (on the right) a front view of an example display device with the example display.
Figure 12:
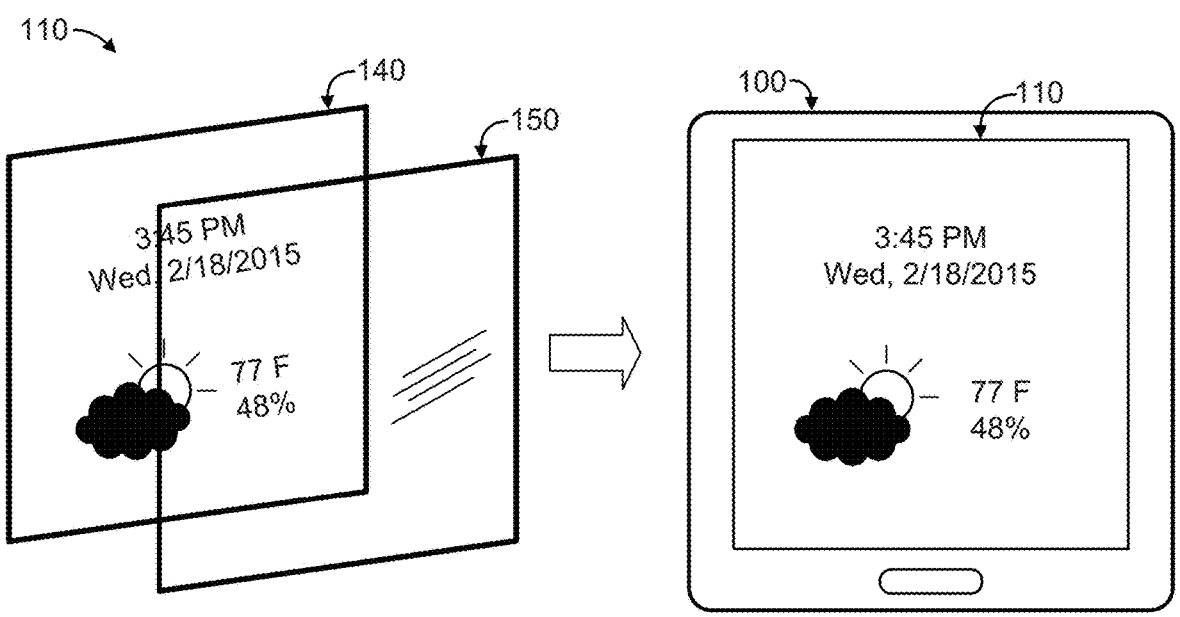

FIGS. 11 and 12 each illustrate an exploded view (on the left) of another example display 110 and (on the right) a front view of example display device 100 with the example display 110. In the examples of FIGS. 11 and 12, rear display 140 is an electrophoretic display. In particular embodiments, each pixel of electrophoretic display 140 may include a volume filled with a liquid in which white and black particles or capsules are suspended. The white and black particles may be electrically controllable, and by moving the particles within a pixel's volume, the pixel may be configured to appear white or black. As used herein, a white object (e.g., a particle or a pixel) may refer to an object that substantially reflects or scatters incident light or appears white, and a black object may refer to an object that substantially absorbs incident light or appears dark. In particular embodiments, the two colors of electrophoretic particles may each have a different affinity for positive or negative charges. As an example and not by way of limitation, the white particles may be attracted to positive charges or a positive side of an electric field, while the black particles may be attracted to negative charges or a negative side of an electric field. By applying an electric field orthogonal to a viewing surface of an electrophoretic pixel, either color of particles can be moved to the front surface of the pixel, while the other color is hidden from view in the back. As an example and not by way of limitation, a +5 V signal applied to an electrophoretic pixel may draw the white particles toward the front surface and cause the pixel to appear white. Similarly, a −5 V signal may draw the black particles toward the front surface of the pixel and cause the pixel to appear black.

In FIGS. 11 and 12, front display 150 is a transparent OLED display. In particular embodiments, a transparent OLED display may be an emissive display that is also substantially transparent. In particular embodiments, a transparent OLED display may refer to an OLED display that includes substantially transparent components. As an example and not by way of limitation, the cathode electrode of a transparent OLED pixel may be made from a semi-transparent metal, such as for example, a magnesium-silver alloy, and the anode electrode may be made from indium tin oxide (ITO). As another example and not by way of limitation, a transparent OLED pixel may include transparent thin-film transistors (TFTs) that may be made with a thin layer of zinc-tin-oxide. FIG. 11 illustrates display 110 operating in a dynamic (or, emissive) mode with transparent OLED display 150 showing an image or part of a video. When display 110 operates in a dynamic mode, electrophoretic display 140 may be configured to be substantially dark to provide a black background for the transparent OLED display 150 and improve the contrast of display 110. FIG. 12 illustrates display 110 operating in a semi-static mode. Transparent OLED display 150 is powered off and is substantially transparent, while the pixels of electrophoretic display 140 are configured to appear white or black to generate the text and image illustrated in FIG. 12.

Figure 13:
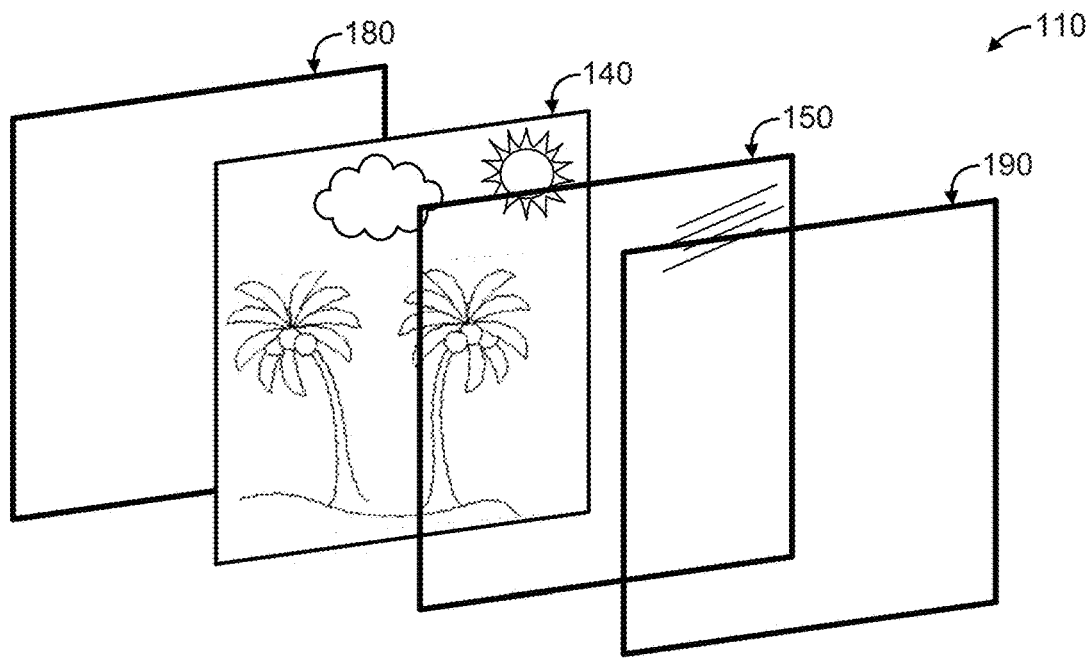
FIGS. 13 and 14 each illustrate an exploded view of another example display.
Figure 14:
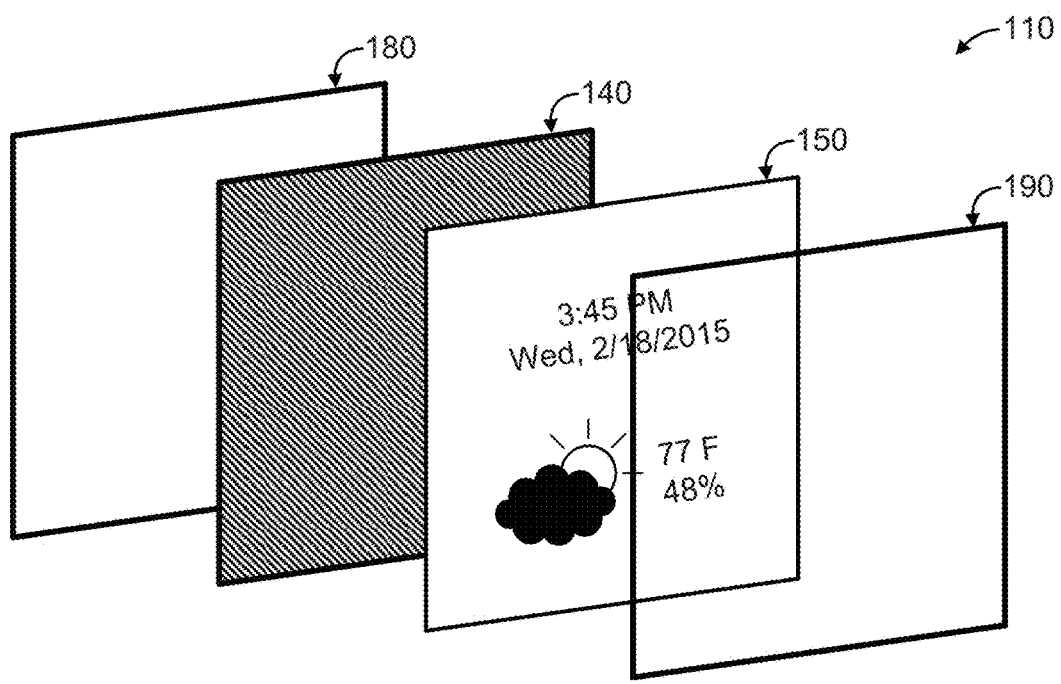

FIGS. 13 and 14 each illustrate an exploded view of another example display 110. In the example of FIG. 13, display 110 is operating in a dynamic mode and showing an image of a tropical scene, and in the example of FIG. 14, display 110 is operating in a semi-static mode. In particular embodiments, display 110 may include front display 150 (which may be a semi-static, or non-emissive display) and rear display 140 (which may be an LCD). In the example of FIGS. 13 and 14, front display 150 may be any suitable non-emissive (or, semi-static) display, such as for example, a PDLC display, an electrochromic display, an electro-dispersive display, an electrowetting display, or a LCD in any of its phases (e.g., nematic, TN, STN, SmA, etc.). When display 110 is operating in a dynamic mode, semi-static display 150 may be configured to be substantially transparent allowing light from LCD 140 to pass through semi-static display 150 so the image from LCD 140 can be viewed.

In particular embodiments, and as illustrated in FIG. 14, when display 110 is operating in a semi-static mode, pixels of front display 150 (which may be a PDLC display, an electrochromic display, an electro-dispersive display, an electrowetting display, or an LCD in any of its phases (e.g., nematic, TN, STN, SmA, etc.)) may be individually addressed so that each pixel appears transparent or white. The pixels that form the text and the sun/cloud image displayed by front display 150 in FIG. 14 may be configured to be substantially transparent. Those transparent pixels may appear dark or black by showing a black or optically absorbing surface of LCD 140. The other pixels of front display 150 may be configured to appear substantially opaque or white, forming the white background illustrated in FIG. 14. In other particular embodiments, when display 110 is operating in a semi-static mode, pixels of front display 150 (which may a PDLC display, an electrochromic display, an electro-dispersive display, an electrowetting display, or a LCD in any of its phases (e.g., nematic, TN, STN, SmA, etc.) may be addressed so that each pixel appears transparent or black. The pixels that form the text and the sun/cloud image may be configured to be substantially black (or, optically absorbing), while the pixels that form white background pixels of front display 150 may be configured to be substantially transparent. LCD 140 or surface 180 may be configured to reflect or scatter incident light so that the corresponding transparent pixels of front display 150 appear white.

In particular embodiments, display 110 may include back layer 180 located behind LCD 140, and back layer 180 may be a reflector or a backlight. As an example and not by way of limitation, back layer 180 may be a reflector, such as for example, a reflective surface (e.g., a surface with a reflective metal or dielectric coating) or an opaque surface configured to substantially scatter a substantial portion of incident light and appear white. In particular embodiments, display 110 may include semi-static display 150, LCD 140, and back layer 180, where back layer 180 is configured as a reflector that provides illumination for LCD 140 by reflecting ambient light to pixels of LCD 140. The light reflected by reflector 180 may be directed to pixels of LCD 140 which modulate the light from reflector 180 to generate images or text. In particular embodiments, display 110 may include frontlight 190 configured to provide illumination for LCD 140, where frontlight 190 includes a substantially transparent layer with illumination sources located on one or more edges of frontlight 190. As an example and not by way of limitation, display 110 may include LCD 140, semi-static display 150, reflector 180, and frontlight 190, where reflector 180 and frontlight 190 together provide illumination for LCD 140. Reflector 180 may provide illumination for LCD 140 by reflecting or scattering incident ambient light or light from frontlight 190 to pixels of LCD 140. If there is sufficient ambient light available to illuminate LCD 140, then frontlight 190 may be turned off or may operate at a reduced setting. If there is insufficient ambient light available to illuminate LCD 140 (e.g., in a darkened room), then frontlight 190 may be turned on to provide illumination, and the light from frontlight 190 may reflect off of reflector 180 and then illuminate pixels of LCD 140. In particular embodiments, an amount of light provided by frontlight 190 may be adjusted up or down based on an amount of ambient light present (e.g., frontlight may provide increased illumination as ambient light decreases). In particular embodiments, frontlight 190 may be used to provide illumination for semi-static display 150 if there is not enough ambient light present to be scattered or reflected by semi-static display 150. As an example and not by way of limitation, in a darkened room, frontlight 190 may be turned on to illuminate semi-static display 150.

In the example of FIGS. 13 and 14, back layer 180 may be a backlight configured to provide illumination for LCD 140. As an example and not by way of limitation, display 110 may include LCD 140, semi-static display 150, backlight 180, and frontlight 190. In particular embodiments, illumination for LCD 140 may be provided primarily by backlight 180, and frontlight 190 may be turned off when LCD 140 is operating. When display 110 is operating in a semi-static mode, backlight 180 may be turned off, and frontlight 190 may be turned off or may be turned on to provide illumination for semi-static display 150.

Figure 15:
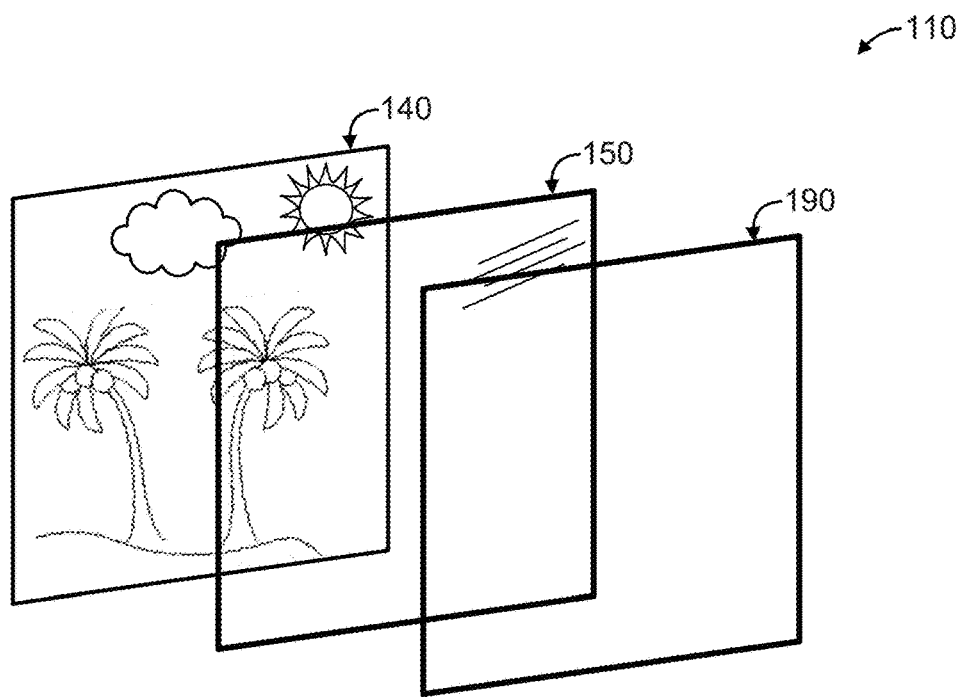
FIGS. 15 and 16 each illustrate an exploded view of another example display.
Figure 16:
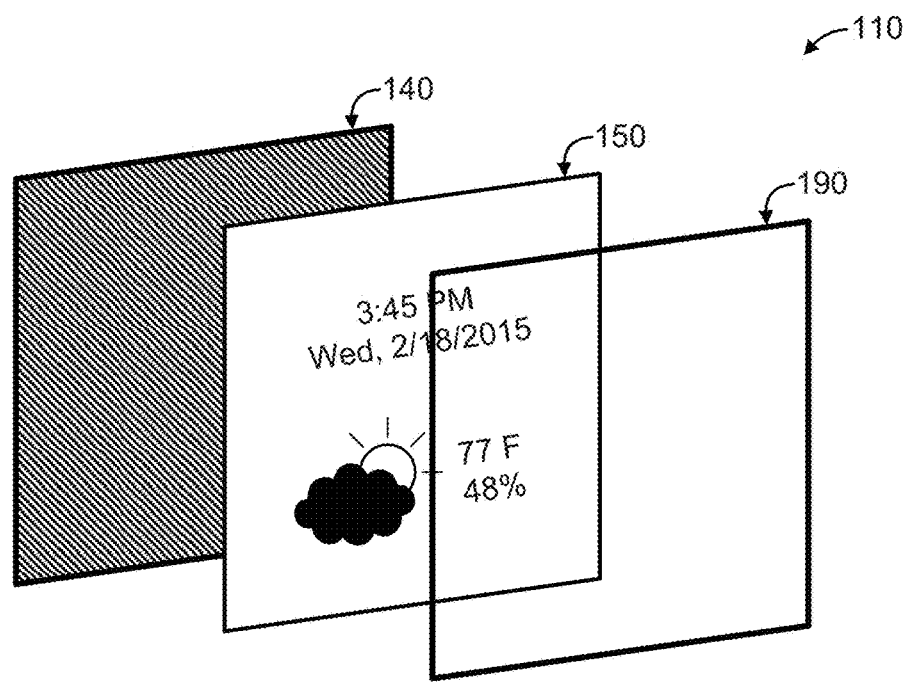

FIGS. 15 and 16 each illustrate an exploded view of another example display 110. In the example of FIG. 15, display 110 is operating in a dynamic mode and showing an image of a tropical scene, and in the example of FIG. 16, display 110 is operating in a semi-static mode. In particular embodiments, display 110 may include front display 150 (which may be a semi-static, or non-emissive, display) and rear display 140 (which may be an LED, OLED or QD display). In the example of FIGS. 15 and 16, front display 150 may be any suitable non-emissive (or, semi-static) display, such as for example, a PDLC display, an electrochromic display, an electro-dispersive display, an electrowetting display, or an LCD in any of its phases (e.g., nematic, TN, STN, SmA, etc.). In FIGS. 15 and 16, rear display 140 may be an OLED display, and when display 110 is operating in a dynamic mode, semi-static display 150 may be configured to be substantially transparent allowing light emitted by OLED display 140 to pass through semi-static display 150 so an image from OLED display 140 can be viewed.

In particular embodiments, and as illustrated in FIG. 16, when display 110 is operating in a semi-static mode, pixels of front display 150 (which may be a PDLC display, an electrochromic display, an electro-dispersive display, an electrowetting display, or an LCD in any of its phases (e.g., nematic, TN, STN, SmA, etc.)) may be individually addressed so that each pixel appears transparent or white, and OLED display 140 may be turned off and configured to appear substantially black. In other particular embodiments, when display 110 is operating in a semi-static mode, pixels of front display 150 may be addressed so that each pixel appears transparent or black, and OLED display 140 may be turned off and configured to appear substantially white. In particular embodiments and as illustrated in FIGS. 15 and 16, display 110 may include OLED display 140, semi-static display 150, and frontlight 190. In the example of FIG. 16, display 110 may include frontlight 190 to provide illumination for semi-static display 150 if there is not enough ambient light present to be scattered or reflected by semi-static display 150. When display 110 is operating in a semi-static mode, if there is sufficient ambient light available to illuminate semi-static display 150, then frontlight 190 may be turned off or may operate at a reduced setting. If there is insufficient ambient light available to illuminate semi-static display 150, then frontlight 190 may be turned on to provide illumination for semi-static display 150. In particular embodiments, an amount of light provided by frontlight 190 to semi-static display 150 may be adjusted up or down based on an amount of ambient light present.

Figure 17:
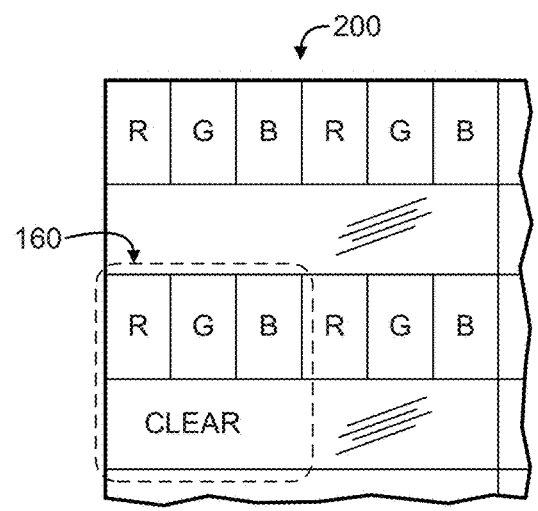
FIG. 17 illustrates a portion of an example partially emissive display.

FIG. 17 illustrates a portion of example partially emissive display 200. In particular embodiments, partially emissive display 200 may include partially emissive pixels 160, where each partially emissive pixel 160 includes one or more substantially transparent regions and one or more addressable regions configured to modulate or emit visible light. In the example of FIG. 17, a dashed line encompasses example partially emissive pixel 160, which includes a substantially transparent region (labeled "CLEAR") and an addressable region that includes a red ("R"), green ("G"), and blue ("B") subpixel. In particular embodiments, partially emissive display 200 may be a partially emissive LCD, and partially emissive LCD pixel 160 may include LCD subpixels, where each LCD subpixel is configured to modulate a particular color component (e.g., red, green, or blue). In other particular embodiments, partially emissive display 200 may be a partially emissive LED or OLED display with partially emissive LED or OLED pixels 160, respectively. Each partially emissive LED or OLED pixel 160 may include subpixels, each subpixel configured to emit a particular color component (e.g., red, green, or blue). In particular embodiments, transparent regions and addressable regions may occupy any suitable fraction of an area of partially emissive pixel 160. As an example and not by way of limitation, transparent regions may occupy ¼, ⅓, ½, ⅔, ¾, or any suitable fraction of the area of partially emissive pixel 160. Similarly, addressable regions may occupy ¼, ⅓, ½, ⅔, ¾, or any suitable fraction of the area of partially emissive pixel 160. In the example of FIG. 17, transparent regions and addressable regions each occupy approximately one half of the area of partially emissive pixel 160. In particular embodiments, a partially emissive display may be referred to as a partial display, and a partially emissive LCD or OLED display may be referred to as a partial LCD or a partial OLED display, respectively. Additionally, a partially emissive pixel may be referred to as a partial pixel, and a partially emissive LCD, OLED or QD pixel may be referred to as a partial LCD pixel or a partial OLED pixel, respectively.

Figure 18A:
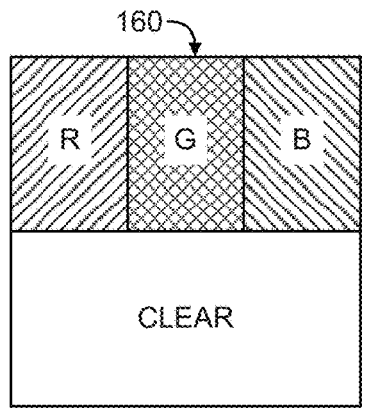
FIGS. 18A-18E illustrate example partially emissive pixels.
Figure 18B:
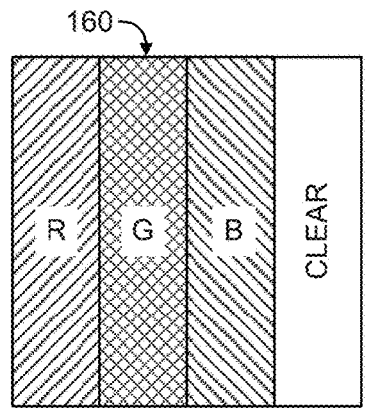
Figure 18C:
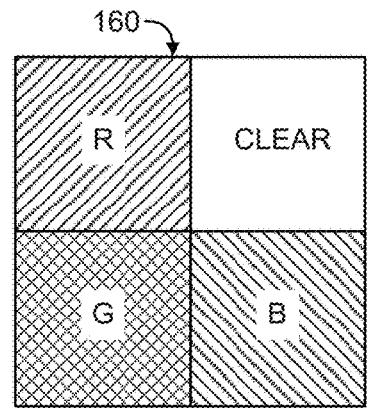
Figure 18D:
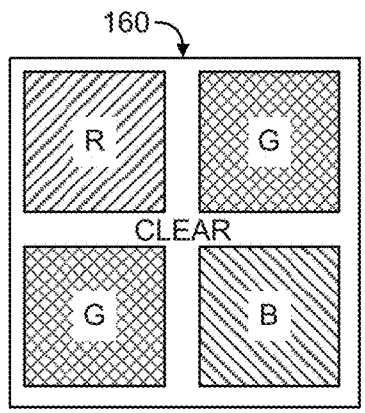
Figure 18E:
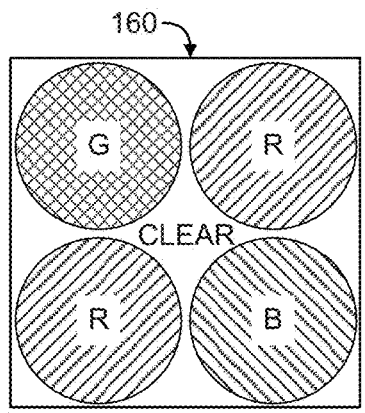

FIGS. 18A-18E illustrate example partially emissive pixels 160. In particular embodiments, partially emissive pixels 160 may have any suitable shape, such as for example, square, rectangular, or circular. The example partially emissive pixels 160 illustrated in FIGS. 18A-18E have subpixels and transparent regions with various arrangements, shapes, and sizes. FIG. 18A illustrates partially emissive pixel 160 similar to the partially emissive pixel 160 illustrated in FIG. 17. In FIG. 18A, partially emissive pixel 160 includes three adjacent rectangular subpixels ("R," "G," and "B") and a transparent region located below the three subpixels, the transparent region having approximately the same size as the three subpixels. In FIG. 18B, partially emissive pixel 160 includes three adjacent rectangular subpixels and a transparent region located adjacent to the blue subpixel, the transparent region having approximately the same size and shape as each of the subpixels. In FIG. 18C, partially emissive pixel 160 is subdivided into four quadrants with three subpixels occupying three of the quadrants and the transparent region located in a fourth quadrant. In FIG. 18D, partially emissive pixel 160 has four square-shaped subpixels with the transparent region located in between and around the four subpixels. In FIG. 18E, partially emissive pixel 160 has four circular subpixels with the transparent region located in between and around the four subpixels. Although this disclosure describes and illustrates particular partially emissive pixels having particular subpixels and transparent regions with particular arrangements, shapes, and sizes, this disclosure contemplates any suitable partially emissive pixels having any suitable subpixels and transparent regions with any suitable arrangements, shapes, and sizes.

FIGS. 19-23 each illustrate an exploded view of example display 110. The example displays 110 in FIGS. 19-23 each include a partially emissive display configured as a front display 150 or a rear display 140. In particular embodiments, a partially emissive display may function as an emissive display, and additionally, the transparent regions of a partially emissive display may allow a portion of ambient light or light from a frontlight or backlight to be transmitted through a partially emissive display. In particular embodiments, ambient light (e.g., light from one or more sources located outside of display 110) may pass through transparent regions of a partially emissive display, and the ambient light may be used to illuminate pixels of the partially emissive display or pixels of another display (e.g., an electrophoretic display).

In particular embodiments, display 110 may include a partially transparent display configured as a front display 150 or a rear display 140. Each pixel of a partially transparent display may have one or more semi-static, addressable regions that may be configured to appear white, black, or transparent. Additionally, each pixel of a partially transparent display may have one or more substantially transparent regions that allow ambient light or light from a frontlight or backlight to pass through. As an example and not by way of limitation, a partially transparent electrophoretic display may function as a semi-static display with pixels that may be configured to appear white or black. Additionally, each pixel of a partially transparent electrophoretic display may have one or more transparent regions (similar to the partially emissive pixels described above) which may transmit a portion of ambient light or light from a frontlight or backlight. In particular embodiments, display 110 may include a partially emissive display and a partially transparent electrophoretic display, and pixels of the two displays may be aligned with respect to each other so their respective addressable regions are substantially non-overlapping and their respective transparent regions are substantially non-overlapping. As an example and not by way of limitation, a transparent region of a partially emissive pixel may transmit light that illuminates an electrophoretic region of a partially transparent pixel, and similarly, a transparent region of a partially transparent pixel may transmit light that illuminates the subpixels of a partially emissive LCD pixel. In particular embodiments, a partially transparent electrophoretic display may be referred to as a partial electrophoretic display.

In particular embodiments, display 110 may include a segmented backlight with regions configured to produce illumination light and other regions configured to not produce light. In particular embodiments, a segmented backlight may be aligned with respect to a partial LCD so that the light-producing regions of the segmented backlight are aligned to illuminate the subpixels of the partial LCD. As an example and not by way of limitation, a segmented backlight may produce light in strips, and each strip of light may be aligned to illuminate a corresponding strip of subpixels of a partial LCD. Although this disclosure describes and illustrates particular displays that include particular combinations of partially emissive displays, partially transparent displays, and segmented backlights, this disclosure contemplates any suitable displays that include any suitable combinations of partially emissive displays, partially transparent displays, or segmented backlights.

Figure 19:
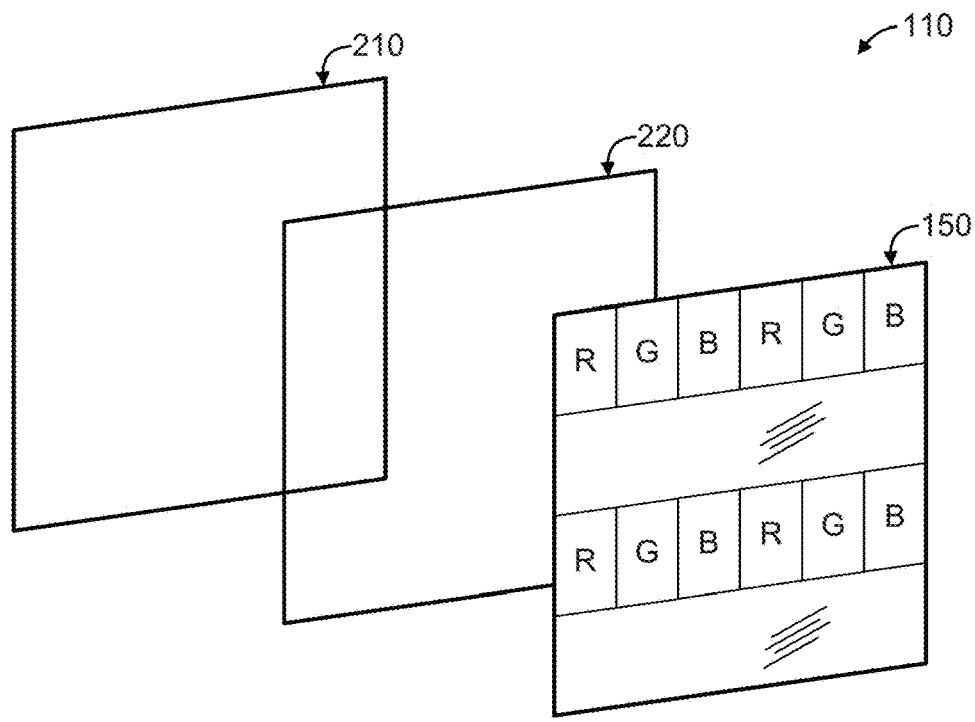
FIGS. 19-23 each illustrate an exploded view of an example display.

The example display 110 in FIG. 19 includes partial LCD 150, layer 210, and layer 220. In the example of FIG. 19, layer 210 may be a reflector (e.g., a reflective surface configured to reflect incident light), and layer 220 may be a frontlight. As an example and not by way of limitation, a reflector may reflect approximately 70%, 80%, 90%, 95%, or any suitable percentage of incident light. When display 110 in FIG. 19 is operating in an emissive mode, frontlight 220 is turned on and illuminates reflector 210, and reflector 210 reflects the light from frontlight 190 to partial LCD 150, which modulates the light to emit an image, a video, or other content. In an emissive mode, ambient light (that is transmitted through transparent regions of display 150) may also be used to illuminate partial LCD 150. When display 110 is operating in a semi-static mode, frontlight 220 is powered off, and ambient light (e.g., room light or sunlight) passes through the transparent regions of partial LCD 150. The ambient light passes through frontlight 220, which is substantially transparent, and reflects off of reflector 210. The reflected light illuminates partial LCD 150, which modulates the light to produce text, an image, or other content. In a non-emissive mode, display 110 may require little electrical power since frontlight is powered off and partial LCD 150 may not require significant power to operate.

In other particular embodiments, in FIG. 19, layer 210 may be a backlight, and layer 220 may be a transflector located between backlight 210 and partial LCD 150. A transflector may refer to a layer that partially reflects and partially transmits incident light. As examples and not by way of limitation, a transflector may include a glass substrate with a reflective coating covering portions of the substrate, a half-silvered mirror that is partially transmissive and partially reflective, or a wire-grid polarizer. In particular embodiments, a transflector may transmit or reflect any suitable fraction of incident light. As an example and not by way of limitation, transflector 220 may reflect approximately 50% of incident light and may transmit approximately 50% of incident light. In the example of FIG. 19, when display 110 is operating in an emissive mode, backlight 210 may be turned on and may send light through transflector 220 to illuminate partial LCD 150. In particular embodiments, the light from backlight 210 may be reduced or turned off if there is sufficient ambient light available to illuminate partial LCD 150. When display 110 is operating in a semi-static mode, backlight 210 may be turned off, and transflector 220 may illuminate partial LCD 150 by reflecting ambient light to partial LCD 150. Ambient light (e.g., light originating from outside display 110) may be transmitted into display 110 via transparent regions of partial LCD 150.

Figure 20:
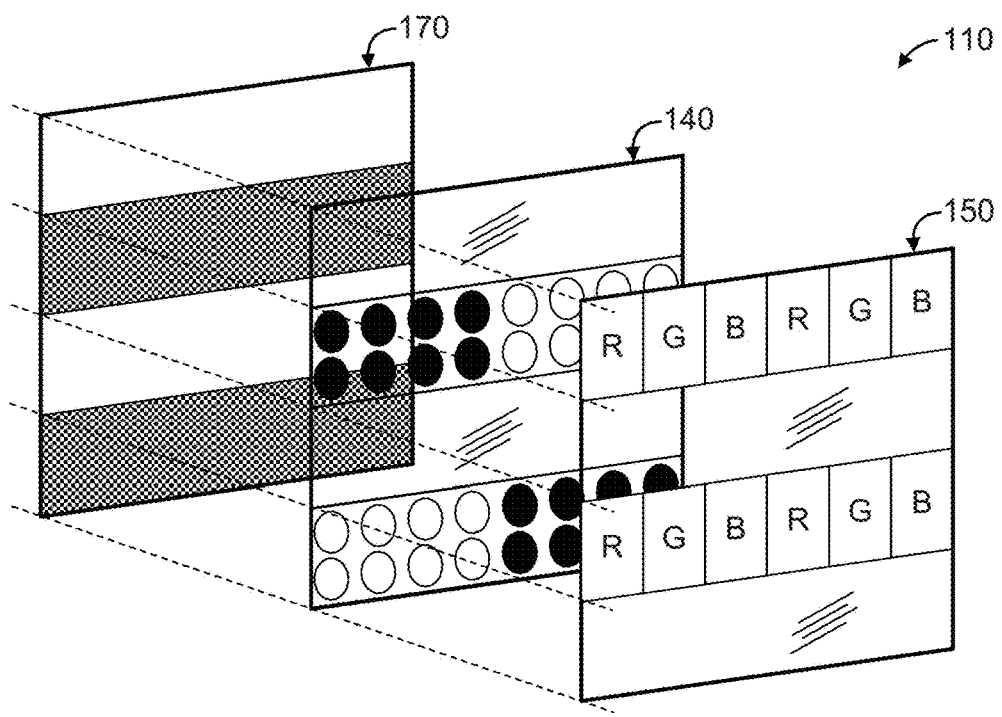

In the example of FIG. 20, front display 150 is a partially emissive LCD, and rear display 140 is a partially transparent electrophoretic display with pixels configured to appear white or black. The example display 110 in FIG. 20 includes partial LCD 150, partial electrophoretic display 140, and segmented backlight 170. In particular embodiments, the pixels of partial LCD 150 and partial electrophoretic display 140 may be the same size, and the pixels may be aligned with respect to one another. The pixels may be aligned so that their borders are situated directly over or under one another and so that the transparent regions of pixels of one display are superposed with the addressable regions of pixels of the other display, and vice versa. When display 110 in FIG. 20 is operating in an emissive mode, segmented backlight 170 is turned on, and the lighted strips of segmented backlight 170 produce light that propagates through transparent regions of partial electrophoretic display 140 and illuminates the subpixels of partial LCD 150, which modulates the light to produce an image or other content. The darker regions of segmented backlight 170 do not produce light. When display 110 is operating in an emissive mode, the pixels of partial electrophoretic display 140 may be configured to appear white or black. When display 110 is operating in a semi-static mode, segmented backlight 170 and partial LCD 150 are powered off, and ambient light passes through the transparent regions of partial LCD 150 to illuminate the addressable regions of the pixels of partial electrophoretic display 140. Each pixel of partial electrophoretic display 140 may be configured to appear white or black so that partial electrophoretic display 140 produces text, an image, or other content.

Figure 21:
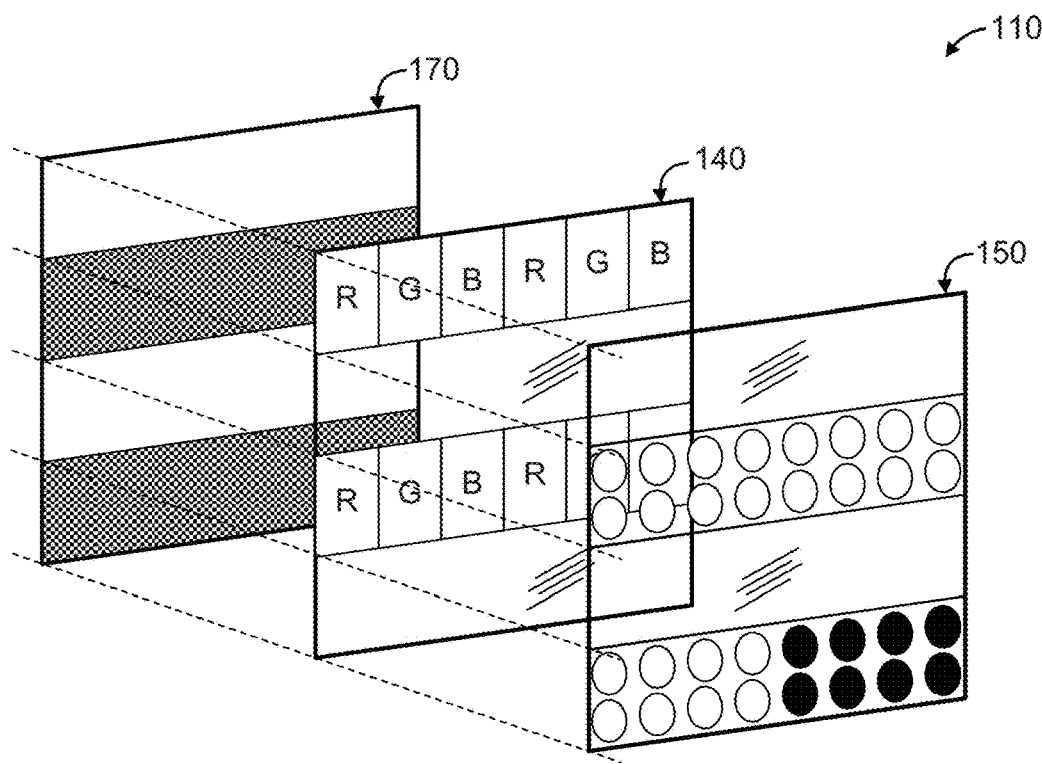

In the example of FIG. 21, rear display 140 is a partially emissive LCD, and front display 150 is a partially transparent electrophoretic display with pixels configured to appear white or black. The example display 110 in FIG. 21 includes partial LCD 140, partial electrophoretic display 150, and segmented backlight 170. In particular embodiments, the pixels of partial LCD 140 and partial electrophoretic display 150 may be the same size, and the pixels (and their respective transparent regions and addressable regions) may be aligned with respect to one another. When display 110 in FIG. 21 is operating in an emissive mode, segmented backlight 170 is turned on, and the lighted strips of segmented backlight 170 produce light that illuminates the subpixels of partial LCD 140. The subpixels modulate the light to produce an image or other content, which propagates through the transparent regions of partial electrophoretic display 150. The darker regions of segmented backlight 170 do not produce light. When display 110 is operating in an emissive mode, the pixels of partial electrophoretic display 150 may be configured to appear white or black. When display 110 is operating in a semi-static mode, segmented backlight 170 and partial LCD 150 are powered off, and ambient light illuminates the addressable regions of the pixels of partial electrophoretic display 150. Ambient light that propagates through the transparent regions of partial electrophoretic display 150 may be absorbed or reflected by the subpixels of partial LCD 140.

Figure 22:
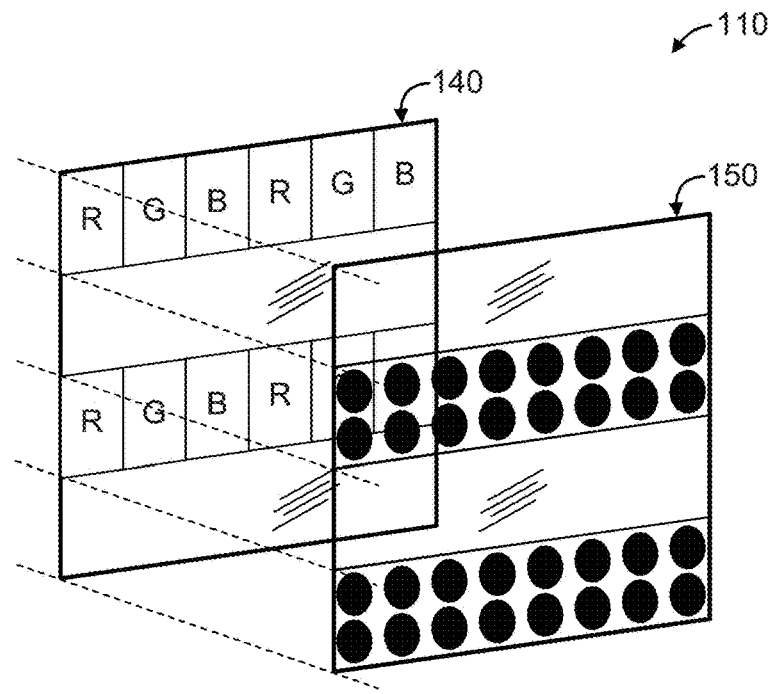

In the example of FIG. 22, rear display 140 is a partially emissive OLED display, and front display 150 is a partially transparent electrophoretic display. The example display 110 in FIG. 22 includes partial OLED display 140 and partial electrophoretic display 150. In particular embodiments, the pixels of partial OLED display 140 and partial electrophoretic display 150 may be the same size, and the pixels (and their respective transparent and addressable regions) may be aligned with respect to one another. When display 110 in FIG. 22 is operating in an emissive mode, the subpixels of partial OLED display 140 may emit light that propagates through the transparent regions of partial electrophoretic display 150. When display 110 is operating in an emissive mode, the pixels of partial electrophoretic display 150 may be configured to appear white or black. When display 110 is operating in a semi-static mode, partial OLED display 140 may be powered off, and ambient light illuminates the addressable regions of the pixels of partial electrophoretic display 150, which are each configured to appear black or white. Ambient light that propagates through the transparent regions of partial electrophoretic display 150 may be absorbed, scattered, or reflected by the subpixels of partial OLED display 140.

Figure 23:
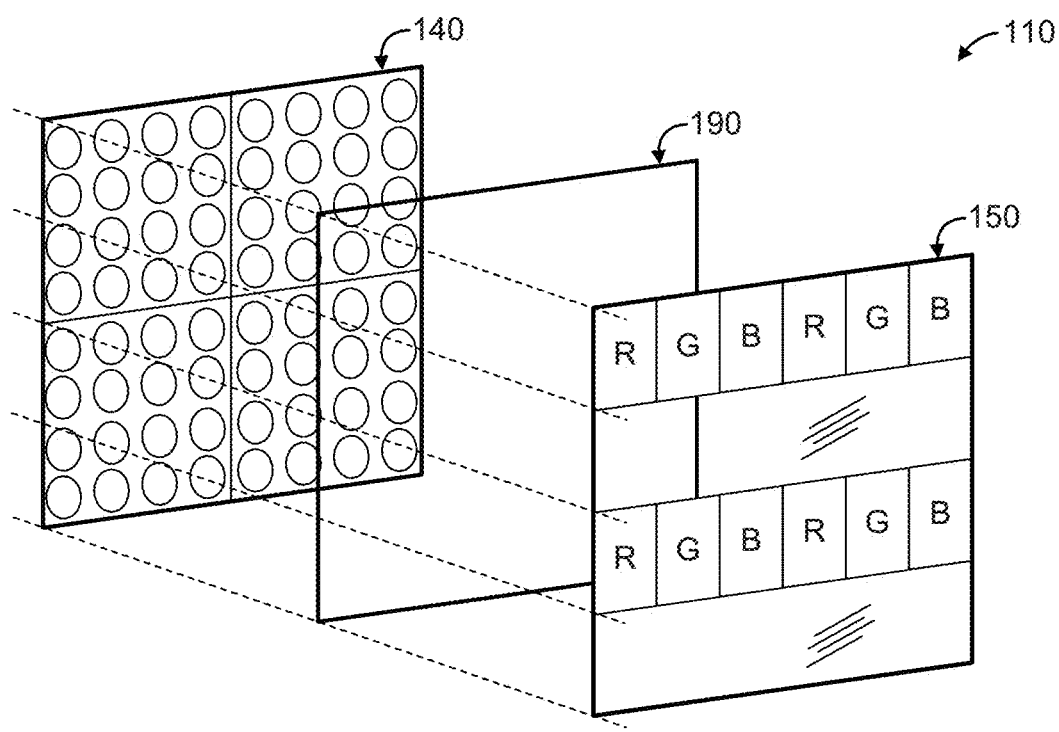

In the example of FIG. 23, rear display 140 is an electrophoretic display, and front display 150 is a partially transparent LCD 150. The example display 110 in FIG. 23 includes electrophoretic display 140, frontlight 190, and partial LCD 150. In particular embodiments, electrophoretic display 140 may be a partial electrophoretic display or (as illustrated in FIG. 23) may be an electrophoretic display with little or no transparent regions. In particular embodiments, the pixels of electrophoretic display 140 and partial LCD 150 may be aligned with respect to one another. When display 110 in FIG. 22 is operating in an emissive mode, backlight 190 may be turned on to illuminate electrophoretic display 140, and electrophoretic display 140 may be configured so that its pixels are white so they scatter or reflect the light from the backlight forward to partial LCD 150. The subpixels of partial LCD 150 modulate the incident light scattered by electrophoretic display 140 to produce an image or other content. When display 110 is operating in a semi-static mode, backlight 190 and partial LCD 150 may be powered off. Electrophoretic display 140 is illuminated by ambient light that is transmitted through the transparent regions of partial LCD 150 and through frontlight 190. The pixels of electrophoretic display 140 are configured to appear white or black to generate text or an image that propagates through frontlight 190 and the transparent regions of partial LCD 150.

In particular embodiments, a display screen may be incorporated into an appliance (e.g., in a door of a refrigerator) or part of an automobile (e.g., in a windshield or mirror of a car). As an example and not by way of limitation, a display screen may be incorporated into an automobile windshield to provide overlaid information over a portion of the windshield. In one mode of operation, the display screen may be substantially transparent, and in another mode of operation, the display screen pixels may be configured to display information that may be viewed by a driver or passenger. In particular embodiments, a display screen may include multiple pixels, where each pixel may be configured to be substantially transparent to incident light or to be at least partially opaque or substantially opaque to incident light. As an example and not by way of limitation, a semi-static display may include multiple semi-static pixels, where the semi-static pixels may be configured to be substantially transparent or opaque. In particular embodiments, a display screen configured to operate in two or more modes, where one of the modes includes pixels of the display screen appearing transparent, may be referred to as a display with high transparency. In particular embodiments, when a pixel is in a mode in which it is substantially transparent to visible light, the pixel may not: emit or generate visible light; modulate one or more frequencies (i.e., colors) of visible light; or both In particular embodiments, a material or pixel that is at least partially opaque may refer to a material or pixel that is partially transparent to visible light and partially reflects, scatters, or absorbs visible light. As an example and not by way of limitation, a pixel that is partially opaque may appear partially transparent and partially black or white. A material or pixel that is substantially opaque may be a material or pixel that reflects, scatters, or absorbs substantially all incident visible light and transmits little or no light. In particular embodiments, scattering or reflection of light from an opaque material may refer to a specular reflection, a diffuse reflection (e.g., scattering incident light in many different directions), or a combination of specular and diffuse reflections. As examples and not by way of limitation, an opaque material that is substantially absorbing may appear black, and an opaque material that scatters or reflects substantially all incident light may appear white.

FIGS. 24A-24B each illustrate a side view of example polymer-dispersed liquid-crystal (PDLC) pixel 160. In particular embodiments, a PDLC display may include multiple PDLC pixels 160 arranged to form a display screen, where each PDLC pixel 160 may be individually addressable (e.g., using an active-matrix or a passive-matrix scheme). In the examples of FIGS. 24A and 24B, PDLC pixel 160 includes substrates 300 (e.g., a thin sheet of transparent glass or plastic), electrodes 310, liquid-crystal (LC) droplets 320, and polymer 330. Electrodes 310 are substantially transparent and may be made of a thin film of transparent material, such as for example ITO, which is deposited onto a surface of substrate 300. LC droplets 320 are suspended in a solidified polymer 330, where the concentrations of LC droplets 320 and polymer 330 may be approximately equal. In particular embodiments, PDLC pixel 160 may be substantially opaque when little or no voltage is applied between electrodes 310 (e.g., pixel 160 may appear white or black), and PDLC pixel 160 may be substantially transparent when a voltage is applied between electrodes 310. In FIG. 24A, when the two electrodes 310 are coupled together so there is little or no voltage or electric field between the electrodes, incident light ray 340 is blocked by randomly oriented LC droplets 320 that may scatter or absorb light ray 340. In this "off" state, PDLC pixel 160 is substantially opaque or non-transmissive and may appear white (e.g., by scattering most of the incident light) or black (e.g., by absorbing most of the incident light). In FIG. 24B, when a voltage (e.g., 5 V) is applied between electrodes 310, the resulting electric field causes LC droplets 320 to align so that incident light ray 340 is transmitted through PDLC pixel 160. In this "on" state, PDLC pixel 160 may be at least partially transparent. In particular embodiments, the amount of transparency of PDLC pixel 160 may be controlled by adjusting the applied voltage (e.g., a higher applied voltage results in a higher amount of transparency). As an example and not by way of limitation, PDLC pixel 160 may be 50% transparent (e.g., may transmit 50% of incident light) with an applied voltage of 2.5 V, and PDLC pixel 160 may be 90% transparent with an applied voltage of 5 V.

In particular embodiments, a PDLC material may be made by adding high molecular-weight polymers to a low-molecular weight liquid crystal. Liquid crystals may be dissolved or dispersed into a liquid polymer followed by a solidification process (e.g., polymerization or solvent evaporation). During the change of the polymer from liquid to solid, the liquid crystals may become incompatible with the solid polymer and form droplets (e.g., LC droplets 320) dispersed throughout the solid polymer (e.g., polymer 330). In particular embodiments, a liquid mix of polymer and liquid crystals may be placed between two layers, where each layer includes substrate 300 and electrode 310. The polymer may then be cured, thereby forming a sandwich structure of a PDLC device as illustrated in FIGS. 24A-24B.

A PDLC material may be considered part of a class of materials referred to as liquid-crystal polymer composites (LCPCs). A PDLC material may include about the same relative concentration of polymer and liquid crystals. Another type of LCPC is polymer-stabilized liquid crystal (PSLC), in which concentration of the polymer may be less than 10% of the LC concentration. Similar to a PDLC material, a PSLC material also contains droplets of LC in a polymer binder, but the concentration of the polymer is considerably less than the LC concentration. Additionally, in a PSLC material, the LCs may be continuously distributed throughout the polymer rather than dispersed as droplets. Adding the polymer to an LC to form a phase-separated PSLC mixture creates differently oriented domains of the LC, and light may be scattered from these domains, where the size of the domains may determine the strength of scattering. In particular embodiments, a pixel 160 may include a PSLC material, and in an "off" state with no applied electric field, a PSLC pixel 160 may appear substantially transparent. In this state, liquid crystals near the polymers tend to align with the polymer network in a stabilized configuration. A polymer-stabilized homogeneously aligned nematic liquid crystal allows light to pass through without being scattered because of the homogeneous orientation of both polymer and LC. In an "on" state with an applied electric field, a PSLC pixel 160 may appear substantially opaque. In this state, the electric field applies a force on the LC molecules to align with the vertical electric field. However, the polymer network tries to hold the LC molecules in a horizontal homogeneous direction. As a result, a multi-domain structure is formed where LCs within a domain are oriented uniformly, but the domains are oriented randomly. In this state, incident light encounters the different indices of refraction of the domains and the light is scattered. Although this disclosure describes and illustrates particular polymer-stabilized liquid crystal materials configured to form particular pixels having particular structures, this disclosure contemplates any suitable polymer-stabilized liquid crystal materials configured to form any suitable pixels having any suitable structures.

In one or more embodiments, LC droplets 320 of FIGS. 24A-24B are not dyed. Accordingly, the pixel appears white when controlled to be in an opaque state. The LC droplets, for example, scatter the light. In one or more embodiments, a dye is added to LC droplets 320. The dye is colored. The dye helps to absorb light and also scatters non-absorbed light. Example colors for the dye include, but are not limited to, black, white, silver (e.g., TiO2), red, green, blue, cyan, magenta, and yellow. With the addition of a dye to LC droplets 320 and the pixel controlled to be in an opaque state, the pixel appears to be the color of the dye that is used.

In one or more embodiments, a PDLC display is capable of including one or more pixels that do not include dye. In one or more embodiments, a PDLC display is capable of including one or more pixels where each pixel includes dye. In one or more embodiments, a PDLC display is capable of including a plurality of pixels where only some, e.g., a subset of pixels of the display, include dye. Further, in particular embodiments, different dyes may be used for different pixels. For example, a PDLC display is capable of having one or more pixels including a first dye color, one or more pixels including a second and different dye color, etc. The PDLC display can include more than two differently dyed pixels. A PDLC display, for example, is capable of including one or more pixels dyed black, one or more pixels dyed white, one or more pixels dyed silver, one or more pixels dyed red, one or more pixels dyed green, one or more pixels dyed blue, one or more pixels dyed cyan, one or more pixels dyed magenta, one or more pixels dyed yellow, or any combination of the foregoing.

FIG. 25 illustrates a side view of example electrochromic pixel 160. In particular embodiments, an electrochromic display may include electrochromic pixels 160 arranged to form a display screen, where each electrochromic pixel 160 may be individually addressable (e.g., using an active-matrix or a passive-matrix scheme). In the example of FIG. 25, electrochromic pixel 160 includes substrates 300 (e.g., a thin sheet of transparent glass or plastic), electrodes 310, ion storage layer 350, ion conductive electrolyte 360, and electrochromic layer 370. Electrodes 310 are substantially transparent and may be made of a thin film of ITO, which is deposited onto a surface of substrate 300. Electrochromic layer 370 includes a material that exhibits electrochromism (e.g., tungsten oxide, nickel-oxide materials, or polyaniline), where electrochromism refers to a reversible change in color when a burst of electric charge is applied to a material. In particular embodiments, in response to an applied charge or voltage, electrochromic pixel 160 may change between a substantially transparent state (e.g., incident light 340 propagates through electrochromic pixel 160) and an opaque, colored, or translucent state (e.g., incident light 340 may be partially absorbed, filtered, or scattered by electrochromic pixel 160). In particular embodiments, in an opaque, colored, or translucent state, electrochromic pixel 160 may appear blue, silver, black, white, or any other suitable color. Electrochromic pixel 160 may change from one state to another when a burst of charge or voltage is applied to electrodes 310 (e.g., switch in FIG. 25 may be closed momentarily to apply a momentary voltage between electrodes 310). In particular embodiments, once a state of electrochromic pixel 160 has been changed with a burst of charge, electrochromic pixel 160 may not require any power to maintain its state, and so, electrochromic pixel 160 may only require power when changing between states. As an example and not by way of limitation, once the electrochromic pixels 160 of an electrochromic display have been configured (e.g., to be either transparent or white) so the display shows some particular information (e.g., an image or text), the displayed information can be maintained in a static mode without requiring any power or refresh of the pixels.

Figure 26:
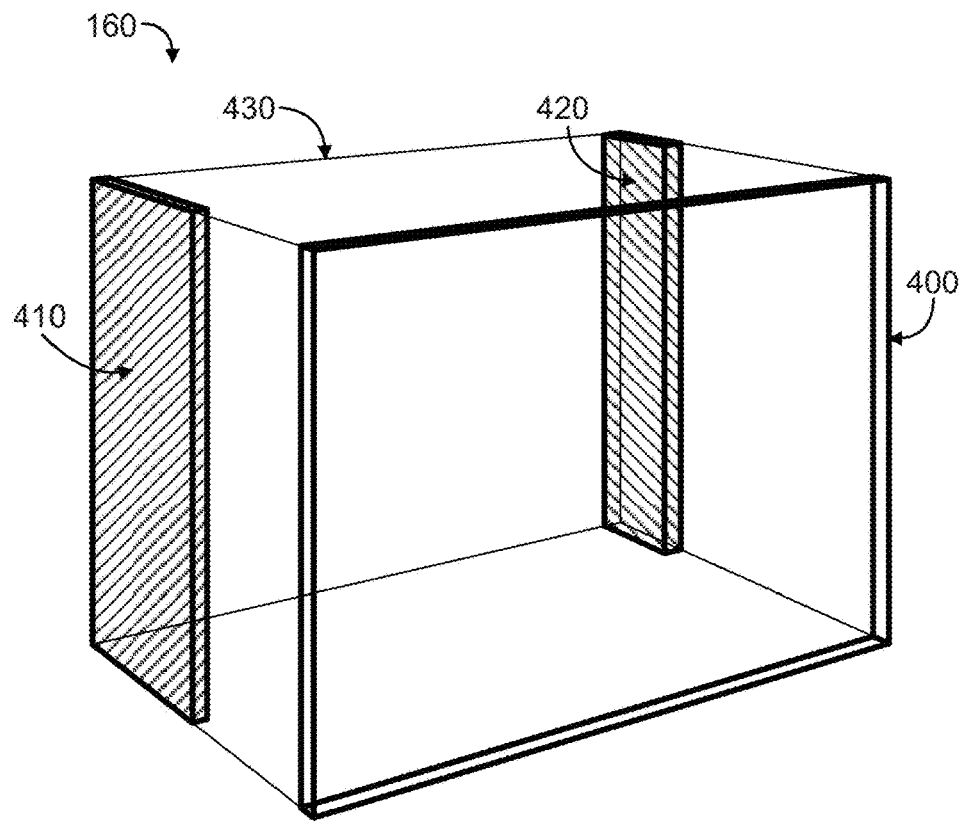
FIG. 26 illustrates a perspective view of an example electro-dispersive pixel.

FIG. 26 illustrates a perspective view of example electro-dispersive pixel 160. In particular embodiments, an electro-dispersive display may include multiple electro-dispersive pixels 160 arranged to form a display screen, where each electro-dispersive pixel 160 may be individually addressable (e.g., using an active-matrix or a passive-matrix scheme). As an example and not by way of limitation, electro-dispersive pixel 160 may include two or more electrodes to which voltages may be applied through an active or passive matrix. In particular embodiments, electro-dispersive pixel 160 may include front electrode 400, attractor electrode 410, and pixel enclosure 430. Front electrode 400 may be oriented substantially parallel to a viewing surface of the display screen, and front electrode 400 may be substantially transparent to visible light. As an example and not by way of limitation, front electrode 400 may be made of a thin film of ITO, which may be deposited onto a front or back surface of pixel enclosure 430. Attractor electrode 410 may be oriented at an angle with respect to front electrode 400. As an example and not by way of limitation, attractor electrode 410 may be approximately orthogonal to front electrode 400 (e.g., oriented at approximately 90 degrees with respect to front electrode 400). In particular embodiments, electro-dispersive pixel 160 may also include disperser electrode 420 disposed on a surface of enclosure 430 opposite attractor electrode 410. Attractor electrode 410 and disperser electrode 420 may each be made of a thin film of ITO or a thin film of other conductive material (e.g., gold, silver, copper, chrome, or a conductive form of carbon).

In particular embodiments, pixel enclosure 430 may be located at least in part behind or in front of front electrode 400. As an example and not by way of limitation, enclosure 430 may include several walls that contain an interior volume bounded by the walls of enclosure 430, and one or more electrodes may be attached to or deposited on respective surfaces of walls of enclosure 430. As an example and not by way of limitation, front electrode 400 may be an ITO electrode deposited on an interior surface (e.g., a surface that faces the pixel volume) or an exterior surface of a front or back wall of enclosure 430. In particular embodiments, front or back walls of enclosure 430 may refer to layers of pixel 160 that incident light may travel through when interacting with pixel 160, and the front or back walls of enclosure 430 may be substantially transparent to visible light. Thus, in particular embodiments, pixel 160 may have a state or mode in which it is substantially transparent to visible light and does not: emit or generate visible light; modulate one or more frequencies (i.e., colors) of visible light; or both. As another example and not by way of limitation, attractor electrode 410 or disperser electrode 420 may each be attached to or deposited on an interior or exterior surface of a side wall of enclosure 430.

Figure 27:
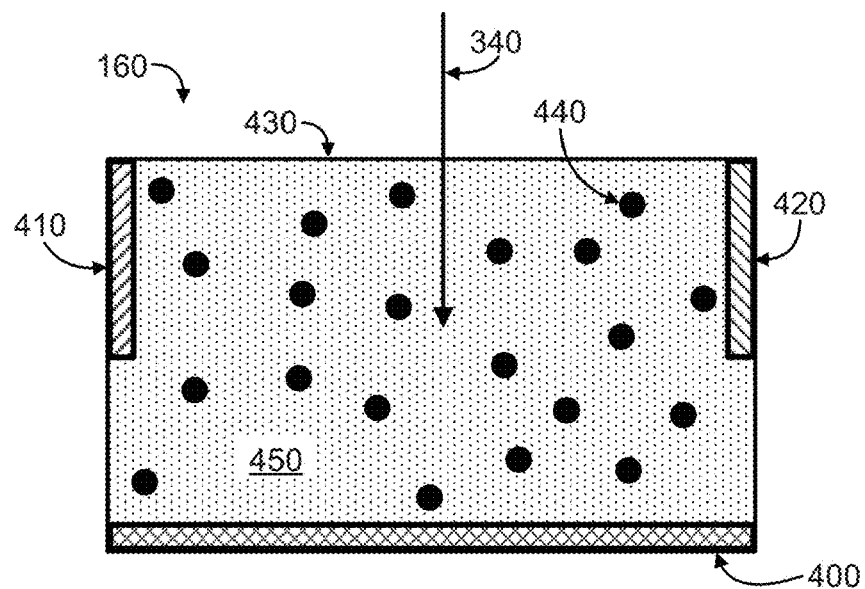
FIG. 27 illustrates a top view of the example electro-dispersive pixel of FIG. 26.

FIG. 27 illustrates a top view of example electro-dispersive pixel 160 of FIG. 26. In particular embodiments, enclosure 430 may contain an electrically controllable material that is moveable within a volume of the enclosure, and the electrically controllable material may be at least partially opaque to visible light. As an example and not by way of limitation, the electrically controllable material may be reflective or may be white, black, gray, blue, or any other suitable color. In particular embodiments, pixels 160 of a display may be configured to receive a voltage applied between front electrode 400 and attractor electrode 410 and produce an electric field based on the applied voltage, where the electric field extends, at least in part, through the volume of pixel enclosure 430. In particular embodiments, the electrically controllable material may be configured to move toward front electrode 400 or attractor electrode 410 in response to an applied electric field. In particular embodiments, the electrically controllable material may include opaque particles 440 that are white, black, or reflective, and the particles may be suspended in a transparent fluid 450 contained within the pixel volume. As an example and not by way of limitation, electro-dispersive particles 440 may be made of titanium dioxide (which may appear white) and may have a diameter of approximately 1 µm. As another example and not by way of limitation, electro-dispersive particles 440 may be made of any suitable material and may be coated with a colored or reflective coating. Particles 440 may have any suitable size, such as for example, a diameter of 0.1 µm, 1 µm, or 10 µm. Particles 440 may have any suitable range of diameters (such as for example diameters ranging from 1 µm to 2 µm). Although this disclosure describes and illustrates particular electro-dispersive particles having particular compositions and particular sizes, this disclosure contemplates any suitable electro-dispersive particles having any suitable compositions and any suitable sizes. In particular embodiments, the operation of electro-dispersive pixel 160 may involve electrophoresis, where particles 440 have an electrical charge or an electrical dipole, and the particles may be moved using an applied electric field. As an example and not by way of limitation, particles 440 may have a positive charge and may be attracted to a negative charge or the negative side of an electric field. Alternately, particles 440 may have a negative charge and may be attracted to a positive charge or the positive side of an electric field. When electro-dispersive pixel 160 is configured to be transparent, particles 440 may be moved to attractor electrode 410, allowing incident light (e.g., light ray 340) to pass through pixel 160. When pixel 160 is configured to be opaque, particles 440 may be moved to front electrode 400, scattering or absorbing incident light.

In one or more embodiments, particles 440 of FIG. 27 are not dyed. Accordingly, the pixel appears white when controlled to be in an opaque state. Particles 440, for example, scatter the light. In one or more embodiments, a dye is added to particles 440. The dye is colored. The dye helps to absorb light and also scatters non-absorbed light. Example colors for the dye include, but are not limited to, black, white, silver (e.g., TiO2), red, green, blue, cyan, magenta, and yellow. With the addition of a dye to particles 440 and the pixel controlled to be in an opaque state, the pixel appears to be the color of the dye that is used.

In one or more embodiments, an electro-dispersive display is capable of including one or more pixels that do not include dye. In one or more embodiments, an electro-dispersive display is capable of including one or more pixels where each pixel includes dye. In one or more embodiments, an electro-dispersive display is capable of including a plurality of pixels where only some, e.g., a subset of pixels of the display, include dye. Further, in particular embodiments, different dyes may be used for different pixels. For example, an electro-dispersive display is capable of having one or more pixels including a first dye color, one or more pixels including a second and different dye color, etc. An electro-dispersive display can include more than two differently dyed pixels. An electro-dispersive display, for example, is capable of including one or more pixels dyed black, one or more pixels dyed white, one or more pixels dyed silver, one or more pixels dyed red, one or more pixels dyed green, one or more pixels dyed blue, one or more pixels dyed cyan, one or more pixels dyed magenta, one or more pixels dyed yellow, or any combination of the foregoing.

Figure 28A:
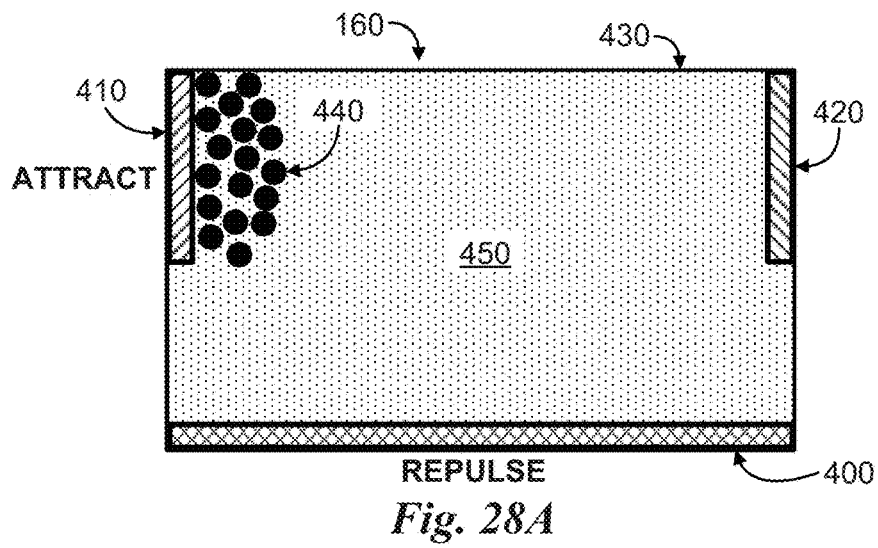
FIGS. 28A-28C each illustrate a top view of an example electro-dispersive pixel.
Figure 28B:
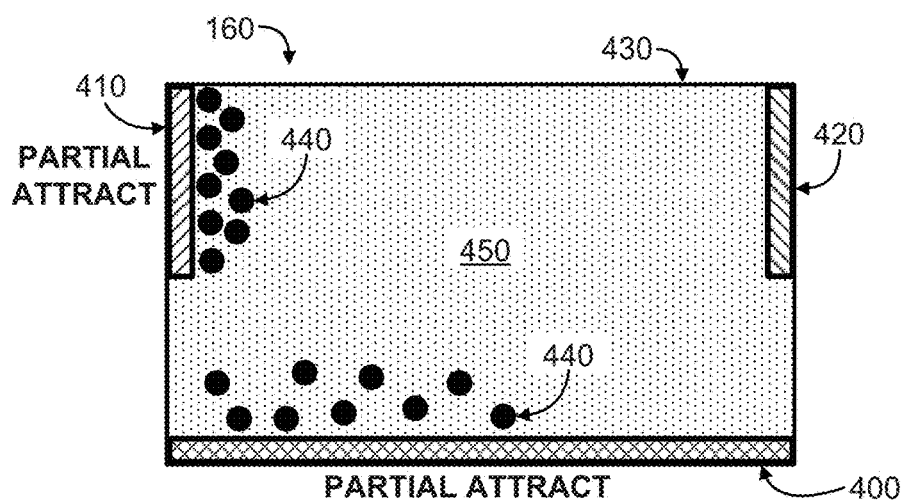
Figure 28C:
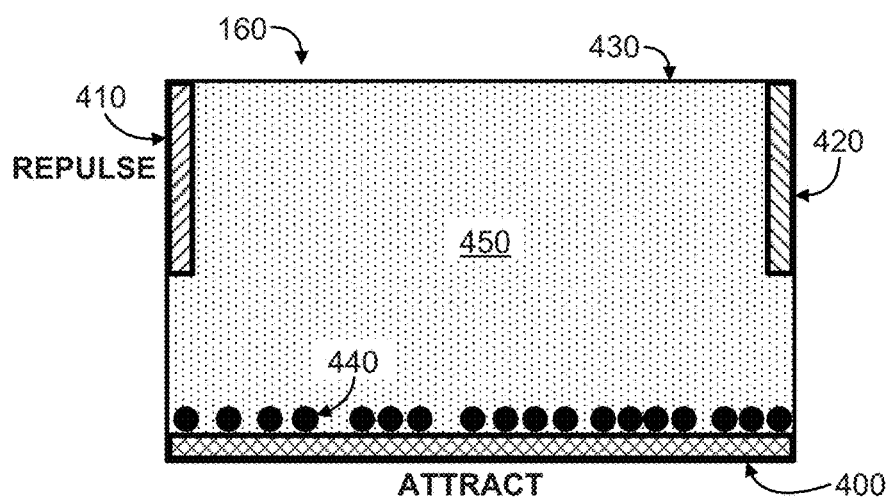

FIGS. 28A-28C each illustrate a top view of example electro-dispersive pixel 160. In particular embodiments, pixel 160 may be configured to operate in multiple modes, including a transparent mode (as illustrated in FIG. 28A), a partially transparent mode (as illustrated in FIG. 28B), and an opaque mode (as illustrated in FIG. 28C). In the examples of FIGS. 28A-28C, the electrodes are labeled "ATTRACT," "REPULSE," and "PARTIAL ATTRACT," depending on the mode of operation. In particular embodiments, "ATTRACT" refers to an electrode configured to attract particles 440, while "REPULSE" refers to an electrode configured to repulse particles 440, and vice versa. The relative voltages applied to the electrodes depend on whether particles 440 have positive or negative charges. As an example and not by way of limitation, if particles 440 have a positive charge, then an "ATTRACT" electrode may be coupled to ground, while a "REPULSE" electrode may have a positive voltage (e.g., +5 V) applied to it. In this case, positively charged particles 440 would be attracted to the ground electrode and repulsed by the positive electrode.

In a transparent mode of operation, a substantial portion (e.g., greater than 80%, 90%, 95%, or any suitable percentage) of electrically controllable material 440 may be attracted to and located near attractor electrode 410, resulting in pixel 160 being substantially transparent to incident visible light. As an example and not by way of limitation, if particles 440 have a negative charge, then attractor electrode 410 may have an applied positive voltage (e.g., +5 V), while front electrode 400 is coupled to a ground potential (e.g., 0 V). As illustrated in FIG. 28A, particles 440 are clumped about attractor electrode 410 and may prevent only a small fraction of incident light from propagating through pixel 160. In a transparent mode, little or none of electrically controllable material 440 (e.g., less than 20%, 10%, 5%, or any suitable percentage) may be located near front electrode 400, and pixel 160 may transmit greater than 70%, 80%, 90%, 95%, or any suitable percentage of visible light incident on a front or back surface of pixel 160.

In a partially transparent mode of operation, a first portion of electrically controllable material 440 may be located near front electrode 400, and a second portion of electrically controllable material 440 may be located near attractor electrode 410. In particular embodiments, the first and second portions of electrically controllable material 440 may each include between 10% and 90% of the electrically controllable material. In the partially transparent mode illustrated in FIG. 28B, front electrode 400 and attractor electrode 410 may each be configured to be partially attractive to particles 440. In FIG. 28B, approximately 50% of particles 440 are located near attractor electrode 410, and approximately 50% of particles 440 are located near front electrode 400. In particular embodiments, when operating in a partially transparent mode, an amount of the first or second portions may be approximately proportional to a voltage applied between front electrode 400 and attractor electrode 410. As an example and not by way of limitation, if particles 440 have a negative charge and front electrode 400 is coupled to ground, then an amount of particles 440 located near attractor electrode 410 may be approximately proportional to a voltage applied to attractor electrode 410. Additionally, an amount of particles 440 located near front electrode 400 may be inversely proportional to the voltage applied to attractor electrode 410. In particular embodiments, when operating in a partially transparent mode, electro-dispersive pixel 160 may be partially opaque, where electro-dispersive pixel 160 is partially transparent to visible light and partially reflects, scatters, or absorbs visible light. In a partially transparent mode, pixel 160 is partially transparent to incident visible light, where an amount of transparency may be approximately proportional to the portion of electrically controllable material 440 located near attractor electrode 410.

In an opaque mode of operation, a substantial portion (e.g., greater than 80%, 90%, 95%, or any suitable percentage) of electrically controllable material 440 may be located near front electrode 400. As an example and not by way of limitation, if particles 440 have a negative charge, then attractor electrode 410 may be coupled to a ground potential, while front electrode 400 has an applied positive voltage (e.g., +5 V). In particular embodiments, when operating in an opaque mode, pixel 160 may be substantially opaque, where pixel 160 reflects, scatters, or absorbs substantially all incident visible light. As illustrated in FIG. 28C, particles 440 may be attracted to front electrode 400, forming an opaque layer on the electrode and preventing light from passing through pixel 160. In particular embodiments, particles 440 may be white or reflecting, and in an opaque mode, pixel 160 may appear white. In other particular embodiments, particles 440 may be black or absorbing, and in an opaque mode, pixel may appear black.

In particular embodiments, electrically controllable material 440 may be configured to absorb one or more spectral components of light and transmit one or more other spectral components of light. As an example and not by way of limitation, electrically controllable material 440 may be configured to absorb red light and transmit green and blue light. Three or more pixels may be combined together to form a color pixel that may be configured to display color, and multiple color pixels may be combined to form a color display. In particular embodiments, a color electro-dispersive display may be made by using particles 440 with different colors. As an example and not by way of limitation, particles 440 may be selectively transparent or reflective to specific colors (e.g., red, green, or blue), and a combination of three or more colored electro-dispersive pixels 160 may be used to form a color pixel.

In particular embodiments, when moving particles 440 from attractor electrode 410 to front electrode 400, disperser electrode 420, located opposite attractor electrode 410, may be used to disperse particles 440 away from attractor electrode 410 before an attractive voltage is applied to front electrode 400. As an example and not by way of limitation, before applying a voltage to front electrode 400 to attract particles 440, a voltage may first be applied to disperser electrode 420 to draw particles 440 away from attractor electrode 410 and into the pixel volume. This action may result in particles 440 being distributed substantially uniformly across front electrode 440 when front electrode 440 is configured to attract particles 440. In particular embodiments, electro-dispersive pixels 160 may preserve their state when power is removed, and an electro-dispersive pixel 160 may only require power when changing its state (e.g., from transparent to opaque). In particular embodiments, an electro-dispersive display may continue to display information after power is removed. An electro-dispersive display may only consume power when updating displayed information, and an electro-dispersive display may consume very low or no power when updates to the displayed information are not being executed.

Figure 29:
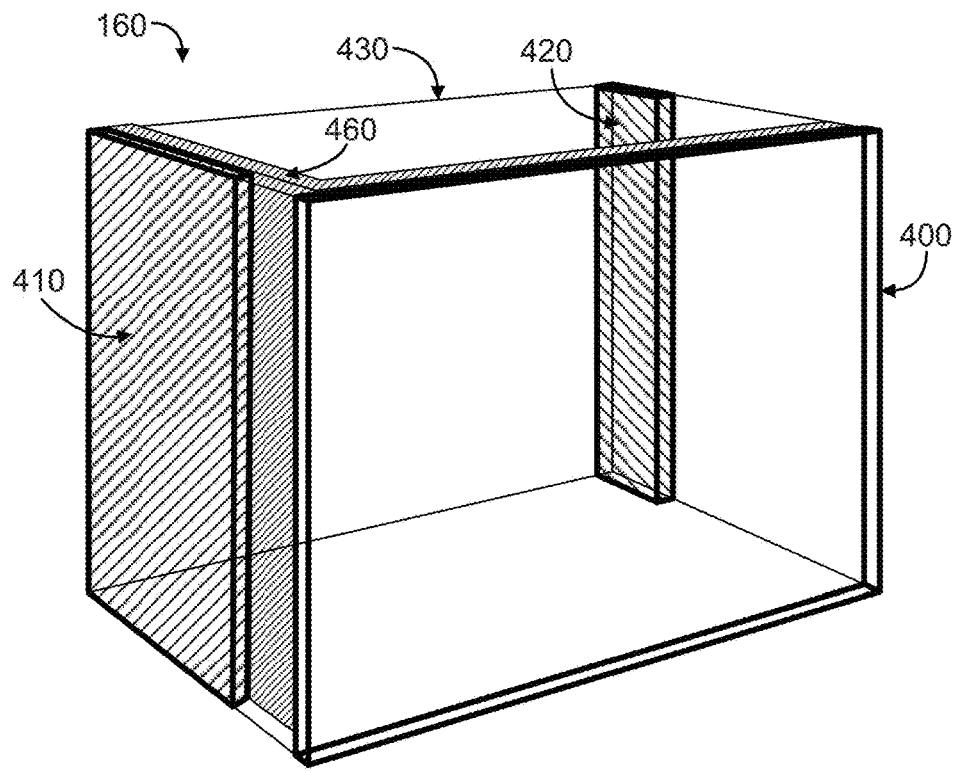
FIG. 29 illustrates a perspective view of an example electrowetting pixel.

FIG. 29 illustrates a perspective view of example electrowetting pixel 160. In particular embodiments, an electrowetting display may include multiple electrowetting pixels 160 arranged to form a display screen, where each electrowetting pixel 160 may be individually addressable (e.g., using an active-matrix or a passive-matrix scheme). In particular embodiments, electrowetting pixel may include front electrode 400, attractor electrode 410, liquid electrode 420, pixel enclosure 430, or hydrophobic coating 460. Front electrode 400 may be oriented substantially parallel to a viewing surface of the display screen, and front electrode 400 may be substantially transparent to visible light. Front electrode 400 may be an ITO electrode deposited on an interior or exterior surface of a front or back wall of enclosure 430. Attractor electrode 410 and liquid electrode 420 (located opposite attractor electrode 410) may each be oriented at an angle with respect to front electrode 400. As an example and not by way of limitation, attractor electrode 410 and liquid electrode 420 may each be substantially orthogonal to front electrode 400. Attractor electrode 410 or liquid electrode 420 may each be attached to or deposited on an interior or exterior surface of a side wall of enclosure 430. Attractor electrode 410 and liquid electrode 420 may each be made of a thin film of ITO or a thin film of other conductive material (e.g., gold, silver, copper, chrome, or a conductive form of carbon).

Figure 30:
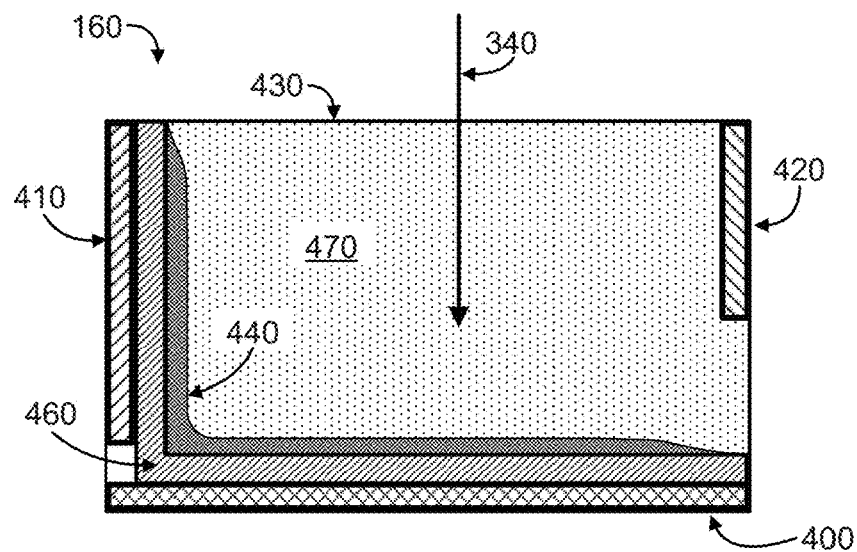
FIG. 30 illustrates a top view of the example electrowetting pixel of FIG. 29.

FIG. 30 illustrates a top view of example electrowetting pixel 160 of FIG. 29. In particular embodiments, electrically controllable material 440 may include an electrowetting fluid 440 that may be colored or opaque. As an example and not by way of limitation, electrowetting fluid 440 may appear black (e.g., may substantially absorb light) or may absorb or transmit some color components (e.g., may absorb red light and transmit blue and green light). Electrowetting fluid 440 may be contained within the pixel volume along with transparent fluid 470, and electrowetting fluid 440 and transparent fluid 470 may be immiscible. In particular embodiments, electrowetting fluid 440 may include an oil, and transparent fluid 470 may include water. In particular embodiments, electrowetting may refer to a modification of the wetting properties of a surface by an applied electric field, and an electrowetting fluid 440 may refer to a fluid that moves or is attracted to a surface in response to an applied electric field. As an example and not by way of limitation, electrowetting fluid 440 may move toward an electrode having a positive applied voltage. When electrowetting pixel 160 is configured to be transparent, electrowetting fluid 440 may be moved adjacent to attractor electrode 410, allowing incident light (e.g., light ray 340) to pass through pixel 160. When pixel 160 is configured to be opaque, electrowetting fluid 440 may be moved adjacent to front electrode 400, causing incident light to be scattered or absorbed by electrowetting fluid 440.

In particular embodiments, electrowetting pixel 160 may include hydrophobic coating 460 disposed on one or more surfaces of pixel enclosure 430. Hydrophobic coating 460 may be located between electrowetting fluid 440 and the front and attractor electrodes. As an example and not by way of limitation, hydrophobic coating 460 may be affixed to or deposited on interior surfaces of one or more walls of pixel enclosure 430 that are adjacent to front electrode 400 and attractor electrode 410. In particular embodiments, hydrophobic coating 460 may include a material that electrowetting fluid 440 can wet easily, which may result in electrowetting fluid forming a substantially uniform layer (rather than beads) on a surface adjacent to the electrodes.

Figure 31A:
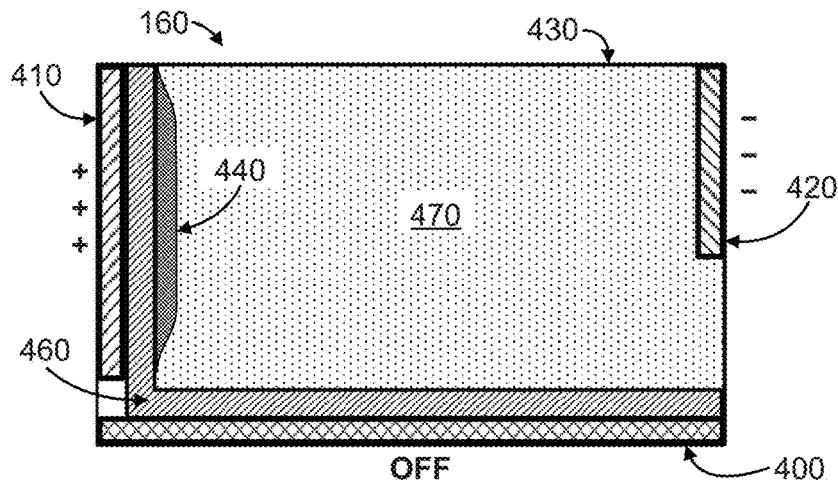
FIGS. 31A-31C each illustrate a top view of an example electrowetting pixel.
Figure 31B:
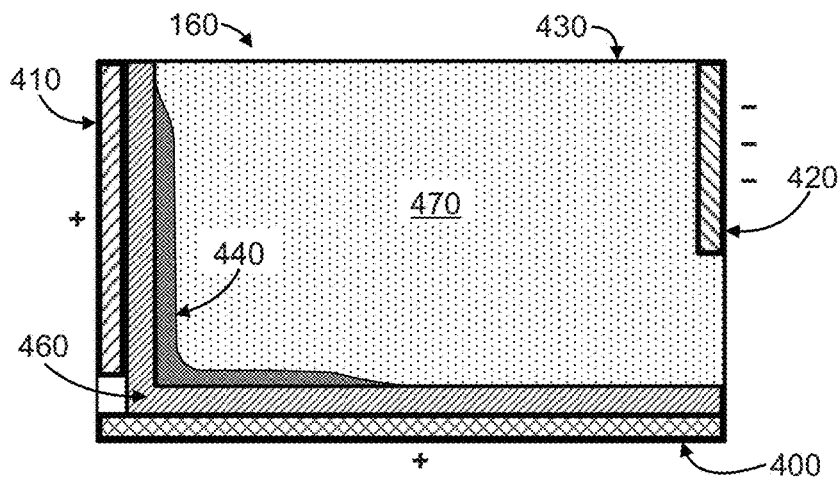
Figure 31C:
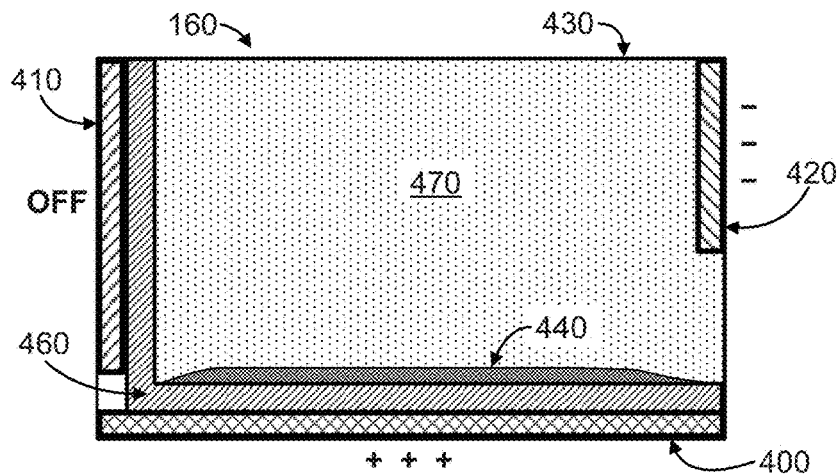

FIGS. 31A-31C each illustrate a top view of example electrowetting pixel 160. In particular embodiments, electrowetting pixel 160 may be configured to operate in multiple modes, including a transparent mode (as illustrated in FIG. 31A), a partially transparent mode (as illustrated in FIG. 31B), and an opaque mode (as illustrated in FIG. 31C). Electrodes in FIGS. 31A-31C are labeled with positive and negative charge symbols indicating the relative charge and polarity of the electrodes. In the transparent mode of operation illustrated in FIG. 31A, front electrode 400 is off (e.g., no charge or applied voltage), attractor electrode 410 has a positive charge or voltage, and, relative to attractor electrode 410, liquid electrode 420 has a negative charge or voltage. As an example and not by way of limitation, a +5 V voltage may be applied to attractor electrode 410, and liquid electrode 420 may be coupled to ground. In a transparent mode of operation, a substantial portion (e.g., greater than 80%, 90%, 95%, or any suitable percentage) of electrowetting fluid 440 may be attracted to and located near attractor electrode 410, resulting in pixel 160 being substantially transparent to incident visible light. In the partially transparent mode of operation illustrated in FIG. 31B, a first portion of electrowetting fluid 440 is located near front electrode 400, and a second portion of electrowetting fluid 440 is located near attractor electrode 410. Front electrode 400 and attractor electrode 410 are each be configured to attract electrowetting fluid 440, and the amount of electrowetting fluid 440 on each electrode depends on the relative charge or voltage applied to the electrodes. When operating in a partially transparent mode, electrowetting pixel 160 may be partially opaque and partially transparent. In the opaque mode of operation illustrated in FIG. 31C, a substantial portion (e.g., greater than 80%, 90%, 95%, or any suitable percentage) of electrowetting fluid 440 is located near front electrode 400. Front electrode 400 has a positive charge, and attractor electrode 410 is off, resulting in the movement of electrowetting fluid to a surface of pixel enclosure 430 adjacent to front electrode 400. In particular embodiments, in opaque mode, electrowetting pixel 160 may be substantially opaque, reflecting, scattering, or absorbing substantially all incident visible light. As an example and not by way of limitation, electrowetting fluid 440 may be black or absorbing, and pixel 160 may appear black.

In one or more embodiments, electrowetting fluid 440 of FIGS. 29-31 is not dyed. Accordingly, the pixel appears white when controlled to be in an opaque state. Electrowetting fluid 440, for example, scatters the light. In one or more embodiments, a dye is added to electrowetting fluid 440. The dye is colored. The dye helps to absorb light and also scatters non-absorbed light. Example colors for the dye include, but are not limited to, black, white, silver (e.g., TiO2), red, green, blue, cyan, magenta, and yellow. With the addition of a dye to electrowetting fluid 440 and the pixel controlled to be in an opaque state, the pixel appears to be the color of the dye that is used.

In one or more embodiments, an electrowetting display is capable of including one or more pixels that do not include dye. In one or more embodiments, an electrowetting display is capable of including one or more pixels where each pixel includes dye. In one or more embodiments, an electrowetting display is capable of including a plurality of pixels where only some, e.g., a subset of pixels of the display, include dye. Further, in particular embodiments, different dyes may be used for different pixels. For example, an electrowetting display is capable of having one or more pixels including a first dye color, one or more pixels including a second and different dye color, etc. An electrowetting display can include more than two differently dyed pixels. An electrowetting display, for example, is capable of including one or more pixels dyed black, one or more pixels dyed white, one or more pixels dyed silver, one or more pixels dyed red, one or more pixels dyed green, one or more pixels dyed blue, one or more pixels dyed cyan, one or more pixels dyed magenta, one or more pixels dyed yellow, or any combination of the foregoing.

In particular embodiments, a PDLC display an electrochromic display, or a SmA display may be fabricated using one or more glass substrates or plastic substrates. As an example and not by way of limitation, a PDLC electrochromic display, or a SmA display may be fabricated with two glass or plastic sheets with the PDLC, electrochromic or SmA material, respectively, sandwiched between the two sheets. In particular embodiments, a PDLC electrochromic, or a SmA display may be fabricated on a plastic substrate using a roll-to-roll processing technique. In particular embodiments, a display fabrication process may include patterning a substrate to include a passive or active matrix. As an example and not by way of limitation, a substrate may be patterned with a passive matrix that includes conductive areas or lines that extend from one edge of a display to another edge. As another example and not by way of limitation, a substrate may be patterned and coated to produce a set of transistors for an active matrix. A first substrate may include the set of transistors which may be configured to couple two traces together (e.g., a hold trace and a scan trace), and a second substrate located on an opposite side of the display from the first substrate may include a set of conductive lines. In particular embodiments, conductive lines or traces may extend to an end of a substrate and may be coupled (e.g., via pressure-fit or zebra-stripe connector pads) to one or more control boards. In particular embodiments, an electro-dispersive display or an electrowetting display may be fabricated by patterning a bottom substrate with conductive lines that form connections for pixel electrodes. In particular embodiments, a plastic grid may be attached to the bottom substrate using ultrasonic, chemical, or thermal attachment techniques (e.g., ultrasonic, chemical, thermal, or spot welding). In particular embodiments, the plastic grid or bottom substrate may be patterned with conductive materials (e.g., metal or ITO) to form electrodes. In particular embodiments, the cells may be filled with a working fluid (e.g., the cells may be filled using immersion, inkjet deposition, or screen or rotogravure transfer). As an example and not by way of limitation, for an electro-dispersive display, the working fluid may include opaque charged particles suspended in a transparent liquid (e.g., water). As another example and not by way of limitation, for an electrowetting display, the working fluid may include a combination of an oil and water. In particular embodiments, a top substrate may be attached to the plastic grid, and the top substrate may seal the cells. In particular embodiments, the top substrate may include transparent electrodes. Although this disclosure describes particular techniques for fabricating particular displays, this disclosure contemplates any suitable techniques for fabricating any suitable displays.

Figure 32:
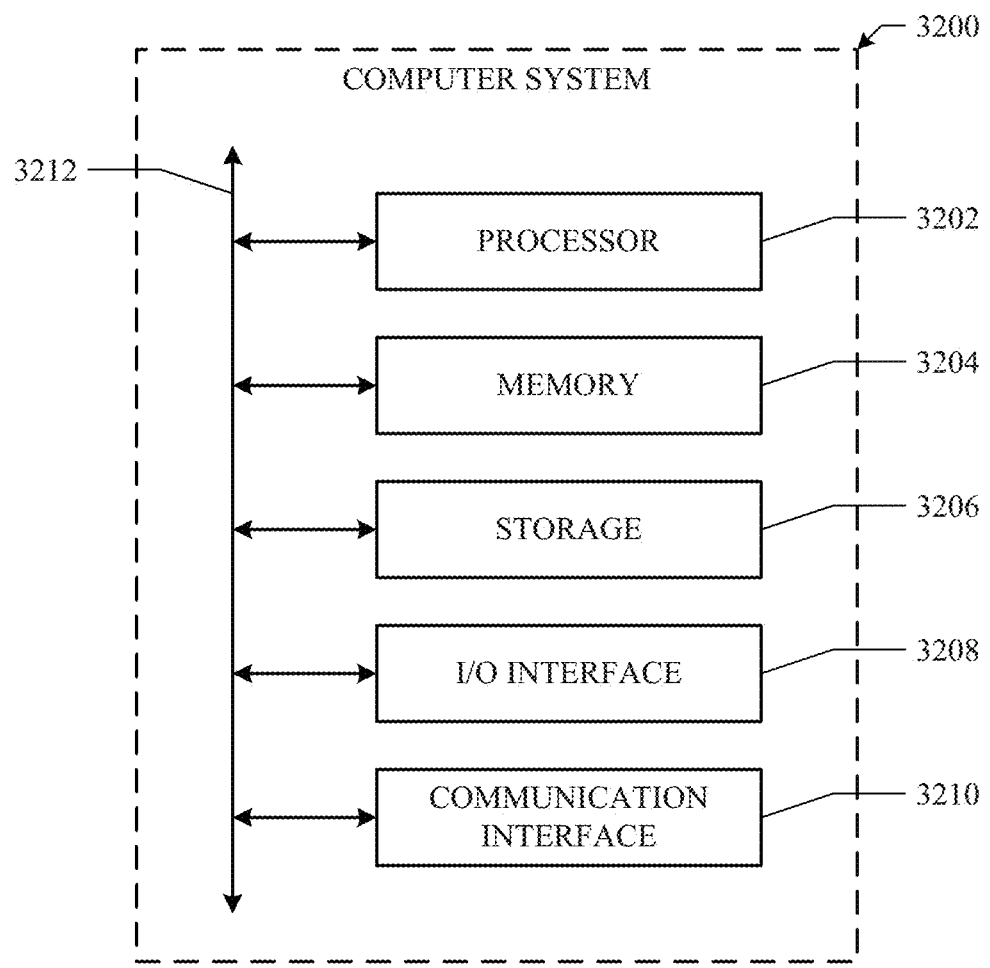
FIG. 32 illustrates an example computer system.

FIG. 32 illustrates an example computer system 3200. In particular embodiments, one or more computer systems 3200 perform one or more steps of one or more methods described or illustrated herein. In particular embodiments, one or more computer systems 3200 provide functionality described or illustrated herein. In particular embodiments, software running on one or more computer systems 3200 performs one or more steps of one or more methods described or illustrated herein or provides functionality described or illustrated herein. Particular embodiments include one or more portions of one or more computer systems 3200. Herein, reference to a computer system may encompass a computing device, and vice versa, where appropriate. Moreover, reference to a computer system may encompass one or more computer systems, where appropriate.

This disclosure contemplates any suitable number of computer systems 3200. This disclosure contemplates computer system 3200 taking any suitable physical form. As example and not by way of limitation, computer system 3200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 3200 may include one or more computer systems 3200; be unitary or distributed; span multiple locations; span multiple machines; span multiple data centers; or reside in a cloud, which may include one or more cloud components in one or more networks. Where appropriate, one or more computer systems 3200 may perform without substantial spatial or temporal limitation one or more steps of one or more methods described or illustrated herein. As an example and not by way of limitation, one or more computer systems 3200 may perform in real time or in batch mode one or more steps of one or more methods described or illustrated herein. One or more computer systems 3200 may perform at different times or at different locations one or more steps of one or more methods described or illustrated herein, where appropriate.

In particular embodiments, computer system 3200 includes a processor 3202, memory 3204, storage 3206, an input/output (I/O) interface 3208, a communication interface 3210, and a bus 3212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 3202 includes hardware for executing instructions, such as those making up a computer program. As an example and not by way of limitation, to execute instructions, processor 3202 may retrieve (or fetch) the instructions from an internal register, an internal cache, memory 3204, or storage 3206; decode and execute them; and then write one or more results to an internal register, an internal cache, memory 3204, or storage 3206. In particular embodiments, processor 3202 may include one or more internal caches for data, instructions, or addresses. This disclosure contemplates processor 3202 including any suitable number of any suitable internal caches, where appropriate. As an example and not by way of limitation, processor 3202 may include one or more instruction caches, one or more data caches, and one or more translation lookaside buffers (TLBs). Instructions in the instruction caches may be copies of instructions in memory 3204 or storage 3206, and the instruction caches may speed up retrieval of those instructions by processor 3202. Data in the data caches may be copies of data in memory 3204 or storage 3206 for instructions executing at processor 3202 to operate on; the results of previous instructions executed at processor 3202 for access by subsequent instructions executing at processor 3202 or for writing to memory 3204 or storage 3206; or other suitable data. The data caches may speed up read or write operations by processor 3202. The TLBs may speed up virtual-address translation for processor 3202. In particular embodiments, processor 3202 may include one or more internal registers for data, instructions, or addresses. This disclosure contemplates processor 3202 including any suitable number of any suitable internal registers, where appropriate. Where appropriate, processor 3202 may include one or more arithmetic logic units (ALUs); be a multi-core processor; or include one or more processors 3202. Although this disclosure describes and illustrates a particular processor, this disclosure contemplates any suitable processor.

In particular embodiments, memory 3204 includes main memory for storing instructions for processor 3202 to execute or data for processor 3202 to operate on. As an example and not by way of limitation, computer system 3200 may load instructions from storage 3206 or another source (such as, for example, another computer system 3200) to memory 3204. Processor 3202 may then load the instructions from memory 3204 to an internal register or internal cache. To execute the instructions, processor 3202 may retrieve the instructions from the internal register or internal cache and decode them. During or after execution of the instructions, processor 3202 may write one or more results (which may be intermediate or final results) to the internal register or internal cache. Processor 3202 may then write one or more of those results to memory 3204. In particular embodiments, processor 3202 executes only instructions in one or more internal registers or internal caches or in memory 3204 (as opposed to storage 3206 or elsewhere) and operates only on data in one or more internal registers or internal caches or in memory 3204 (as opposed to storage 3206 or elsewhere). One or more memory buses (which may each include an address bus and a data bus) may couple processor 3202 to memory 3204. Bus 3212 may include one or more memory buses, as described below. In particular embodiments, one or more memory management units (MMUs) reside between processor 3202 and memory 3204 and facilitate accesses to memory 3204 requested by processor 3202. In particular embodiments, memory 3204 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 3204 may include one or more memories 3204, where appropriate. Although this disclosure describes and illustrates particular memory, this disclosure contemplates any suitable memory.

In particular embodiments, storage 3206 includes mass storage for data or instructions. As an example and not by way of limitation, storage 3206 may include a hard disk drive (HDD), a floppy disk drive, flash memory, an optical disc, a magneto-optical disc, magnetic tape, or a Universal Serial Bus (USB) drive or a combination of two or more of these. Storage 3206 may include removable or non-removable (or fixed) media, where appropriate. Storage 3206 may be internal or external to computer system 3200, where appropriate. In particular embodiments, storage 3206 is non-volatile, solid-state memory. In particular embodiments, storage 3206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 3206 taking any suitable physical form. Storage 3206 may include one or more storage control units facilitating communication between processor 3202 and storage 3206, where appropriate. Where appropriate, storage 3206 may include one or more storages 3206. Although this disclosure describes and illustrates particular storage, this disclosure contemplates any suitable storage.

In particular embodiments, I/O interface 3208 includes hardware, software, or both, providing one or more interfaces for communication between computer system 3200 and one or more I/O devices. Computer system 3200 may include one or more of these I/O devices, where appropriate. One or more of these I/O devices may enable communication between a person and computer system 3200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 3208 for them. Where appropriate, I/O interface 3208 may include one or more device or software drivers enabling processor 3202 to drive one or more of these I/O devices. I/O interface 3208 may include one or more I/O interfaces 3208, where appropriate. Although this disclosure describes and illustrates a particular I/O interface, this disclosure contemplates any suitable I/O interface.

In particular embodiments, communication interface 3210 includes hardware, software, or both providing one or more interfaces for communication (such as, for example, packet-based communication) between computer system 3200 and one or more other computer systems 3200 or one or more networks. As an example and not by way of limitation, communication interface 3210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 3210 for it. As an example and not by way of limitation, computer system 3200 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 3200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 3200 may include any suitable communication interface 3210 for any of these networks, where appropriate. Communication interface 3210 may include one or more communication interfaces 3210, where appropriate. Although this disclosure describes and illustrates a particular communication interface, this disclosure contemplates any suitable communication interface.

In particular embodiments, bus 3212 includes hardware, software, or both coupling components of computer system 3200 to each other. As an example and not by way of limitation, bus 3212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 3212 may include one or more buses 3212, where appropriate. Although this disclosure describes and illustrates a particular bus, this disclosure contemplates any suitable bus or interconnect.

Figure 33:
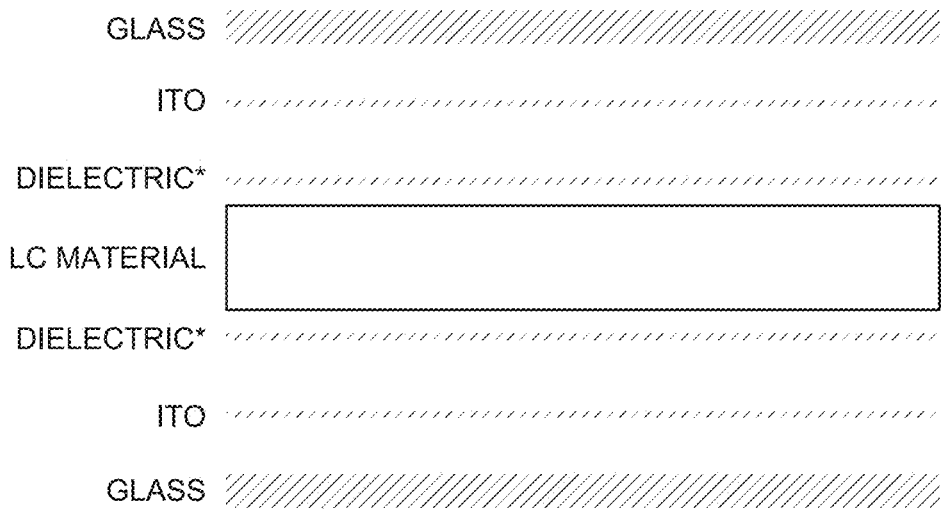
FIGS. 33 and 34 each illustrates a cross-sectional view of an example display.
Figure 34:
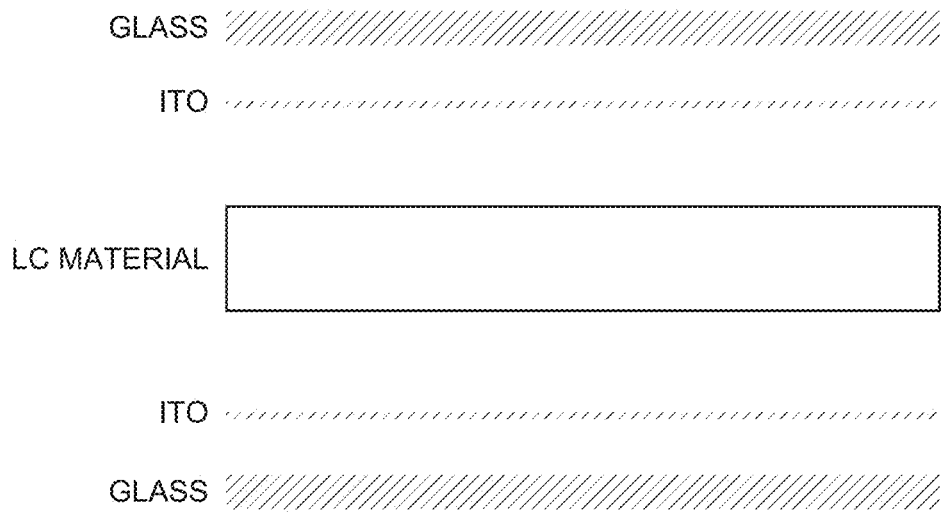

FIGS. 33 and 34 each illustrates an example cross-sectional view of an example display. In particular embodiments shown in FIG. 33, the display includes a first glass layer, a first ITO layer, a first dielectric layer, LC material (e.g., LC SmA), a second dielectric layer, a second ITO layer, and a second glass layer. In particular embodiments shown in FIG. 34, the display includes a first glass layer, a first ITO layer, LC material (e.g., LC SmA), a second ITO layer, and a second glass layer. The display of FIG. 34 does not include a dielectric layer.

FIGS. 35A-35D each illustrates example liquid crystals. In particular, FIG. 35 illustrates nematic, SmA, SmC, and cholesteric LC alignments. In operation, the alignment can be modulated by application of an electric field. FIG. 35A illustrates molecules in nematic liquid crystal phase. In the nematic liquid crystal phase, the molecules have no positional order but tend to point in the same direction referred to as the "director." FIG. 35B illustrates the SmA mesophase of liquid crystals. In FIG. 32B, the director is perpendicular to the smectic plane, and there is no particular positional order in the layer. The SmA mesophase is bistable. A liquid crystal layer in the SmA mesophase appears transparent. The SmB mesophase orients with the director perpendicular to the smectic plane, but the molecules are arranged into a network of hexagons within the layer. FIG. 32C illustrates the SmC mesophase where molecules are arranged as in the SmA mesophase, but the director is at a constant tilt angle measured normally to the smectic plane. FIG. 32D illustrates the cholesteric (or chiral nematic) liquid crystal phase. The cholesteric liquid crystal phase is typically composed of nematic mesogenic molecules containing a chiral center which produces intermolecular forces that favor alignment between molecules at a slight angle to one another. The cholesteric liquid crystal formation corresponds to a structure which can be visualized as a stack of very thin 2-D nematic-like layers with the director in each layer twisted with respect to those above and below. In this structure, the directors form in a continuous helical pattern.

FIGS. 36A-36B illustrate example SmA liquid crystals in scattering and transparent states, respectively. FIGS. 36A-36B illustrate the bistable nature of the SmA mesophase of liquid crystals. In the SmA mesophase of liquid crystal molecules, the molecules self-assemble into a bi-layered arrangement. In the SmA mesophase, the liquid crystal molecules possess larger ionic conductivity along the layers rather than across the layers. This larger ionic conductivity along layers results in ionic electrohydrodynamic effects when a low-frequency electric field is applied. FIG. 36A illustrates the SmA mesophase of liquid crystal molecules having a chaotic orientation that scatters light to appear opaque. For example, a layer implemented as described in connection with FIG. 36A appears white. Increasing frequency of the electric field applied to the liquid crystal molecules suppresses the ionic motion causing the liquid crystal molecules align with the field through dielectric reorientation resulting in a clear state. FIG. 36B illustrates the SmA mesophase of liquid crystal molecules reoriented to implement a clear state. Due to the high viscosity of the SmA mesophase, the SmA mesophase of liquid crystal molecules is bistable.

In one or more embodiments, the liquid crystal molecules (liquid crystals) of FIG. 36 are not dyed. Accordingly, the pixel appears white when controlled to be in an opaque state. The liquid crystals, for example, scatter the light. In one or more embodiments, a dye is added to the liquid crystals. The dye is colored. The dye helps to absorb light and also scatters non-absorbed light. Example colors for the dye include, but are not limited to, black, white, silver (e.g., TiO2), red, green, blue, cyan, magenta, and yellow. With the addition of a dye to the liquid crystals and the pixel controlled to be in an opaque state, the pixel appears to be the color of the dye that is used.

In one or more embodiments, a liquid crystal display including Smectic A liquid crystals is capable of including one or more pixels that do not include dye. In one or more embodiments, a liquid crystal display including Smectic A liquid crystals is capable of including one or more pixels where each pixel includes dye. In one or more embodiments, a liquid crystal display including Smectic A liquid crystals is capable of including a plurality of pixels where only some, e.g., a subset of pixels of the display, include dye. Further, in particular embodiments, different dyes may be used for different pixels. For example, a liquid crystal display including Smectic A liquid crystals is capable of having one or more pixels including a first dye color, one or more pixels including a second and different dye color, etc. A liquid crystal display including Smectic A liquid crystals can include more than two differently dyed pixels. A liquid crystal display including Smectic A liquid crystals, for example, is capable of including one or more pixels dyed black, one or more pixels dyed white, one or more pixels dyed silver, one or more pixels dyed red, one or more pixels dyed green, one or more pixels dyed blue, one or more pixels dyed cyan, one or more pixels dyed magenta, one or more pixels dyed yellow, or any combination of the foregoing.

FIG. 37A-37D each illustrates an example projection system 3700. Referring to FIG. 35A, projection system 3700 includes a projection device 3702 and a projector 3704. In general, projector 3704 is capable of projecting an image on projection device 3702. Projector 3704 is capable of projecting large scale images (e.g., video, animation, photos, slides, or other information) onto projection device 3702. As an illustrative and nonlimiting example, projection device 3702 may include a projection layer that is approximately 180 or more inches measured on the diagonal. Projection system 3700 is capable of addressing, e.g., improving, visibility issues relating to ambient light without expending large amounts of power and/or heat. In addition, projection system 3700 is capable of displaying the color black whereas other conventional projection systems are unable display the color black. For example, conventional projection systems attempt to display the color black as the default color of the static surface upon which the projector projects images.

In particular embodiments, projection device 3702 is capable of coordinating operation with the images projected by projector 3704. In an example, the projection layer of projection device 3702 is electronically controllable and pixel addressable to appear white, black, substantially transparent, and/or intermediate steps between white and substantially transparent or black and substantially transparent. Within this disclosure, pixels that are configured to appear an intermediate step between black and substantially transparent or white and substantially transparent are referred to as "grayscale." By controlling appearance of the display layer of projection device 3702 in coordination with the projection of images (e.g., frames) from projector 3704, black regions of the images may be projected over regions of the projection layer configured to absorb light; white regions of the images may be projected over regions of the projection layer configured to scatter or diffuse light; dark regions of the images may be projected over regions of the projection layer configured to appear black or dark; and/or brighter regions of the images may be projected over regions of the projection layer configured to appear brighter (e.g., whiter or grayscale).

In one or more embodiments, projection device 3702 is capable of displaying an image (or images) in black and white and/or grayscale in coordination with (e.g., concurrently) projector 3704 projecting the image (or images). For example, projection device 3702 is capable of displaying the same content on the projection layer that is projected by projector 3704 synchronized in time so that the images are superposed. In one or more other embodiments, projection device 3702 is capable of displaying color images.

The phrase "in coordination," as applied to operation of projection device 3702 and projector 3704 refers to any of a variety of ways in which projection device 3702 is capable of interacting with projector 3704 to operate concurrently and in a manner where operation of projection device 3702 depends, at least in part, upon operation of projector 3704 and/or operation of projector 3704 depends, at least in part, upon operation of projection device 3702. In particular embodiments, the phrase "in coordination" means substantially synchronized or synchronized. In one or more embodiments, the phrase "in coordination" means substantially aligned or aligned. In particular embodiments, the phrase "in coordination" means substantially synchronized and substantially aligned or synchronized and aligned.

For example, synchronization can refer to the timing of displayed and/or projected images such that an image projected by projector 3704 is projected in a substantially time synchronized manner with the display of the image by projection device 3702. For example, projection device 3702 can start and stop displaying a given image at substantially the same time that projector 3704 starts and stops projecting the image. Alignment can refer to the image projected by projector 3704 being substantially superposed with the image displayed by projection device 3702, e.g., so that the projection of the image substantially aligns with the image as displayed by projection device 3702.

Figure 37A:
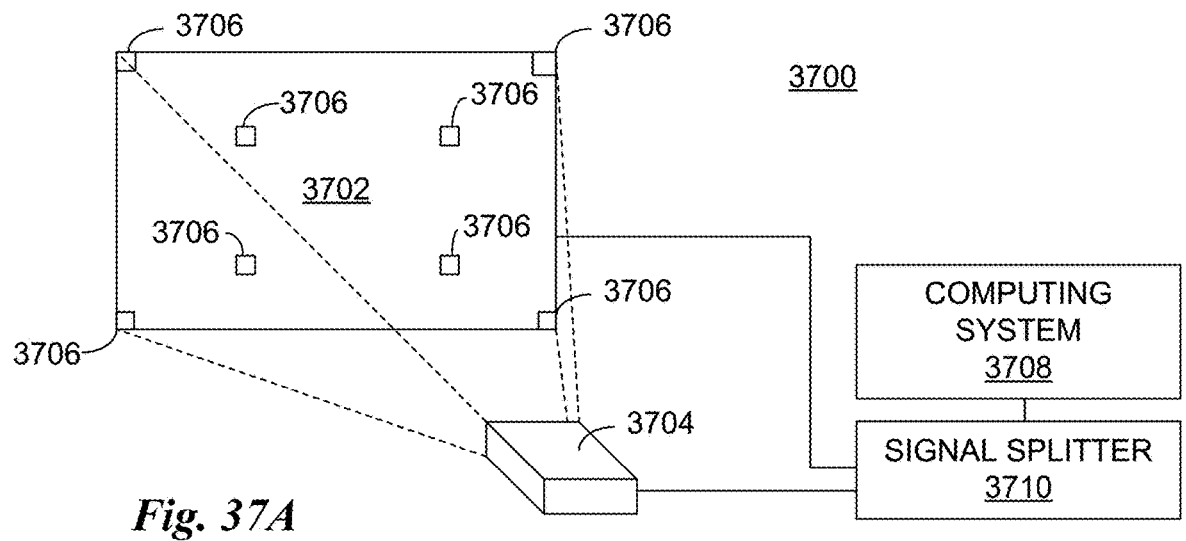
FIG. 37A-37D each illustrates an example projection system.

In the example of FIG. 37A, projection device 3702 includes one or more sensors 3706. In particular embodiments, projection device 3702 includes sensors 3706 at an edge of the projection layer included therein. In some embodiments, the projection layer included in projection device 3702 includes one or more sensors 3706 in the middle and/or distributed throughout the projection layer, e.g., a display of the projection layer. Sensors 3706 may be included in or at any suitable location within projection device 3702. For example, one or more sensors 3706 may be mounted in or on a housing of projection device 3702.

In one or more embodiments, one or more of sensors 3706 are configured to detect light, e.g., light detection sensors. Examples of light detection sensors include, but are not limited to, photodiodes and phototransistors. In particular embodiments, one or more or all of sensors 3706 may be implemented as one or more other types of sensors capable of detecting a user. For example, one or more of sensors 3706 is capable of detecting physical presence of a user, proximity and/or distance of a user relative to projection device 3702 (e.g., distance between the user and projection device 3702), and/or one or more attributes of a user. Examples of attributes of a user can include, but are not limited to, identity of the user, physical characteristics such as height, whether the user wears glasses, or age. For example, one or more or all of sensors 3706 may be implemented as a camera. In other embodiments, sensors 3706 may include a combination of sensors configured to detect light such as light intensity and/or color (e.g., photodiodes and/or phototransistors) and/or any of the other types of sensors capable of detecting users and/or user attributes as described herein.

In particular arrangements, projector 3704 is implemented as an LCD projector. In other embodiments, projector 3704 is implemented as a digital light projection (DLP) projector. In other embodiments, projector 3704 is implemented as a laser projector. Projector 3704 may be implemented using any suitable technology. As such, the particular examples provided are not intended as limitations of the embodiments described herein. Projector 3704 may include additional components to be described herein in greater detail such as a camera to aid in the synchronization of visuals with images displayed by projection device 3702.

In the example of FIG. 37A, a computing system 3708 is coupled to a signal splitter 3710. Computing system 3708 may be any of a variety of different data processing systems as described herein including, but not limited to, a laptop computer, a desktop computer, or a tablet computer. An example architecture for computing system 3708 is described in connection with FIG. 32. In an aspect, computing system 3708 is coupled to signal splitter 3710 via a wireless connection. In another aspect, computing system 3708 is coupled to signal splitter 3710 through a wired connection. For example, the connection between computing system 3708 and signal splitter 3710 may be a High Definition Multimedia Interface (HDMI), a Video Graphics Array (VGA), a Display Port, or a Digital Visual Interface (DVI) wired connection.

Signal splitter 3710 is capable of receiving a video signal from computing system 3708. From the received video signal, signal splitter 3710 is capable of generating a first signal that is provided to projector 3704 and a second signal that is provided to projection device 3702. The first signal and the second signal may be conveyed through wired or wireless connections (e.g., through a router or via a direct wireless connection). Projector 3704, in response to the first signal received from signal splitter 3710, is capable of projecting one or more images on the projection layer of projection device 3702. Projection device 3702, in response to the second signal received from signal splitter 3710, is capable of displaying black and white, grayscale, and/or color images in coordination with the images projected from projector 3704. In one or more embodiments, the first signal and the second signal are the same so that projector 3704 projects a color image while projection device 3702 generates the same image projected by projector 3704, but in black and white, grayscale, or color so that the two images are substantially superposed (and aligned) upon the projection layer of projection device 3702. In particular embodiments, signal splitter 3710 is capable of outputting the second signal as a black and white or grayscale video signal.

In one or more embodiments, signal splitter 3710 is capable of synchronizing the first signal and the second signal with one another. For example, each of projector 3704 and projection device 3702 has a delay from the time that a video signal is received and the time that an image is displayed by projection device 3702 or projected in the case of projector 3704 after receiving the video signal. For example, operations such as decoding, processing, applying color, and/or masking require time that contributes to the delay of each respective device. The delay of projector 3704 may be the same as, or differ, from the delay of projection device 3702. In particular embodiments, signal splitter 3710 is capable of synchronizing the signals so that projection device 3702 displays images and/or frames in coordination, e.g., at substantially the same time, with the images and/or frames projected by projector 3704. Signal splitter 3710, for example, takes into account the delay of projection device 3702 and the delay of projector 3704 and delays the respective signals as required to achieve coordinated synchronized operation.

The embodiment illustrated in FIG. 37A is provided for purposes of illustration and not limitation. In particular arrangements, signal splitter 3710 is included in projector 3704. In that case, computing system 3708 is coupled to projector 3704. Projector 3704 is coupled to projection device 3702 via a wired or wireless connection. Signal splitter 3704, being located within projector 3704, splits the received signal from computing system 3708 and provides the first signal to the internal components of projector 3704 and the second signal to projection device 3702 as described herein. The second signal provided to projection device 3702 may be sent through a wired or wireless connection.

In particular arrangements, signal splitter 3710 is included in projection device 3702. In that case, computing system 3708 is coupled to projection device 3702. Projection device 3702 is coupled to projector 3704. Signal splitter 3710, being located within projection device 3702, splits the received signal from computing system 3708 and provides the first signal to projector 3704 and the second signal to the internal components of projection device 3702. The first signal may be wired or wireless.

Figure 37B:
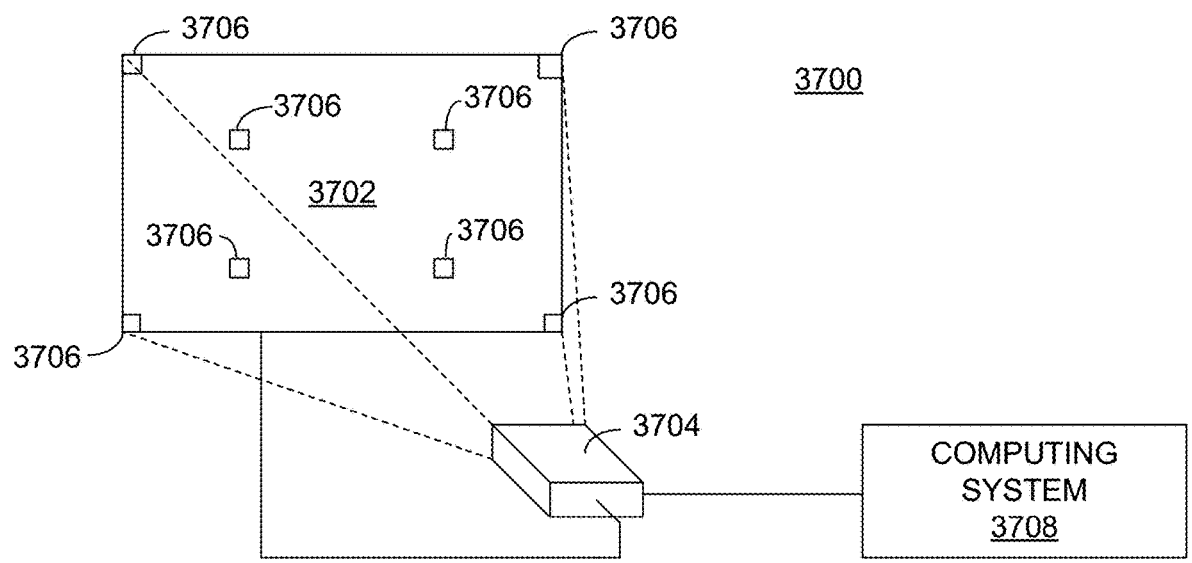

FIG. 37B illustrates an example where computing system 3708 is coupled to projector 3704. Projector 3704 is capable of providing a video signal to projection device 3702. As discussed, the connections between computing system 3708 and projector 3704 and between projector 3704 and projection device 3702 may be wired, wireless, or a combination of wired and wireless connections.

Figure 37C:
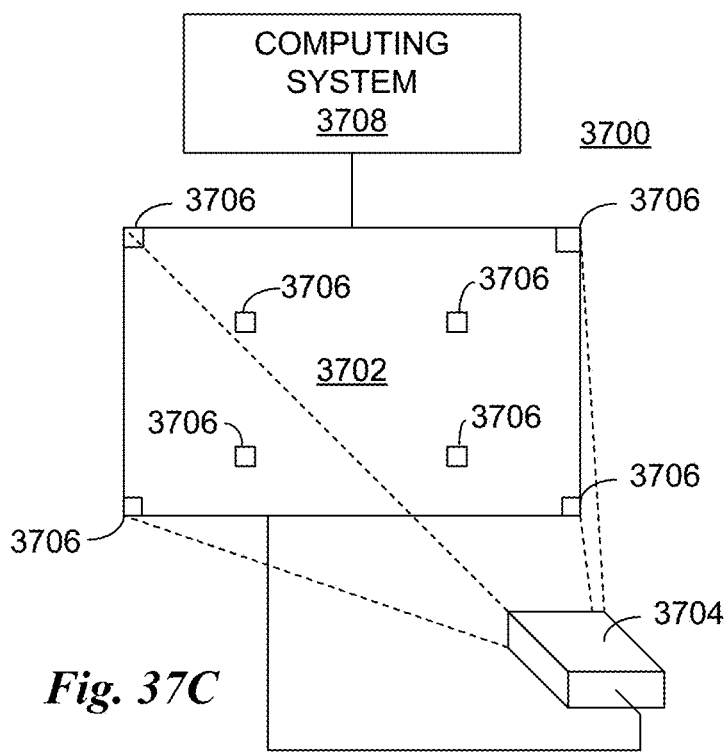

FIG. 37C illustrates an example where computing system 3708 is coupled to projection device 3702. Projection device 3702 is capable of providing a video signal to projector 3704. As discussed, the connections between computing system 3708 and projection device 3702 and between projection device 3702 and projector 3702 may be wired, wireless, or a combination of wired and wireless connections.

In one or more embodiments, the connection between projection device 3702 and projector 3704 may support the exchange of control information. The control information may be sent from one device to the other in addition to the video signal. Accordingly, in particular embodiments, projection device 3702 is capable of operating as a master while projector 3704 operates as a slave under control of projection device 3702. In particular embodiments, projector 3704 is capable of operating as a master while projection device 3702 operates as a slave under control of projection device 3702.

In general, the master is capable of controlling operations of the slave. Example operations of the slave that can be controlled by the master include, but are not limited to, calibration, color compensation, image placement (e.g., shifting up, down, left, right), image sizing, relocating or moving text within an image, and/or resizing text within an image. In one or more embodiments, the master is capable of controlling synchronization of signals as previously described with reference to signal splitter 3710. The master, for example, receives video data from computer system 3708, performs any necessary processing, and provides a video signal and command data to the slave. In such embodiments, e.g., as pictured in FIGS. 37B and 37C, computer system 3708, or the source of the video, may communicate with only the master device. Computer system 3708, for example, is unaware of the existence of the slave since the master handles communication and control of the slave. From the perspective of computing device 3708, for example, computing device 3708 behaves as if connected to a projector.

In particular embodiments, the master and slave are capable of operating independently. For example, referring to FIG. 37A, each of projection device 3702 and projector 3704 is capable of receiving a video signal. Still, one of projection device 3702 or projector 3704 is capable of operating as a master while the other operates as a slave for purposes of coordination, e.g., synchronization. For example, in FIG. 37A, projection device 3702 and projector 3704 still may communicate via a wired or wireless connection to exchange command data thereby allowing the device designated as the master to control operation, including synchronization and/or alignment, of the slave.

Figure 37D:
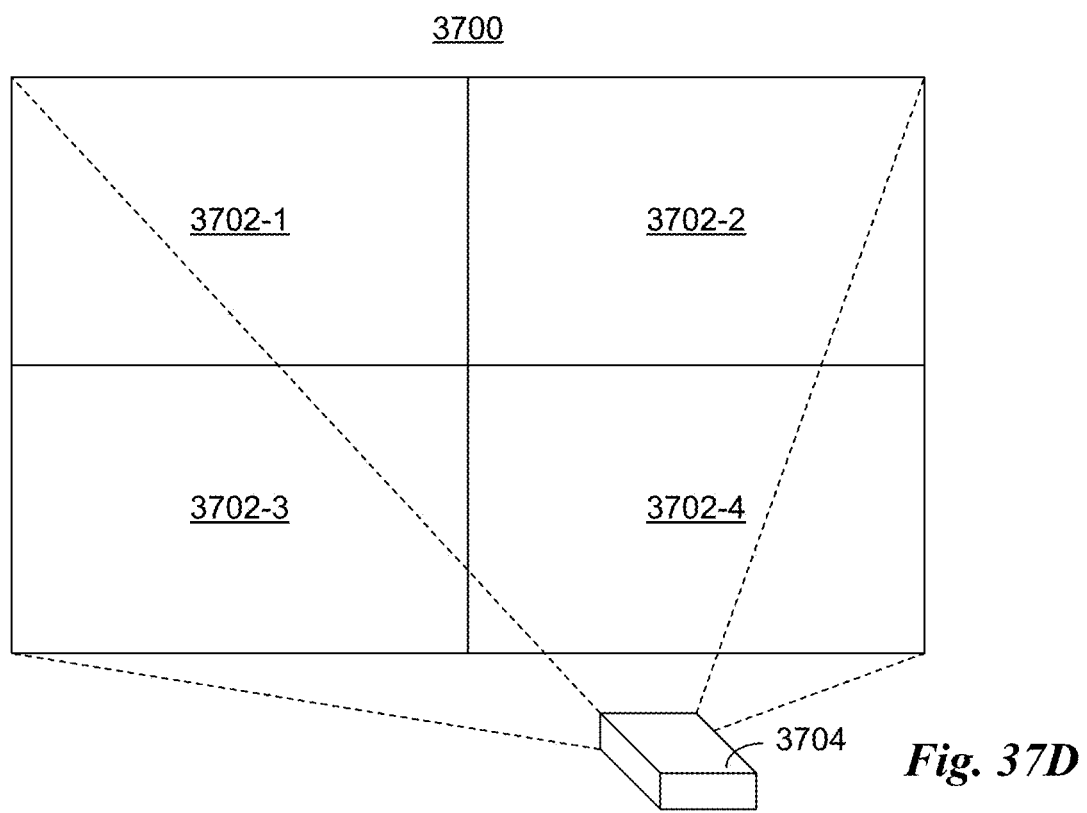

FIG. 37D illustrates an example projection system 3700 that includes multiple projection devices 3702. For purposes of illustration, four projection devices 3702 are shown. It should be appreciated, however, that virtually any number of projection devices 3702 may be included. In the example of FIG. 37D, projector 3704 is capable of projecting an image that spans across the plurality of projection devices 3702. In the example shown, each different projection device 3702 is capable of controlling the pixels contained therein to synchronize with the image(s) projected by projector 3704 so that each projection device 3702 operates in coordination with a portion of the image that is projected by projector 3704.

For example, projection device 3702-1 is capable of synchronizing and/or aligning with the upper left quarter of the image projected by projector 3704. Projection device 3702-1, for example, is capable of displaying the upper left quarter of the same image projected by projector 3704. Projection device 3702-2 is capable of synchronizing and/or aligning with the upper right quarter of the image projected by projector 3704. Projection device 3702-2, for example, is capable of displaying the upper right quarter of the same image projected by projector 3704. Projection device 3702-3 is capable of synchronizing and/or aligning with the lower left quarter of the image projected by projector 3704. Projection device 3702-3, for example, is capable of displaying the lower left quarter of the same image projected by projector 3704. Projection device 3702-4 is capable of synchronizing and/or aligning with the lower right quarter of the image projected by projector 3704. Projection device 3702-4, for example, is capable of displaying the lower right quarter of the same image projected by projector 3704.

It should be appreciated that the particular portion of an image projected by projector 3704 that is displayed by a projection device 3702 is determined by the number of projection devices used and the arrangement of such devices. For example, in the case where only two projection devices are used, each may display approximately one-half of the projected image.

Figure 38:
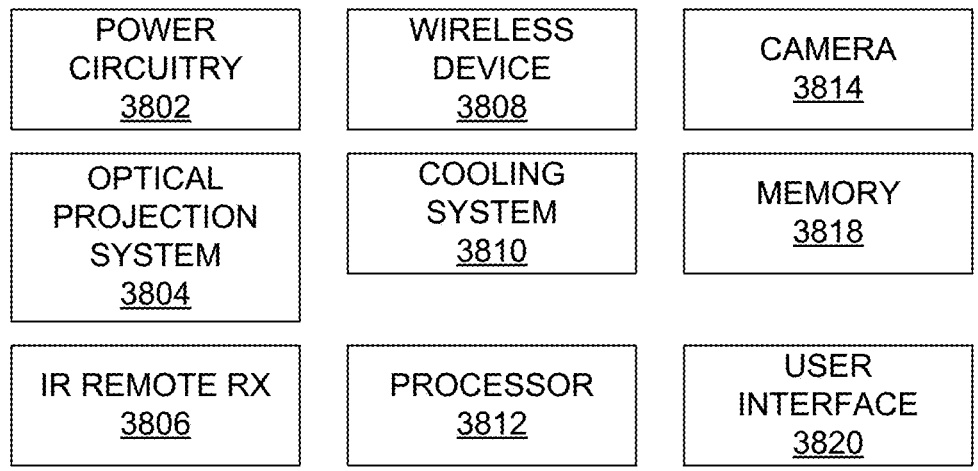
FIG. 38 illustrates an example architecture for the projector of FIG. 37.

FIG. 38 illustrates an example architecture for projector 3704 of FIG. 37. In the example of FIG. 38, projector 3704 includes power circuitry 3802, an optical projection system (OPS) 3804, an infrared (IR) remote receiver (Rx) 3806, a wireless device 3808, a cooling system 3810, a processor 3812, optionally a camera (e.g., a sensor) 3814, a memory 3818, and a user interface 3820. Power circuitry 3802 is capable of providing power to the various components of projector 3704. Power circuitry 3802, for example, is capable of adapting electrical power obtained from an electrical outlet to the particular voltage and current requirements of the components of projector 3704. OPS 3804 is capable of projecting the image(s) from projector 3704. In one example, OPS 3804 can include a polarizar, an LCD panel, analyzer, and a lens or lenses. OPS 3804 may be implemented using any of a variety of optical projection technologies including DLP and laser. IR remote receiver 3806 is capable of receiving IR commands from a remote control device and converting the commands into electrical signals that are provided to processor 3812. Wireless device 3808 is included to communicate with projection device 3702, signal splitter 3710, and/or computing device 3708. Wireless device 3808 may be any of a variety of wireless devices as generally described in connection with FIG. 32. In particular embodiments, projector 3704 includes a communication port (not shown) supporting wired communications. Examples of the communication port include, but are not limited to, an HDMI port, a VGA port, a Display Port, and a DVI port. Other examples of communication ports include, but are not limited to, a Universal Serial Bus (USB) port and an Ethernet port.

Cooling system 3810 may be implemented as a fan or other suitable system for regulating temperature within projector 3704. Processor 3812 is capable of processing image data received from a source for projection using OPS 3804 and/or image data that is obtained from camera 3814. Processor 3812 is capable of controlling operation of OPS 3804. In particular embodiments, processor 3812 is capable of executing instructions stored in memory 3818. Camera 3814 is optionally included. Camera 3814 is positioned to capture image data of display device 3702, images projected onto the projection layer of display device 3702 from projector 3704, or both during operation. For example, camera 3814 has the same orientation as OPS 3804 so as to capture, within image data generated by camera 3814, the projected image from projector 3704 as projected on the projection layer of projection device 3702. In one or more embodiments, processor 3812 is capable of controlling OPS 3804 to adjust the projected image based upon the image data captured by camera 3814. For example, processor 3812 is capable of processing the image data to detect the projected image therein and adjust the projected image by controlling OPS 3804. Based upon the image data obtained from camera 3814, for example, processor 3812 is capable of determining whether the image projected by projector 3704 is aligned with the image displayed by projection device 3702.

For example, processor 3812 may reduce the size of the projected image in response to detecting that the projected image expands beyond the projection layer of projection device 3702, may increase the size of the projected image in response to detecting that the projected image does not utilize the entirety of the projection layer of projection device 3702, and/or adjust color, brightness, focus, and/or other suitable parameters based upon the image data captured by camera 3814. User interface 3820 may include one or more controls, buttons, displays, a touch interface, and/or switches for operating the various functions of projector 3704.

In one or more embodiments, processor 3812 is capable of executing program code stored in memory 3818 that causes projector 3704 to operate as a master as described herein to control operation of projection device 3702. In one or more embodiments, processor 3812 is capable of executing program code stored in memory 3818 that causes projector 3704 to operate as a slave as described herein.

In particular embodiments, projector 3704 may be implemented as a standard, "off-the-shelf" projector. In that case, projector 3704 may be provided with a video signal that is projected. Synchronization of the projected image with projection device 3702 may be handled by a different device such as projection device 3702 and/or computer system 3708.

Figure 39:
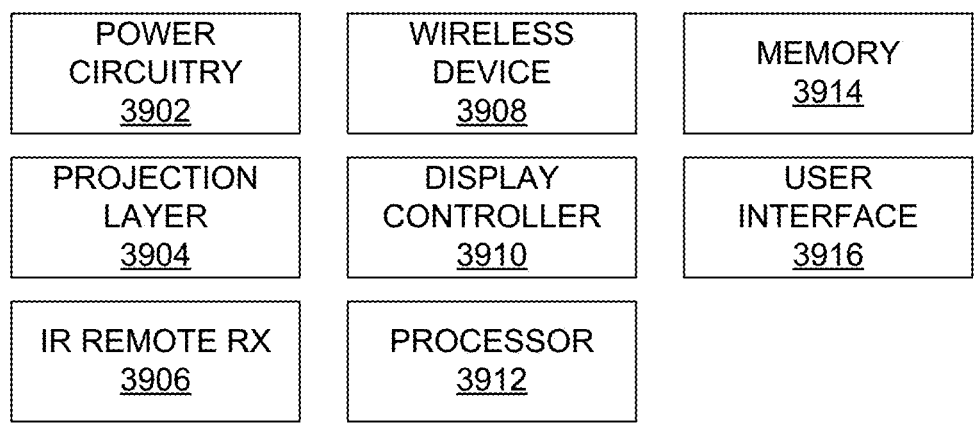
FIG. 39 illustrates an example architecture for the projection device of FIG. 37.

FIG. 39 illustrates an example architecture for projection device 3702 of FIG. 37. In the example of FIG. 39, projection device 3702 includes power circuitry 3902, projection layer 3904, an IR remote receiver (Rx) 3906, a wireless device 3908, display controller 3910, a processor 3912, a memory 3914, and a user interface 3916. Power circuitry 3902 is capable of providing power to the various components of projection device 3702. Power circuitry 3902, for example, is capable of adapting electrical power obtained from an electrical outlet to the particular voltage and current requirements of the components of projection device 3702. In another example, power circuitry 3902 includes a battery and is capable of adapting electrical power from the battery to the particular voltage and current requirements of components of projection device 3702. IR remote receiver (Rx) 3906 is capable of receiving IR commands from a remote control device and converting the commands into electrical signals that are provided to processor 3912. Wireless device 3908 is included to communicate with projector 3704, signal splitter 3710, and/or computing device 3708. In particular embodiments, projection device 3702 includes a communication port (not shown) supporting wired communications. Examples of the communication port include, but are not limited to, an HDMI port, a VGA port, a Display Port, and a DVI port. Other examples of communication ports include, but are not limited to, a USB port and an Ethernet port.

Processor 3912 is capable of processing image data received from a source such as signal splitter 3710, computer system 3708, and/or projector 3704 and controlling operation of display controller 3910. In particular embodiments, processor 3912 is capable of executing instructions stored in memory 3914. In one or more embodiments, processor 3912 is capable of executing program code stored in memory 3914 that causes projection device 3702 to operate as a master as described herein to control operation of projector 3704. In one or more embodiments, processor 3912 is capable of executing program code stored in memory 3914 that causes projection device 3702 to operate as a slave as described herein.

Display controller 3910 is coupled to projection layer 3904 and is capable of controlling operation of projection layer 3904 based upon instructions received from processor 3912. Display controller 3910, for example, may include control and/or driver circuitry for one or more layers, e.g., each display, used to implement projection layer 3904. User interface 3916 may include one or more controls, buttons, displays, a touch interface, and/or switches for operating the various functions of projection device 3702. For purposes of illustration, sensors 3706 are not shown in FIG. 39. As noted, however, one or more sensors of any combination of the varieties described herein can be incorporated into projection device 3702 and/or within projection layer 3704.

In particular embodiments, projection layer 3904 is implemented as a single layer. The single layer may be implemented as a display. The display is electronically controllable and includes pixels or capsules. Projection layer 3904 may be pixel addressable. In an example, projection layer 3904 is capable of displaying black, white, and grayscale pixels. In another example, the pixels or capsules include more than one different color particles. In particular embodiments, the display is transparent. In particular embodiments, the display is not transparent (e.g., non-transparent). For example, the display may be an "e-ink" type of display. Projection layer 3904 is capable of displaying images synchronized with projector 3704. For example, projector 3704 projects a color image that is superposed with the same image displayed by projection layer 3904.

Figure 40:
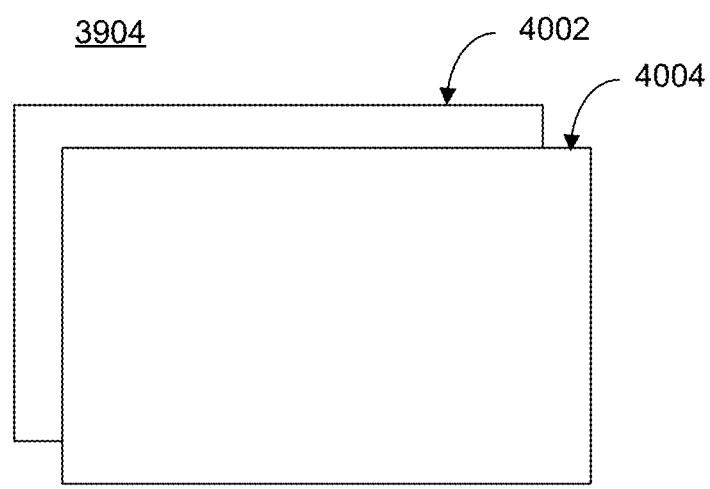
FIG. 40 illustrates an exploded view of an example of the projection layer of FIG. 39.

FIG. 40 illustrates an exploded view of an example of projection layer 3904. In the example of FIG. 40, projection layer 3904 includes multiple layers. As pictured, projection layer 3904 includes layer 4002 and layer 4004.

In particular embodiments, layer 4002 is an internal layer that provides a black background. Layer 4002, for example, may be implemented as a display that appears black or a solid black (e.g., static) surface. Layer 4004 is an external layer that is implemented as a display having pixels that are individually addressable. In one or more embodiments, layer 4004 is implemented as a transparent display. For example, the pixels of layer 4004 are controllable to be transparent or scatter light based upon electronic control signals provided to the pixels from display controller 3910. For example, the pixels of layer 4004 are individually controllable to be transparent so as to allow the black background to be visible through the pixel, scatter light so as to appear white and prevent the black background from being visible, or to appear semi-transparent or grayscale by being configured to be any intermediate step between transparent and scatter. Example types of transparent displays include, but are not limited to, an LCD, an LCD including Smectic A liquid crystals, an LED display, a light enhanced layer, or an OLED display.

Accordingly, for regions where pixels of layer 4004 are transparent, projection layer 3904 appears black. For regions where pixels of layer 4004 scatter light, projection layer 3904 appears white. For regions where pixels of layer 4004 are at an intermediate step between transparent and scatter (e.g., semi-transparent), projection layer 3904 appears grayscale. Projection layer 3904 displays an image in black and white and/or grayscale that is synchronized with the same image projected from projector 3704 so that the projected image from projector 3704 is superposed with the image displayed on projection layer 3904.

In particular embodiments, layer 4002 is an internal layer that provides a white background. Layer 4002, for example, may be implemented as a display that appears white or a solid white (e.g., static) surface. Layer 4004 is an external layer that is implemented as a display having pixels that are individually addressable. In one or more embodiments, layer 4004 is implemented as a transparent display. For example, the pixels of layer 4004 are controllable to be transparent, black, e.g., using black dyed particles that scatter light, or any intermediate step between transparent and scatter. For example, the pixels of layer 4004 are individually controllable to be transparent so as to allow the white background of layer 4004 to be visible through the pixels, scatter light so as to appear black and prevent the white background of layer 4004 from being visible, or to appear semi-transparent or grayscale. Example types of transparent displays include, but are not limited to, an LCD, an LCD including Smectic A liquid crystals, an LED display, a light enhanced layer, or an OLED display.

Accordingly, for regions where pixels of layer 4004 are transparent, projection layer 3904 appears white. For regions where pixels of layer 4004 scatter light, projection layer 3904 appears black. For regions where pixels of layer 4004 are set to an intermediate step between transparent and scattering (e.g., semi-transparent), projection layer 3904 appears grayscale. Projection layer 3904 displays an image in black and white and/or grayscale that is synchronized with the same image projected from projector 3704 so that the projected image from projector 3704 is substantially superposed with the image displayed on projection layer 3904.

In particular embodiments, projection layer 3904 includes an internal layer and two or more external layers. The internal layer may be black or white. In one or more embodiments, the external layers are transparent. Each of the external layers may be implemented as one of the different types of transparent displays described herein. One or more or all of the external layers may be color dyed. Each external layer, for example, may have pixels that are died a particular color such that different ones of the external layers are configured with pixels of a different color. Accordingly, in particular embodiments, projection layer 3904 is capable of displaying color images in synchronization with projector 3702.

Projection layer 3904 may be implemented using any of a variety of the display technologies described herein. For example, layer 4002, layer 4004, and/or other external layers included in projection layer 3904 may be implemented as a PDLC display, an electrochromic display, an electro-dispersive display, an electrowetting display, suspended particle device, or an LCD in any of its phases (e.g., nematic, TN, STN, or SmA).

By controlling the color and/or transparency of pixels in the display of projection device 3702 in synchronization with the projection of images by projector 3704, black regions of the image may be projected over regions of projection layer 3904 that are controlled to absorb light; white regions of the image may be projected over regions of projection layer 3904 that are controlled to scatter or diffuse light; dark regions of the image may be projected over regions of projection layer 3904 that are controlled to appear black or dark (grayscale); and/or brighter regions of the image may be projected over regions of projection layer 3904 that controlled to appear light (e.g., white or grayscale).

In particular embodiments, projection layer 3904 is capable of displaying a black and white, a grayscale, or a color version of the same image that is projected by projector 3704. Projection layer 3904 is capable of displaying images, e.g., frames, in synchronization (e.g., in time) and/or in alignment with images projected by projector 3702 so that the images are superposed. In this manner, projection layer 3904 is capable of displaying video and/or still images in synchronization with images projected by projector 3704.

In particular embodiments, processor 3912 is capable of controlling display controller 3910 to control properties of projection layer 3904. For example, processor 3912 is capable of controlling and adjusting light intensity, color, contrast, brightness, gamma, saturation, white balance, hue shift, and/or other imaging parameters. Processor 3912 is capable of adjusting one or more or all of the properties to match a particular color profile that is stored in memory 3914. For example, under control of processor 3912, display controller 3910 adjusts the amount of light that passes through one or more external layers of projection layer 3904 or that is reflected by one or more external layers of projection layer 3904 at a particular time to manipulate light intensity.

In particular embodiments, display controller 3910, under control of processor 3912, is capable of adjusting properties of projection layer 3904 such as refresh rate, rate of change (e.g., in transparency of pixels and/or capsules), or other dynamic characteristics. The adjusting of properties may be synchronized to produce visual effects and/or synchronized with the projected images from projector 3904. Examples of visual effects include, but are not limited to, stronger illumination and darker blacks in a brightly lit environment.

In one or more embodiments, sensors 3706 are capable of detecting light projected from projector 3704. Sensors 3706 are capable of detecting intensity of light and/or the color of light projected from projector 3704. In particular embodiments, projection device 3702 is capable of adjusting and/or calibrating the projection layer of projection device 3702 based upon, and in response to, data from sensors 3706 to synchronize with projector 3704. For example, sensors 3706 are capable of detecting the edge of the projected image(s) from projector 3704, particular patterns of light from projected images from projector 3704, or a combination thereof. The detected patterns of light by sensors 3706 indicate which portions of an image are detected at known locations of projection layer 3904 of projection device 3702. As such, projection device 3702 is capable of resizing image(s) displayed on the projection layer to be superposed with images projected from projector 3704 based upon data obtained from light sensors 3706 and/or adjusting the appearance of pixels of projection layer 3904 to appear darker or lighter based upon data obtained from sensors 3706 (e.g., the color and/or intensity of light detected by light sensors 3706). In another example, projection device 3702 is capable of rotating an image based upon data from sensors 3706 to align and synchronize with the image projected by projector 3704.

As an illustrative and nonlimiting example, a given image projected onto projection device 3702 will have a known pattern of light intensity and/or color that is expected to be detected by sensors 3706 when the image is aligned and synchronized with projection layer 3904 of projection device 3702. Based upon the light intensity and/or color detected by sensors 3706, processor 3912 is capable of controlling the pixels of projection layer 3904 to align and synchronize with the image projected by projector 3704 as detected by sensors 3706. Processor 3912, for example, is capable of determining a direction and distance that the image or regions of the image, as displayed by projection layer 3904 is to be shifted in order to align and synchronize with the image projected by projector 3704. As such, projection device 3702 is capable of controlling the pixels to effectuate the change, e.g., a shift in the image displayed by the display layer.

In particular embodiments, processor 3912 is capable of generating command data, as described herein, that is provided to projector 3704 to control the operation thereof. For example, processor 3912 is capable of generating command data to control projector 3704 to increases the size of the projected image, decrease the size of the projected image, and/or shift the projected image based upon the analysis of sensor data obtained from sensors 3706.

In one or more embodiments, sensors 3706 are capable of detecting proximity and/or distance of a user in relation to projection device 3702. For example, sensors 3706 may be implemented as proximity sensors that are capable of determining distance between projection device 3702 and the user. In another example, sensors 3706 may be implemented as one or more cameras. In that case, sensors 3706 may capture image data from the perspective of facing outward from the surface of projection device 3702 toward projector 3704. Sensors 3706, for example, are capable of capturing image data that may be processed by processor 3912 to detect that a user is present, e.g., within a predetermined distance of projection device 3702, one or more attributes of the user, location of the user relative to projection device 3702, and other information. In particular embodiments, processor 3912 is capable of determining attributes of the user as described herein, perform operations including, but not limited to, recognition of human beings in the image data (e.g., in frame), perform facial recognition to determine the identity of users (e.g., human beings), gaze detection (e.g., the direction that a user is looking based upon detection of the user's eyes and/or other facial features), and determine distance between the user and projection device 3702.

In particular embodiments, processor 3912 is capable of controlling pixels of projection layer 3904 based upon data obtained from sensors 3706. As noted, the data may specify physical presence of a user, location of the user relative to projection device 3702, distance between the user and projection device 3702, and/or one or more attributes of the user. As an illustrative and nonlimiting example, processor 3912 is capable of applying particular visual effects in response to detecting particular conditions in the sensor data. For example, in response to determining that a user is wearing glasses, processor 3912 is capable of increasing font size of text in an image that is to be displayed. In another example, processor 3912 is capable of increasing font size in response to determining that an age of a user, e.g., via image processing and/or facial recognition and/or feature processing, is above a threshold age. In another example, processor 3912 is capable of applying a visual effect to the image as specified by a preference of the user determined based upon the identity of the user. In particular embodiments, the effect can be applied in response to determining that the user is located at least a minimum distance from projection device 3702. It should be appreciated that any changes made as to the display of images or regions of images in projection device 3702 as described herein can be propagated and/or synchronized to projector 3704 so that projector 3704 projects an image that is modified in the same or like manner under control of projection device 3702, e.g., as a master.

In one or more embodiments, one or more of sensors 3706 is capable of sensing or detecting the level of ambient light and/or the color(s) of ambient light around projection device 3702. In that case, processor 3912 is capable of adjusting the image that is displayed by projection device 3702 based upon the detected data. For example, processor 3912 is capable of compensating for ambient light that is determined to be yellow.

FIG. 41 illustrates an example method 4100 for implementing a projection system. In one or more embodiments, method 4000 may be used to implement a projection system as described herein in connection with FIGS. 37-40.

In block 4102, a projection layer is provided. The projection layer includes a plurality of pixels. The pixels can be electronically controllable to vary appearance of at least one of the plurality of pixels in coordination with an image projected onto the projection layer. The projection layer displays the image in synchronization and alignment with the image projected onto the projection layer.

In block 4104, one or more displays are provided as part of the projection layer. In particular embodiments, the projection layer can include a non-transparent display. In particular embodiments, the projection layer can include one or more transparent displays implemented using any of the different transparent display technologies described herein. For example, one or more of the transparent displays can be an LCD, an LDC including Smectic A liquid crystals, an LED display, a light enhanced layer, or an OLED display.

In some embodiments, the non-emissive display includes at least one pixel of the plurality of pixels that includes dye. In some embodiments, the display includes at least pixel of the plurality of pixels that does not include dye and appears substantially white. In one or more embodiments, the non-emissive display includes at least one pixel of the plurality of pixels that includes dye. The non-emissive display can be implemented as a PDLC display, an elecrochromic display, an electro-dispersive display, a polymer stabilized LCD, an electrowetting display, a cholesteric LCD, or an LCD including Smectic A liquid crystals.

In block 4106, one or more sensors are optionally provided as part of the projection device. In particular embodiments, the sensor is capable of detecting light. The plurality of pixels can be electronically controlled and synchronized with the image projected onto the projection layer based, at least in part, upon the light detected by the sensor(s).

In particular embodiments, one or more of the sensors is capable of detecting distance between a user and the projection layer (or projection device) are provided. The plurality of pixels can be electronically controlled based, at least in part, upon the distance detected by the sensor.

In particular embodiments, one or more of the sensors is capable of detecting one or more attributes of the user within a range of the projection layer are provided. The plurality of pixels can be electronically controlled based, at least in part, upon the one or more attributes of the user detected by the sensor.

In block 4108, a projector is optionally provided. The projector is capable of projecting the image onto the projection layer.

In block 4110, a camera is optionally provided. The camera is capable of capturing image data of the image projected onto the projection layer. In particular embodiments, the projector is configured to adjust the image projected onto the projection layer based upon the image data from the camera.

FIG. 42 illustrates an example method 4200 of operation of a projection device. In block 4202, the projection device controls pixels of the projection layer in coordination with an image projected onto the projection layer. For example, a plurality of pixels of the projection layer are controlled to vary appearance of at least one of the plurality of pixels in coordination with an image projected onto the projection layer. As discussed, the plurality of pixels can be electronically controllable to display the image in synchronization and alignment with the image projected onto the projection layer.

In block 4204, the projection device optionally generates and analyzes sensor information. For example, the projection device optionally detects light using one or more sensors. In another example, the projection device optionally detects a user and/or one or more user attributes using one or more sensors. Examples of user attributes can include, but are not limited to, distance between the user and the projection device, location of the user, identity of the user, height, age, whether the user wears glasses, and/or other physical characteristics of the user. As discussed, sensor information can be analyzed, in part, using image processing.

In block 4206, the plurality of pixels can be electronically controlled based, in part, upon the sensor information. For example, the projection device is capable of detecting a distance between the projection device and the user using the sensor. The pixels can be electronically controlled based, at least in part, upon the distance detected by the sensor. For example, images can be enlarged and/or text size can be increased based upon the distance of the user and/or a user attribute such as whether the user is determined to be wearing glasses (e.g., through image processing). In another example, an image can be enlarged and/or text size can be increased in response to determining that the user is at least a threshold distance from the projection device and/or is determined to be a minimum age.

In another example, the projection device is capable of determining height of the user. The projection device is capable of moving, e.g., raising or lowering, text within an image based upon height. As an illustrative and nonlimiting example, the projection device can move the location of text in an image, e.g., display the text higher or lower in the image in terms of height to match or otherwise correspond to the height of the user so that the text is substantially aligned with the user's eyes.

Referring to FIGS. 37-42, in one or more embodiments, display 4002 and/or display 4004 is capable of including one or more pixels that do not include dye. In one or more embodiments, display 4002 and/or display 4004 is capable of including one or more pixels where each pixel includes dye. In one or more embodiments, display 4002 and/or display 4004 is capable of including a plurality of pixels where only some, e.g., a subset of pixels, include dye. Further, in particular embodiments, different dyes may be used for different pixels. For example, display 4002 and/or display 4004 is capable of having one or more pixels including a first dye color, one or more pixels including a second and different dye color, etc. Display 4002 and/or display 4004 is capable of including more than two differently dyed pixels. Display 4002 and/or display 4004, for example, is capable of including one or more pixels dyed black, one or more pixels dyed white, one or more pixels dyed silver, one or more pixels dyed red, one or more pixels dyed green, one or more pixels dyed blue, one or more pixels dyed cyan, one or more pixels dyed magenta, one or more pixels dyed yellow, or any combination of the foregoing.

In particular embodiments, one or more of the displays of projection device 3702 is row addressable or column addressable. In one or more embodiments, one or more displays of projection device 3702 can include a single pixel that is controllable to display clear, grayscale, white, black, or a particular color. The single pixel may be sized to approximately the size the display so that the entirety of the projection layer is electronically controllable to be entirely and uniformly white, entirely and uniformly black, entirely and uniformly transparent, entirely and uniformly grayscale, or entirely and uniformly a particular color. For example, the single pixel of the display can be dyed to appear black, white, silver, red, green, blue, cyan, magenta, or yellow.

Figure 43:
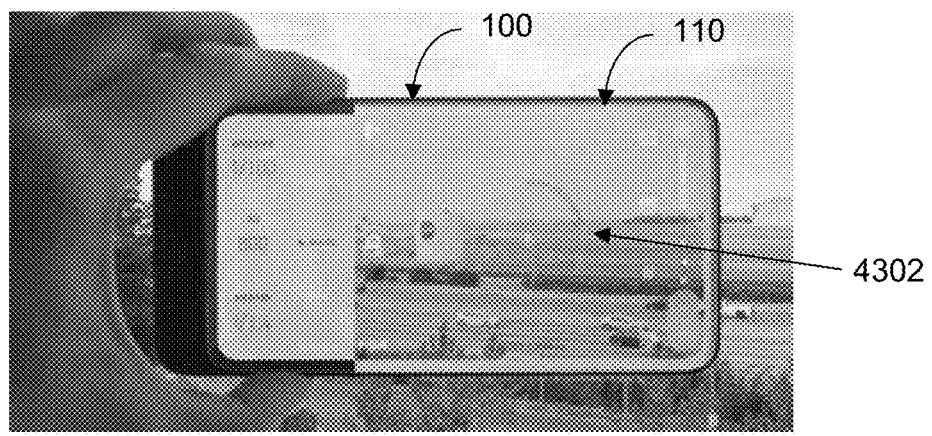
FIG. 43 illustrates another example display device with a display.
Figure 44:
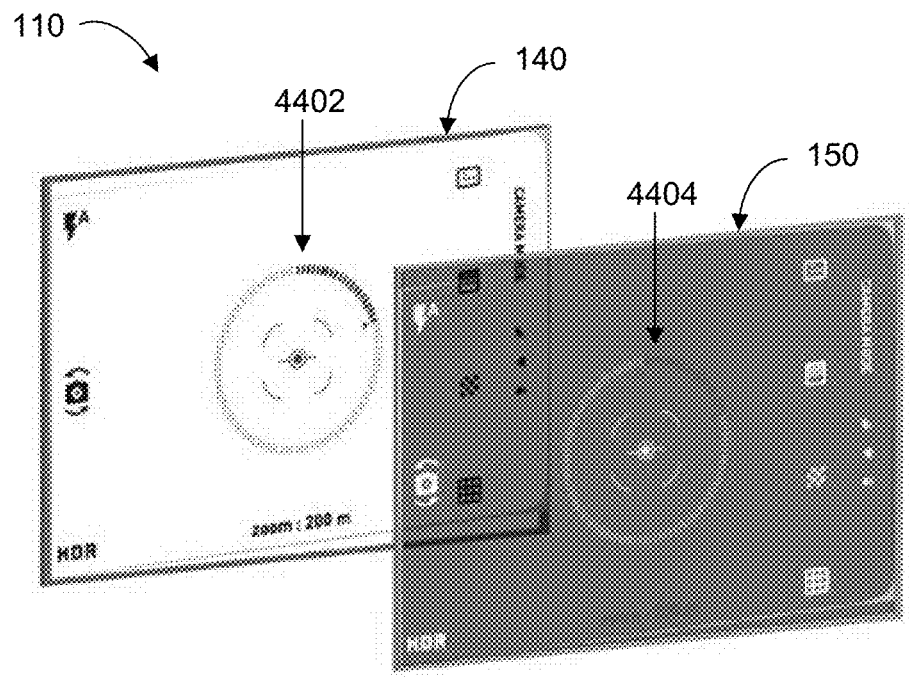
FIG. 44 illustrates an exploded view of an example display of the display device of FIG. 41.

FIG. 43 illustrates another example display device 100 with display 110. FIG. 44 illustrates an exploded view of an example display 110 of the display device of FIG. 43. Referring to both FIGS. 43 and 44, in particular embodiments, display device 100 is configured with both front display 150 and rear display 140 being implemented as substantially transparent displays. In particular embodiments, front display 150 and rear display 140 are of substantially the same size and shape. In the example of FIGS. 43-44, display device 100 does not have a solid backing or other layer behind rear display 140. Accordingly, a person viewing display device 100 from the viewing cone is able to view information presented on front display 150 and/or rear display 140 while also being able to see through display device 100 to view objects positioned behind display device 100. Similarly, a user positioned behind display device 100 is able to view content, at least partially, presented on front display 150 and/or rear display 140 while also being able to see through display device 100 to view objects positioned in front of display device 100. For example, a product (e.g., a smartphone) can be showcased by placing the product behind the display device 100, and the display device 100 can show information about the product.

In particular embodiments, display 110 is capable of displaying information with increased contrast. Display 110 includes an additional channel referred to as an "alpha channel." The alpha channel facilitates increased contrast in the information that is displayed on display 110. In an aspect, the alpha channel facilitates the display of black colored pixels thereby providing increased contrast in the images that are displayed. In addition, the alpha channel is capable of displaying pixels ranging from clear (e.g., transparent), silver, white, black, grayscale, or other suitable color as described herein. For example, pixels of the alpha channel can be controlled to appear at least partially opaque. In one or more embodiments, pixels of front display 150 and rear display 140 are of substantially the same size and shape. In other embodiments, the shape and/or size and/or number of the pixels of front display 150 and rear display 140 may be different as described herein.

In particular embodiments, front display 150 is a pixel addressable display. Front display 150 can be implemented as a light modulating layer. Front display 150 may be an emissive display. In particular embodiments, front display 150 is a transparent OLED (TOLED) display. In an example, the TOLED display may be driven by an active or a passive matrix and have some substantially transparent areas. In particular embodiments, front display 150 is an LCD. In an example, front display 150 can correspond to an LCD formed of a polarizer, an LC panel, a color filter, and a polarizer. In another example, front display 150 can correspond to an LC panel (e.g., using ITO, LC, and ITO materials). In particular embodiments front display 150 can be implemented as a light enhanced layer (e.g., a light enhancer layer). For example, front display 150 can be implemented as a QD layer. Any suitable light modulating layer or display with transparency can be used as front display 150.

In particular embodiments, front display 150 includes pixels capable of generating red, green, and blue colors. In general, transparency is achieved by leaving gaps between the pixels as described within this disclosure. In this regard, TOLED display 150 is always maximally transparent. TOLED display 150 is not capable of generating the color black. Instead, pixels that are intended to be black in color are shown as substantially transparent (e.g., clear). In a bright environment, TOLED display 150 provides low contrast levels due to the inability to display black pixels and the fact that ambient light shines through display 110. Contrast is generally measured as (brightest luminance−darkest luminance)/(average luminance). The brighter the ambient light, the worse the contrast.

In particular embodiments, rear display 140 is implemented as a non-emissive display. Rear display 140 is pixel addressable. For example, rear display 140 may be implemented as a PDLC display, a PSLC, an electrochromic display, an electro-dispersive display, an electrowetting display, suspended particle device, an ITO display, or an LCD in any of its phases (e.g., nematic, TN, STN, or SmA). Rear display 140 is controllable to generate the alpha channel. The alpha channel controls transparency of rear display 140 and the pixel or pixels thereof. For example, in the case where rear display 140 is pixel controllable to generate black pixels, transparent (e.g., clear) pixels, or any intermediate step between black and transparent (e.g., semi-transparent), the alpha channel controls transparency to determine whether the pixels of rear display 140 appear black in color, transparent, or a particular shade of gray. In the case where rear display 140 is pixel controllable to generate white pixels, transparent pixels, or varying levels of transparent pixels (e.g., semi-transparent pixels), the alpha channel controls transparency to determine whether pixels of rear display 140 appear white in color, transparent, or semi-transparent. In one or more embodiments, rear display 140 does not require the use of a color filter. In one or more embodiments, rear display 140 does not require a polarizer.

In particular embodiments, rear display 140 is aligned with front display 150 as described within this disclosure. For example, pixels of rear display 140 are aligned with pixels of front display 150. As an illustrative example, pixels of rear display 140 may be superposed with pixels of front display 150. In another example, pixels of rear display 140 may be superposed with substantially transparent regions of pixels of front display 150 so as to be viewable through the substantially transparent regions. As such, pixels of rear display 140 are controllable to display substantially transparent, black, white, grayscale, or another suitable color depending upon the particular display technology that is used to be viewable through the substantially transparent regions of pixels of front display 150. For example, rear display 140 is controlled to display white, black, and/or grayscale pixels aligned with selected pixels of front display 150 corresponding to the white, black, and/or grayscale regions of the image that are displayed as substantially transparent by pixels of front display 150 (e.g., where red, green, and blue subpixels in such pixels are off).

In particular embodiments, display 110 is capable of displaying an image that includes one or more black regions.

Rear display 140 is capable of displaying the black regions by controlling pixels corresponding to the black regions of the image to appear black. The pixels of front display 150 corresponding to the black regions of the image are controlled to appear transparent. As such, the black pixels from rear display 140 are visible when looking at the front of device 100 to generate the black portions of the image. By displaying black pixels as opposed to using clear pixels to represent black, the contrast of display 110 is improved.

In particular embodiments, display 110 is capable of displaying an image that includes one or more white regions. Rear display 140 is capable of displaying the white regions by controlling pixels corresponding to the white regions of the image to appear white. The pixels of front display 150 corresponding to the white regions of the image are controlled to appear transparent. As such, the white pixels from rear display 140 are visible when looking at the front of device 100 to generate the white portions of the image.

In particular embodiments, display 110 is capable of displaying an image that includes one or more grayscale regions. Rear display 140 is capable of displaying the grayscale regions by controlling pixels corresponding to the grayscale regions of the image to appear grayscale. The pixels of front display 150 corresponding to the grayscale regions of the image are controlled to appear transparent. As such, the grayscale pixels from rear display 140 are visible when looking at the front of device 100 to generate the grayscale portions of the image.

In particular embodiments, rear display 140 is capable of controlling pixels to appear at least partially opaque or opaque (e.g., black, white, and/or grayscale) that are aligned with pixels of front display 150 that are displaying red, green, or blue. By displaying an opaque pixel or at least partially opaque pixel in rear display 140 behind and superposed with a pixel of front display 150 displaying a color, rear display 140 blocks ambient light emanating from behind display 110 at least with respect to the pixels that are controlled to display opaque in rear display 140. By reducing the ambient light, contrast of display 110 is improved.

As an illustrative and nonlimiting example, referring to FIG. 43, portion 4302 of the image displayed on display 110 is formed by rear display 140 displaying image 4202 superposed with image 4404 on front display 150. The pixels of rear display 140 forming image 4402 may be black, white, or grayscale. The pixels of image 4404 of front display 150 may be any color. The pixels of rear display 140 forming image 4402 block ambient light from behind display device 100 thereby providing increased contrast for the resulting, combined image 4302 of display 110.

In particular embodiments, rear display 140 is pixel addressable. In other embodiments, rear display 140 is row addressable or column addressable to control transparency and provide regions configured to scatter, reflect, or absorb light. In one or more embodiments, rear display 140 may include a single pixel that is controllable to display clear, grayscale, white, or black. The single pixel of rear display 140 may be sized to approximately the size of rear display 140 so that the entire rear display is electronically controllable to be entirely and uniformly white, entirely and uniformly black, entirely and uniformly transparent, or entirely and uniformly grayscale. It should be appreciated, however, that the single pixel of rear display 140 can be dyed to appear black, white, silver, red, green, blue, cyan, magenta, or yellow. In some embodiments, display 110 uses side illumination or uses a frontlit in LCD configuration. In some embodiments, display 110 includes a touch input layer. It should be appreciated that display 110 may operate under control of a video controller and/or processor (not shown).

Figure 45A:
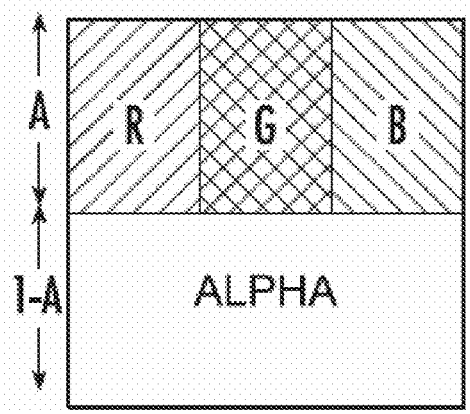
FIGS. 45A-45E illustrate examples of partially emissive pixels having an alpha channel.

FIGS. 45A-43E illustrate examples of partially emissive pixels having an alpha channel. In particular embodiments, partially emissive pixels 160 may have any suitable shape, such as for example, square, rectangular, or circular. The example partially emissive pixels 160 illustrated in FIGS. 45A-45E have subpixels and alpha regions with various arrangements, shapes, and sizes. In the examples of FIGS. 45A-45E, the alpha region is provided by rear display 140. Front display 150 provides the red, green, and blue subpixels and a substantially transparent region through which the alpha region of rear display 140 is visible.

Figure 45B:
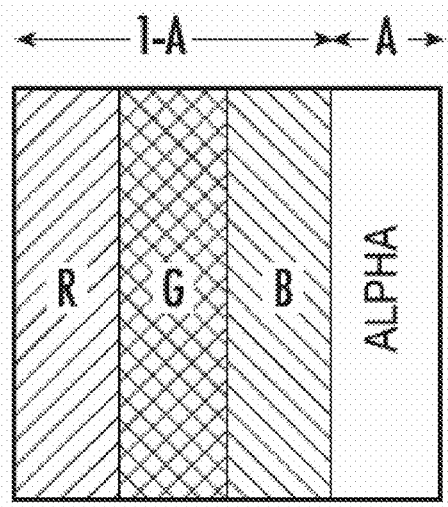
Figure 45C:
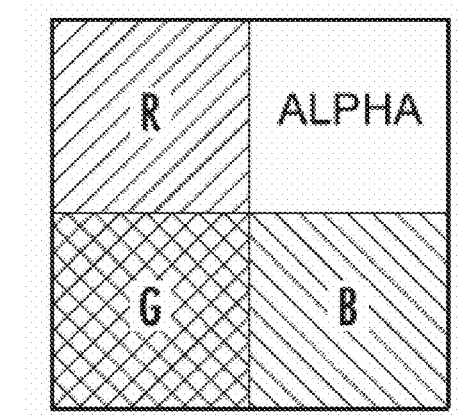
Figure 45D:
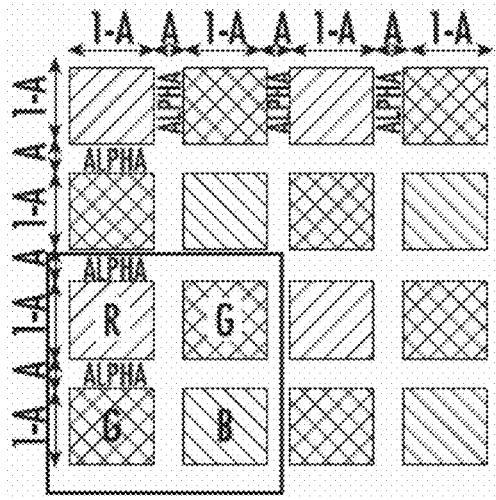
Figure 45E:
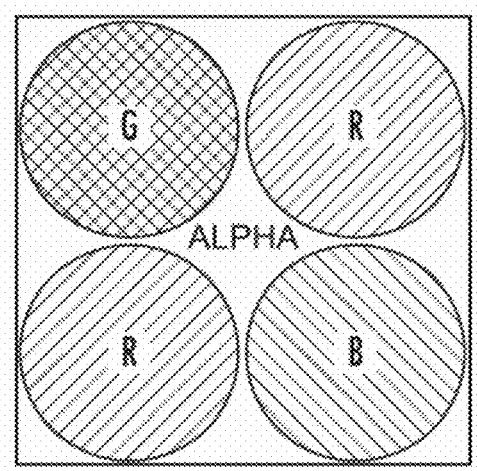

In FIG. 45A, partially emissive pixel 160 includes three adjacent rectangular subpixels ("R," "G," and "B") and an alpha region located below the three subpixels with the alpha region having approximately the same size as the three subpixels. In FIG. 45B, partially emissive pixel 160 includes three adjacent rectangular subpixels and an alpha region located adjacent to the blue subpixel, the alpha region having approximately the same size and shape as each of the subpixels. In FIG. 45C, partially emissive pixel 160 is subdivided into four quadrants with three subpixels occupying three of the quadrants and the alpha region located in a fourth quadrant. In FIG. 45D, partially emissive pixel 160 has four square-shaped subpixels with the transparent region located in between and around the four subpixels. In FIG. 45E, partially emissive pixel 160 has four circular subpixels with the alpha region located in between and around the four subpixels. Although this disclosure describes and illustrates particular partially emissive pixels having particular subpixels and alpha regions with particular arrangements, shapes, and sizes, this disclosure contemplates any suitable partially emissive pixels having any suitable subpixels and alpha regions with any suitable arrangements, shapes, and sizes.

In particular embodiments, the pixels of rear display 140 illustrated in FIGS. 45A-45E are sized the same as, and aligned with, the clear regions of the partially emissive pixels of front display 150. In other embodiments, the pixels of rear display 140 illustrated in FIGS. 45A-45E are sized the same as, and aligned with, the entire partially emissive pixels of front display 150. In that case, for example, the pixel of rear display 140 would be sized to the area of a pixel of front display 150 that includes the red, green, and blue subpixels and the substantially transparent region.

Figure 46:
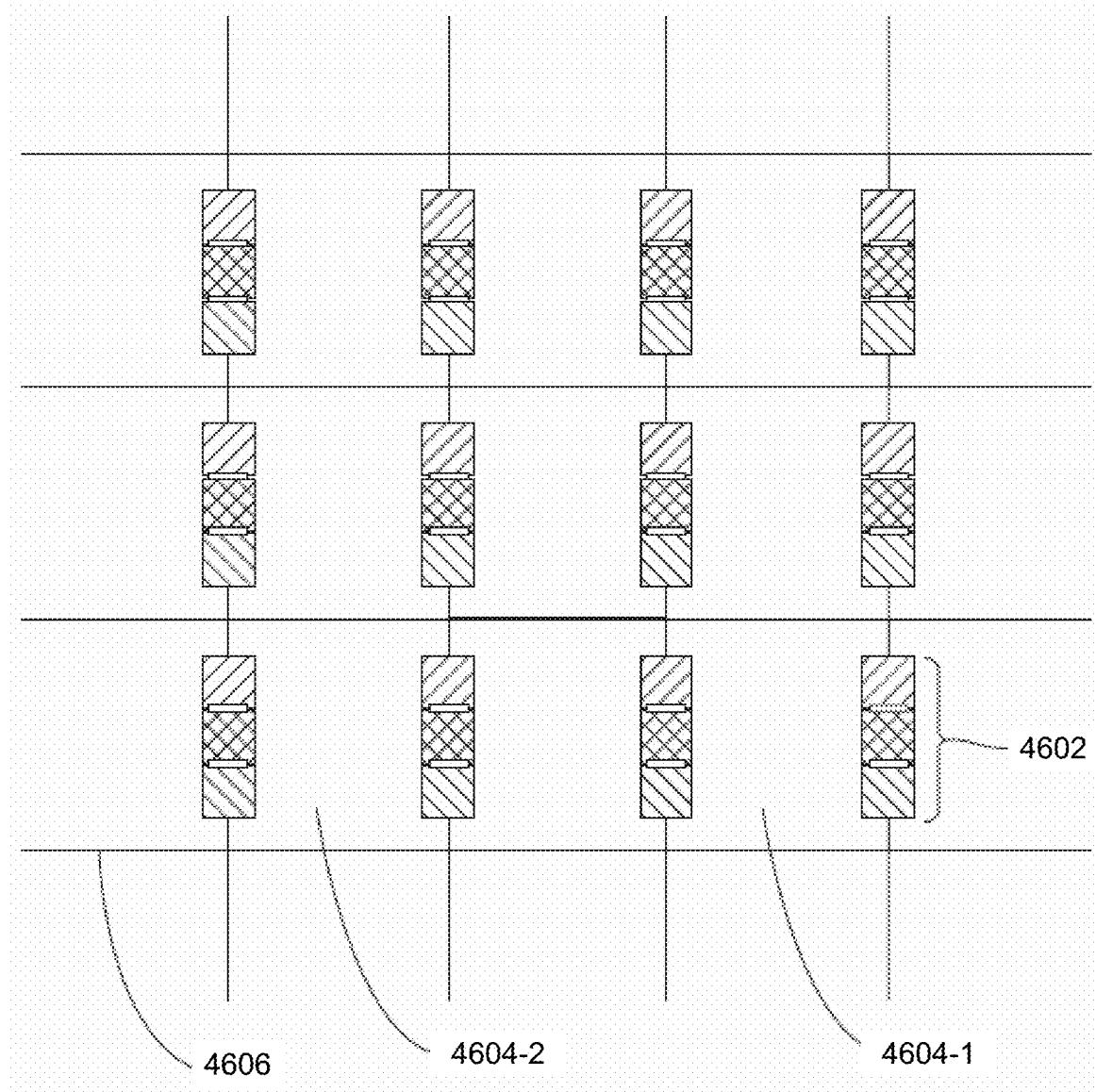
FIG. 46 illustrates another example implementation of the display of FIGS. 43-44.

FIG. 46 illustrates another example implementation of display 110. In the example of FIG. 46, front layer 150 includes partially emissive pixels 160. In particular embodiments, the partially emissive pixels of layer 150 include three adjacent subpixels ("R," "G," and "B") shown as subpixels 4602, while the pixels of rear layer 140 provide alpha regions 4604. Transparent conductive lines 4606 provide control signals for the "R," "G," and "B" subpixels 4602 of front display 150.

As discussed with reference to FIG. 45, the alpha region is generated by rear display 140 and is visible through the clear regions of the partially emissive pixels of front display 150. In the example of FIG. 46, subpixels 4602 are OLEDs. Alpha regions 4604 are configurable to display transparent, black, grayscale, or white depending upon the particular implementation of rear display 140. In the example of FIG. 46, alpha region 4604-1 is configured to display white or appear as opaque. Alpha region 4604-2 is configured to display black or absorb light. The example of FIG. 46 illustrates that front display 150, being a TOLED display, need not incorporate a fixed black mask allowing front display 150 to achieve a higher degree of transparency than other TOLED displays while still providing increased contrast.

In particular embodiments, referring to FIGS. 43-44, when a white (black) region of an image is to be displayed by display 110, the pixels of rear display 140 corresponding to the white (black) region are controlled to appear white (black). The pixels of front display 150 corresponding to the white (black) region are controlled so that the "R," "G," and "B" subpixels are turned off. In particular embodiments, referring to FIGS. 43-44, the transparency of pixels of rear display 140 corresponding to a selected region of an image are controlled to appear as white, grayscale, black or another color so as to block or at least partially block ambient light. The pixels of front display 150 corresponding to the selected region of the image are controlled so that the "R," "G," and "B" subpixels are turned on as appropriate to generate the intended color. Further, the amount of substantially transparent regions used may be changed based upon the application or use of display 110 to achieve the desired transparency and pixel density.

Figure 47:
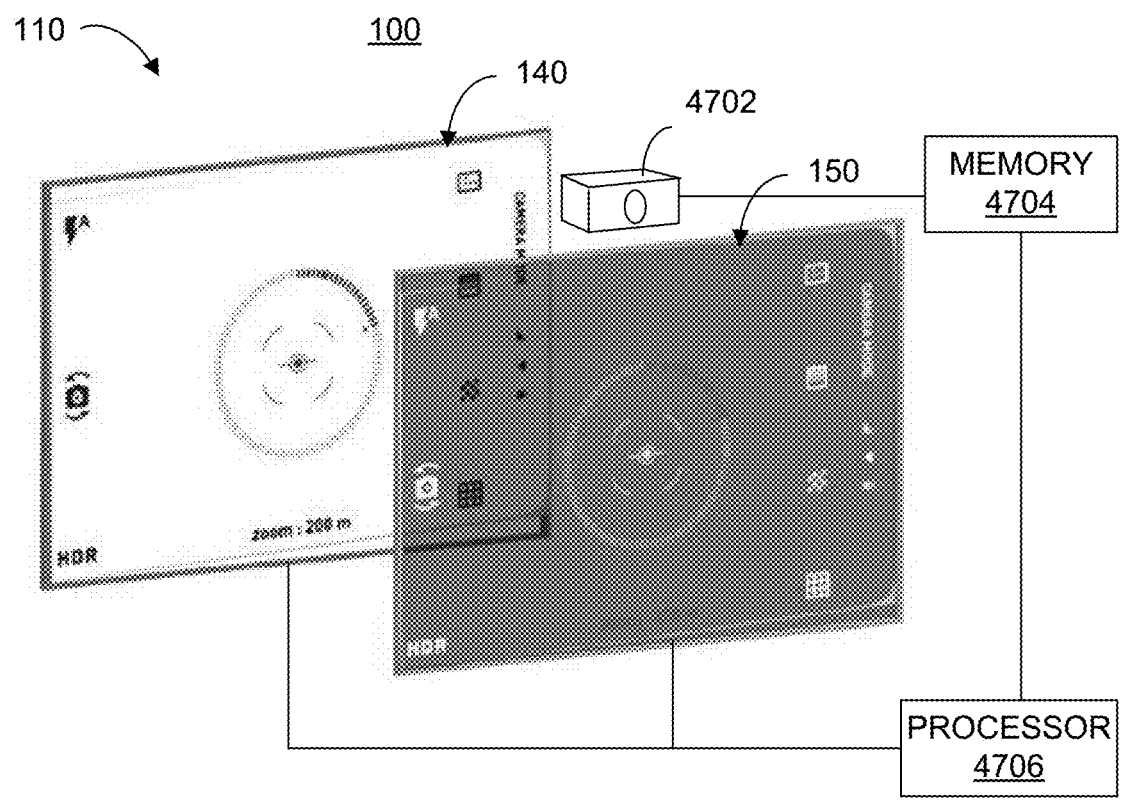
FIG. 47 illustrates an exploded view of an example display device including a camera.

FIG. 47 illustrates an exploded view of an example display device including a camera. In the example of FIG. 47, display device 100 includes a camera 4702. Camera 4702 is capable of capturing images and/or video (hereafter collectively referred to as "image data"). Camera 4702 may be mounted in the case or housing of display device 100 and face outward into the viewing cone in front of front display 150 as described in connection with FIG. 5.

Camera 4702 is coupled to memory 4704. Memory 4704 is coupled to a processor 4706. Examples of memory and a processor are described herein in connection with FIG. 32. In an aspect, memory 4704 may be implemented as a local memory configured to store instructions and data such as image data from camera 4702. Processor 4706 is capable of executing the instructions stored in memory 4704 to initiate operations for controlling transparency of the pixels of the transparent display (e.g., rear display 140) and the addressable regions of the partially emissive pixels of the transparent color display (e.g., front display 150).

Processor 4706 is capable of executing the instructions stored in memory 4702 to analyze the image data. In particular embodiments, processor 4706 is capable of detecting a gaze of a person in the viewing cone from the image data and determining a see-through overlap of the pixels of front display 150 with the pixels of rear display 140 based upon the gaze or angle of the gaze of the user relative to the surface of display 110. Processor 4706 is capable of adjusting the transparency of one or more or all of the pixels of rear display 140 and/or adjusting the addressable regions of one or more or all of the partially emissive pixels of front display 150 in response to the determined see-through overlap. For example, by adjusting transparency of pixels of rear display 140 and/or addressable regions of partially emissive pixels of front display 150 as described, processor 4706 is capable synchronizing operation of rear display 140 with front display 150 so that regions of any image displayed by each respective display are aligned with respect to the viewing angle (e.g., gaze) of the user. Processor 4706 is capable of dynamically adjusting the images as displayed on rear display 140 and front display 150 for purposes of alignment along the changing viewing angle (e.g., gaze) of the user over time.

For example, processor 4706 is capable of performing object recognition on the image data to detect a human being or user within the image data. In an aspect, processor 4706 detects the face of a user and recognizes features such as the eyes. Processor 4706 is capable of determining the direction of the user's gaze relative to display 110. Based upon the direction of the user's gaze, processor 4704 is capable of determining the see-through overlap of pixels of front display 150 over pixels of rear display 140.

The example embodiments described herein facilitate increased contrast in displays by blocking ambient light and/or generating black pixels. The ability to increase contrast as described means that front display 150, e.g., the transparent color display, is able to operate with a lower degree of brightness. For example, front display 150 is able to reduce the amount of current carried in the lines that drive the "R," "G," and "B" subpixels. The reduction in current needed to drive display 110 facilitates improved scalability in panel size, improved lifetime of display 110, and helps to reduce eye strain experienced by the user.

Referring to FIGS. 43-47, in one or more embodiments, rear display 140 is capable of including one or more pixels that do not include dye. In one or more embodiments, rear display 140 is capable of including one or more pixels where each pixel includes dye. In one or more embodiments, rear display 140 is capable of including a plurality of pixels where only some, e.g., a subset of pixels of rear display 140, include dye. Further, in particular embodiments, different dyes may be used for different pixels. For example, rear display 140 is capable of having one or more pixels including a first dye color, one or more pixels including a second and different dye color, etc. Rear display 140 can include more than two differently dyed pixels. Rear display 140, for example, is capable of including one or more pixels dyed black, one or more pixels dyed white, one or more pixels dyed silver, one or more pixels dyed red, one or more pixels dyed green, one or more pixels dyed blue, one or more pixels dyed cyan, one or more pixels dyed magenta, one or more pixels dyed yellow, or any combination of the foregoing.

Rear display 140 is capable of displaying one or more different colored regions of an image emitted by front display 150 depending upon the particular color of the pixel(s) displayed or visible behind pixels (e.g., partially emissive pixels) of front display 150 when such pixels of front display 150 are controlled to appear transparent (e.g., clear). Rear display 140 is further capable of displaying different colored pixels (e.g., at least partially opaque) behind, e.g., superposed, with pixels of front display 150 that are controlled to display color. In this regard, the alpha channel may be implemented using one or more pixels that are dyed or not dyed. The dyed pixel(s) can include pixels dyed black, white, silver, red, green, blue, cyan, magenta, yellow, or any combination of dyed pixels.

Display 110, configured as described in connection with FIGS. 43-47, is capable of displaying images that include colors from transparent to black or transparent to white by varying the transparency of pixels of rear display 140 on a per-pixel basis. Display 110, as described in connection with FIGS. 43-47, may be incorporated within any of a variety of different devices, apparatus, or systems. Example devices that may include display 110 include, but are not limited to, a tablet computer; a mobile phone; a large format display; a public display; a window; a laptop computer; a camera; a see-through display; a head-mounted display; a heads-up display; virtual reality equipment such as goggles, headsets, glasses, mobile phones, and tablet computers; augmented reality equipment such as headsets, glasses, mobile phones, and tablet computers; and other suitable devices.

Figure 48:
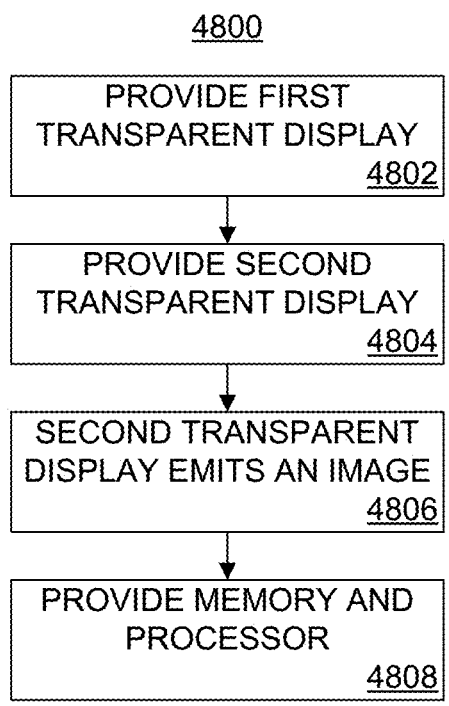
FIG. 48 illustrates an example method for implementing a display.

FIG. 48 illustrates an example method 4800 for implementing a display. In one or more embodiments, method

4800 is used to implement a display as described herein in connection with FIGS. 43-47.

In block 4802, a first transparent display is provided. The first transparent display, for example, can be manufactured to include a plurality of pixels. The transparency of each of the plurality of pixels of the first display can be electronically controlled. In one or more embodiments, the plurality of pixels of the first transparent display are electronically controllable to display as clear, white, grayscale, or black.

In block 4804, a second transparent display is provided. In one or more embodiments, the second transparent display can be manufactured to emit an image. In example embodiments, the second transparent display is positioned in front of the first transparent display. In particular embodiments, the second transparent display is a color transparent display. In an aspect, the second transparent display includes a plurality of partially emissive pixels, wherein each partially emissive pixel has an addressable region and a clear region.

In one or more embodiments, the second transparent display is an emissive display and the first transparent display is a non-emissive display. For example, the non-emissive display can be a polymer-dispersed liquid crystal display, an electrochromic display, an electro-dispersive display, or an electrowetting display. The emissive display can be a liquid-crystal display, a light-emitting diode display, or an organic light-emitting diode display. In a particular example, the emissive display is a transparent organic light emitting diode display and the non-emissive display is an electrophoretic display. In another example, the emissive display is a transparent light emitting diode display and the non-emissive display is a liquid crystal display including Smectic A liquid crystals.

In block 4806, a device including the first transparent display and the second transparent display displays an image or series of images. In one or more embodiments, black regions of the image are shown by having regions of the second transparent display corresponding to the black regions of the image be transparent and regions of the first transparent display corresponding to the black regions of the image appear black. In one or more embodiments, the image is displayed where regions of the second transparent display corresponding to colored regions of the image display colors and regions of the first transparent display corresponding to the colored regions appear opaque. The operations described for displaying colored regions of the image may be performed simultaneously with the operations for displaying black regions of the image.

In particular embodiments, the pixels of the first transparent display are aligned with the partially emissive pixels of the second transparent display and are viewable through the clear regions of the partially emissive pixels of the second transparent display.

In block 4808, a memory and a processor are optionally provided. The memory is capable of storing instructions. The processor is coupled to the memory. In response to executing the instructions, the processor is capable of initiating operations for controlling transparency of the pixels of the first transparent display and the addressable regions of the partially emissive pixels of the second transparent display.

In one or more embodiments, a camera is optionally provided. For example, the camera is capable of generating image data for a viewing cone in front of the second transparent display. As noted, the second transparent display may be positioned in front of the first transparent display. The processor, for example, is capable of analyzing the image data and detecting a gaze of a person in the viewing cone from the image data. The processor further is capable of determining a see-through overlap of the pixels of the second transparent display with the pixels of the first transparent display based upon the gaze of the user or a location of the user.

In particular embodiments, the processor is capable of adjusting pixels of the first transparent display and/or pixels of the second transparent display based upon the see-through overlap. For example, the processor is capable of aligning the regions of the image displayed by the first transparent display with the corresponding regions of the image displayed by the second transparent display given the see-through overlap (e.g., angle of the user's gaze and/or location relative to the displays).

In illustration, the first transparent display and the second transparent display may be substantially parallel to one another (e.g., as pictured in FIG. 44). In an operating mode, with the first transparent display and the second transparent display being substantially aligned, regions (of an image) displayed by the first transparent display are aligned with corresponding regions (of the same image) displayed by the second transparent display. The processor is capable of shifting the regions displayed by the first display and/or the corresponding regions of the same image displayed by the second transparent display to align when viewed from the viewing angle (e.g., a changing viewing angle) of the user.

Figure 49:
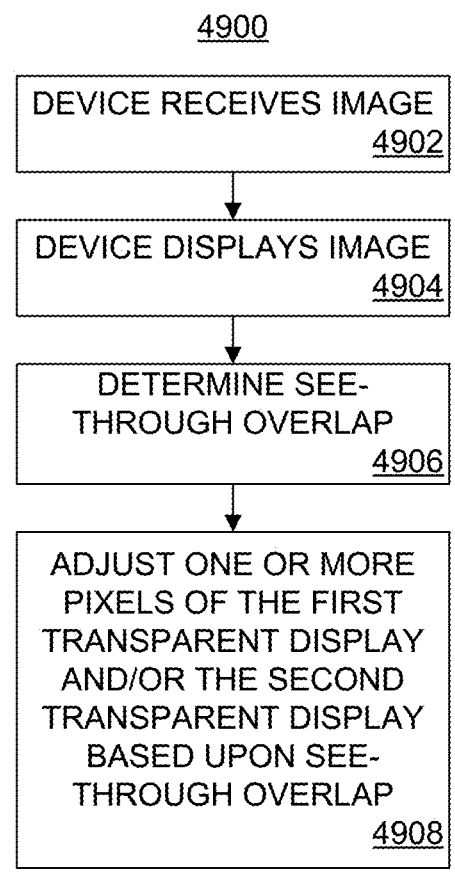
FIG. 49 illustrates an example method for operation of a display.

FIG. 49 illustrates an example method 4900 for operation of a display. In one or more embodiments, the display is implemented as the example display described in connection with FIGS. 43-47.

In block 4902, an image to be displayed on a device is received. The device is capable of receiving the image from a camera of the device, from other circuitry of the device, from a source external to the device, from memory of the device, or in response to a processor of the device executing instructions. The device can include a first transparent display and a second transparent display. The first transparent display can include a plurality of pixels, wherein transparency of each of the plurality of pixels is electronically controlled. The second transparent display is capable of emitting an image.

In one or more embodiments, the second transparent display is a color transparent display. In particular embodiments, the second transparent display is positioned in front of the first transparent display.

In block 4904, the image is displayed on the device. In one or more embodiments, black regions of the image are shown by having regions of the second transparent display corresponding to the black regions of the image be transparent, and by having regions of the first transparent display corresponding to the black regions of the image appear black. In one or more embodiments, regions of the second transparent display corresponding to colored regions of the image display colors and regions of the first transparent display corresponding to the colored regions appear opaque. The operations described for displaying color regions of the image may be performed simultaneously with the operations for displaying black regions of the image.

In block 4906, a see-through overlap is optionally determined. For example, a processor is capable of determining the see-through overlap of the pixels of the second transparent display with the pixels of the first transparent display. The see-through overlap may be determined using image processing by detecting the viewing angle and/or gaze of a user from image data captured by a camera that may be incorporated into the device. The see-through overlap indicates whether the regions of the image displayed by the first transparent display are aligned with the regions of the same image displayed by the second transparent display given the viewing angle (e.g., gaze and/or location) of the user.

In block 4908, one or more pixels of the first display and/or the second display are optionally adjusted based upon the see-through overlap. In one or more embodiments, the second transparent display includes a plurality of pixels, wherein transparency of each of the plurality of pixels of the second transparent display is electronically controlled. In that case, a processor of the device is capable of adjusting transparency of one or more or all of the pixels of the first transparent display based upon the see-through overlap. In one or more other embodiments, a processor of the device is capable of adjusting appearance (e.g., color and/or transparency) of one or more or all of the pixels of the second transparent display based upon the see-through overlap. It should be appreciated that the processor is capable of adjusting one or more or all pixels of both the first transparent display and the second transparent display concurrently based upon the see-through overlap. For example, the processor is capable of adjusting the pixels as described so that regions of an image displayed by the first transparent display are aligned with corresponding regions of the same image displayed by the second transparent display given the viewing angle and/or location of the user relative to the device.

Figure 50:
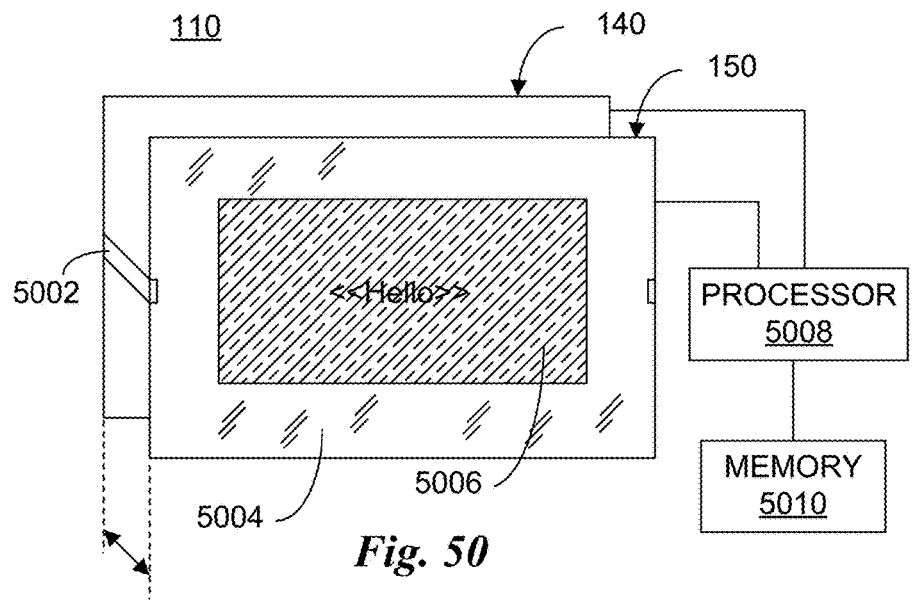
FIG. 50 illustrates an exploded view of an example display.

FIG. 50 illustrates an exploded view of another example display 110. In the example of FIG. 50, a first display such as rear display 140 is shown with a second display such as front display 150. In the example of FIG. 50, rear display 140 and front display 150 are aligned as described within this disclosure. For example, the pixels of front display 150 and rear display 140 may be aligned so that their borders are situated directly over or under one another and/or so that the transparent regions of pixels of one display are superposed with the addressable regions of pixels of the other display, and vice versa.

Rear display 140 may be implemented as a color display. For example, rear display 140 may be implemented as any suitable light emitting (e.g., emissive) or light modulating layer. Example implementations of rear display 140 include, but are not limited to, LCD, a light emitting diode display, a light enhanced layer, OLED, and QD. Rear display 140 is capable of either emitting light or modulating a light source such as a backlight to produce an image. Rear display 140 may or may not be transparent.

Front display 150 is implemented as a transparent display that is capable of selectively diffusing light from rear display 140. For example, front display 150 is capable of diffusing light associated with an image as produced by rear display 140. Front display 150 is capable of scattering ambient light or diffusing light from rear display 140 to produce visual effects. Example implementations of front display 150 include, but are not limited to, a PDLC display, a PSLC display, an electrochromic display, an electro-dispersive display, an electrowetting display, suspended particle device, an ITO display, or an LCD in any of its phases (e.g., nematic, TN, STN, Cholesteric, SmA, SmB, SmC) or any LC displays. Display 110 may also include a touch sensitive layer.

In particular embodiments, front display 150 includes one or more reflective, transflective, or emissive display layers. Front display 150 is capable of operating as a diffuser to facilitate the creation of any of a variety of visual effects such as blurring and white color enhancement or other color enhancement. Examples of different types of blurring effects can include, but are not limited to, vignetting, speed, motion, depth, a highlight layer, a privacy filter, a transition, a frame, censorship, block, or texturing.

In particular embodiments, display 110 uses a light emitting or light modulating display as rear display 140, front display 150 as described, and incorporate frontlighting. In particular embodiments, display 110 uses a light emitting or light modulating display as rear display 140, front display 150 as described, and incorporates backlighting. In one or more embodiments where backlighting or frontlighting is used, device 110 includes side illumination. Display 110 may include a touch sensitive layer whether frontlighting, backlighting, and/or side illumination is used.

In particular embodiments, a spacer 5002 is optionally included within display 110. Addition of spacer 5002 is operable to increase the amount of scattering generated by front display 150. For example, spacer 5002 may be adjustable to change the distance between rear display 140 and front display 150. Spacer 5002 can be disposed between rear display 140 and front display 150. For example, one or more spacers 502 can be coupled to the tops of displays 140 and 150, coupled to one or both sides of displays 140 and 150, coupled to the bottom of displays 140 and 150, or on any combination of the edges of the displays. Display 110 may include one or more of spacers 5002. In particular embodiments, spacer 5002 is electronically or mechanically controlled. By further changing the distance between rear display 140 and front display 150, the amount of scattering produced by front display 150 may be increased or decreased. For example, increasing the distance between rear display 140 and front display 150 increases the amount of scattering produced by front display 150.

Display 110 is capable of operating in a plurality of different modes. In a first mode, rear display 140 is on and displays color images while front display 150 is transparent. In a second mode, rear display 140 is in an off state while front display 150, which may include a bistable display layer, is capable of displaying an image or any information while consuming little power. In a third, or "ambient," mode, display 110 is capable of enhancing white color by diffusing ambient light using front display 150. In a fourth, or "backlight," mode, display 110 is capable of enhancing colors such as black, white, silver (e.g., TiO2), red, green, blue, cyan, magenta, and yellow by diffusing ambient light while also generating pixels of the color being enhanced using rear display 140. In a fifth mode, display 110 is capable of generating a blurring effect by using front display 150 to diffuse pixels of rear display 140.

In the example of FIG. 50, front display 150 is configured to display a frame 5004 that appears white using a blurring effect. Region 5006 of front display 150 is transparent so that a person is able to view content displayed on rear display 140 directly behind transparent region 5006 of front display 150. For example, the word "Hello" is displayed by rear display 140 and is visible through transparent region 5006 of front display 150 with frame 5004 surrounding the content.

In the example of FIG. 50, processor 5008 and memory 5010 are included. Processor 5008 is configured to control operation of rear display 140 and front display 150. In one or more embodiments, processor 5008 is capable of controlling display 110 through a display controller and/or other driver circuitry (not shown). In one or more embodiments, processor 5008 and/or memory 5010 are part of a display controller. Processor 5008 is capable of initiating the various modes of operation of display 110 described herein. In particular embodiments, display 110 is capable of operating in the ambient mode where rear display 140 is capable of emitting or modulating light to produce an image under control of processor 5008 while front display 150 is operative to scatter ambient light and diffuse light from rear display 140 under control of processor 5008. Processor 5008 is capable of controlling rear display 140 and front display 150 to operate in coordination as previously described to produce one or more of the visual effects and/or implement any of the various modes of operation described herein.

In particular embodiments, display 110 operates in the backlight mode where front display 150 is operative to enhance white color by diffusing ambient light in regions and/or pixels aligned with regions and/or pixels of rear display 140 that appear white. By using both rear display 140 and front display 150 to generate white pixels, the amount of power used by display 110 to generate pixels appearing white is reduced since less current is required to drive the white pixels of rear display 140 particularly in bright light environments. The ability to display white color without using bright white pixels from rear display 140 further helps to reduce eye strain for users in low light environments.

In particular embodiments, processor 5008 is capable of receiving a signal specifying image data that may be stored in memory 5010. The image data includes information embedded therein as another layer, channel, tag, or metadata. The embedded information encodes the particular visual effects that are to be implemented by display 110 in time with the image data that is also displayed by display 110. In an aspect, the embedded information is obtained or read by processor 5008 from image data to implement the particular visual effects specified by the embedded information. The embedded information, for example, may be considered a separate channel such as a diffusion or scatter channel that is separate from the channel providing RGB information. In response to reading the embedded information, processor 5008 controls front display 150 and/or rear display 140 to create the visual effects specified by the embedded information. Processor 5008 is capable of controlling rear display 140 and front display 150 to operate in synchronization and/or alignment with one another.

In particular embodiments, processor 5008 is capable of performing image processing on image data obtained from received signals. Processor 5008 is capable of detecting particular conditions in the image data that cause processor 5008 to initiate or implement particular visual effects and/or modes of operation. In this manner, processor 5008 is capable of processing the received video signal to determine when to activate the scattering layer, e.g., front display 150. As an illustrative and nonlimiting example, front display 150 may be controlled to be transparent or substantially transparent. Processor 5008, for example, is capable of dynamically activating front display 150 to diffuse light in response to detecting pre-determined conditions from image data, sensor data, or a combination of image data and sensor data in real time. In general, the conditions refer to attributes of the content of the image data and/or sensor data as opposed to other information carried in the received signal or embedded in the image data (e.g., as opposed to the scatter channel).

As an illustrative and nonlimiting example, processor 5008 is capable of analyzing image data using image processing to detect inappropriate content. For example, processor 5008 may detect inappropriate content by performing optical character recognition or other object identification or by comparing images specified by video signals with an image library including image of inappropriate content that can be matched to a received signal. In such cases, processor 5008 may implement a censorship or blocking effect, e.g., a blurring effect, by controlling operation of front display 150 to hide or mask the entirety of rear display 140 or the regions of rear display 140 determined to display inappropriate content. Processor 5008 is capable of determining the location of regions or text and/or shape of regions or text in the image that are to be blurred or otherwise masked. Processor 5008 is capable of controlling pixels of front display 150 to blur the determined regions emitted by rear display 140. In another example, processor 5008 is capable of identifying regions of white within image data in real time and/or substantially real time and controlling front display 150 and/or rear display 140 to enhance such regions when displayed on display 110. In another example, processor 4204 is capable of detecting certain patterns or textures within image data in real time and/or substantially real time and controlling front display 150 to enhance the patterns or textures.

By detecting content of an image and/or video signal using processor 5008 and applying effects using front display 150 based upon and/or in response to the detected content, the original content need not be modified. In other words, the embodiments described herein can dynamically perform the operations described when a conventional video signal is received by applying the image processing described herein and applying the visual effects using front display 150.

In one or more embodiments, processor 5008 is capable of detecting embedded information in a received signal or embedded in image data while also dynamically applying visual effects based upon any other conditions detected within the image data and/or based upon sensor data.

In particular embodiments, a user interface is provided. The user interface may be included with display 110 and/or generated and displayed on display 110, may include one or more buttons or switches, and/or a touch interface. Through the user interface, a user is able to configure aspects of operation of display 110. Examples of operations that the user is able to configure through the user interface include, but are not limited to, activation or deactivation of front display 150, selecting a source for generating visual effects, specifying the particular visual effects that can be used or are to be used, and specifying a strength or amount of one or more or each of the visual effects. With regard to source selection, for example, the user is able to specify whether visual effects are to be applied based upon tag(s) or other embedded information in the image data, based upon image processing (e.g., dynamically), sensor data, or any combination thereof.

Display 110, as described with reference to FIG. 50, may be incorporated into, or used within, any of a variety of different devices, apparatus, or systems. For example, display 110 may be used to implement televisions, public displays, monitors, mobile phones, tablet computers, electronic readers, advertising panels, wearable devices, digital cameras, heads-up displays, and transparent displays.

Figure 51:
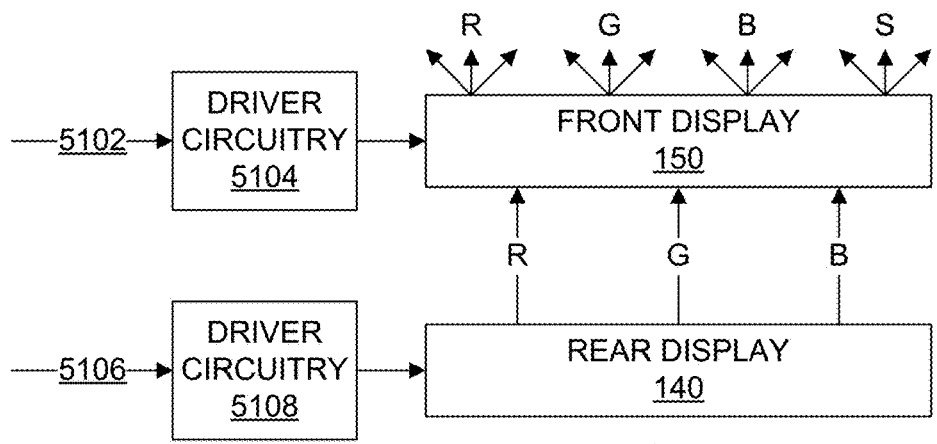
FIG. 51 illustrates another example display.

FIG. 51 illustrates another example display 110. In the example of FIG. 51, signal 5102 conveys scattering information (e.g., a scatter channel) to driver circuitry 5104. Driver circuitry controls operation of front display 150. More particularly, driver circuitry 5104 is capable of decoding the scattering information from signal 5102 and controlling the individual pixels of front display 150 based upon signal 5102. Signal 5106 conveys red, green, and blue video data to driver circuitry 5108. Driver circuitry 5108 controls operation of rear display 140. Driver circuitry 5108 is capable of decoding signal 5106 and controlling the individual pixels of read display 140 based upon signal 5106. As pictured, front display 150 is capable of diffusing red, green, and blue light emitted from rear display 140.

Figure 52:
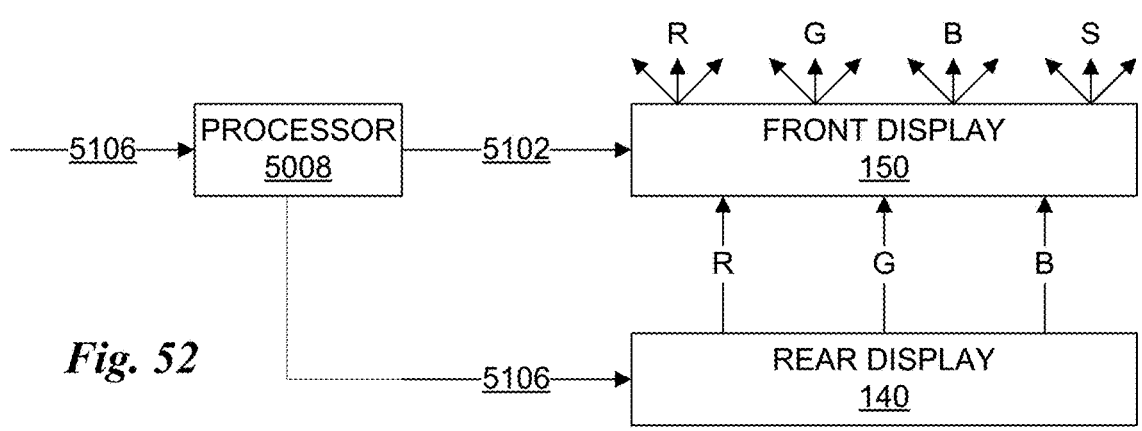
FIG. 52 illustrates another example display.

FIG. 52 illustrates another example display 110. For purposes of illustration, driver circuitry 5104 and driver circuitry 5108 are not shown. In the example of FIG. 52, processor 5008 is included and is capable of processing signal 5106. For example, processor 5008 may be implemented as an image processor. Processor 5008 is capable of outputting signal 5106 to rear display 140 (e.g., by way of driver circuitry). Further, processor 5008 is capable of generating, or deriving, signal 5102 from signal 5106 and providing signal 5102 to front display 150 (e.g., by way of driver circuitry).

In one or more embodiments, processor 5008 is capable of extracting embedded data from signal 5106 and generating signal 5102 from the embedded data. As discussed, the embedded data can indicate the particular types of effects and/or modes of operation such as contrast enhancement and/or color enhancement to be performed. Processor 5008 is capable of encoding such data as signal 5102. In particular embodiments, processor 5008 is capable of analyzing content of signal 5106 and/or sensor data to determine the particular types of effects and/or modes of operation to be performed. Processor 5008 generates signal 5102, which encodes such operations and controls operation of the pixels of front display 150 to implement the effects and/or modes of operation described herein.

Figure 53:
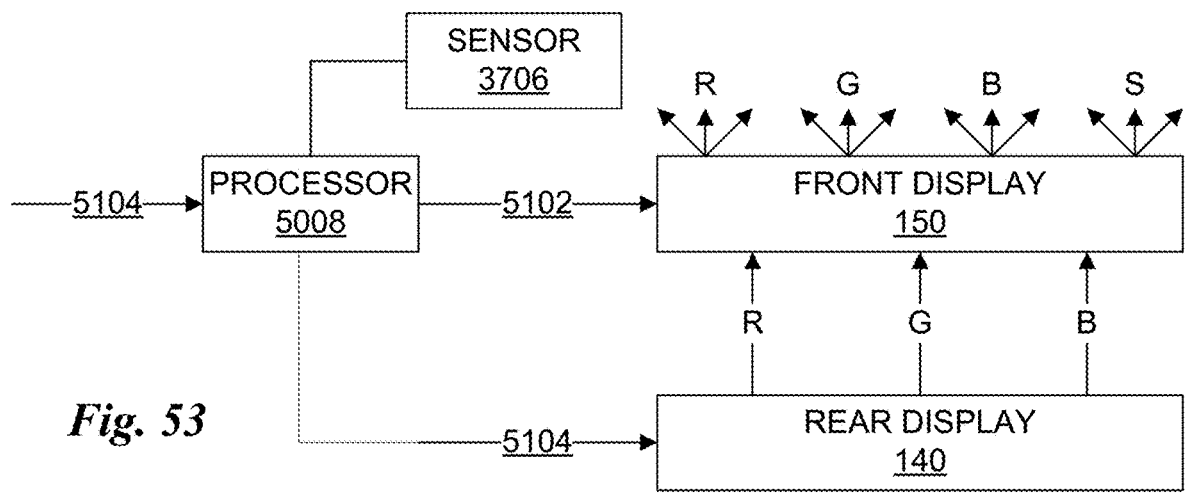
FIG. 53 illustrates another example display.

FIG. 53 illustrates another example display 110. In the example of FIG. 53, one or more sensors 3706 are included. One or more sensors 3706 may be included at an edge of the front display 150, dispersed throughout front display 150, in one or more locations in the housing of display 110, or on other suitable locations. Sensors 3706 may be included in or at any suitable location within display 110. As discussed, in particular embodiments, one or more of sensors 3706 is configured to detect light. Examples of sensors that detect light include, but are not limited to, photodiodes and phototransistors. In particular embodiments, one or more or all of sensors 3706 may be implemented as other types of sensors capable of detecting physical presence of a user, proximity and/or distance of a user to display 110, identity of a user, location of a user, and/or any of the various attributes of a user described herein. For example, one or more or all of sensors 3706 may be implemented as a camera. In other embodiments, sensors 3706 may include a combination of sensors configured to detect light such as light intensity and/or color (e.g., photodiodes and/or phototransistors) and other types of sensors capable of detecting users, proximity of users, and/or identity of users.

In one or more embodiments, processor 5008 is capable of operating on sensor data generated by sensor 3706. Processor 5008 is capable of modifying signal 5102 and/or signal 5104 based, at least in part, upon the sensor data obtained from sensor 3706. In particular embodiments processor 5008 is capable of detecting a level of ambient light from sensor 3706. Processor 5008 is capable of activating rear display 150 to so that selected pixels of front display 150 are no longer transparent and, instead, diffuse light based upon a detected level of ambient light. The selected pixels can diffuse light to implement color enhancement. For example, in response to detecting a threshold level or amount of ambient light, processor 5008 is capable of controlling front display 150 to diffuse light in selected regions, e.g., regions where rear display 140 appears white. Accordingly, in environments with high ambient light, display 110 is capable of providing increased contrast through color enhancement.

For example, processor 5008 is capable of controlling pixels of front display 150 based upon image luminance of the image emitted by rear display 140. In regions of front display 150 that are superposed with regions of rear display 140 having a mean image luminance greater than a threshold amount, processor 5008 is capable of causing the pixels of front display 150 to scatter light. Further, processor 5008 is capable of controlling the amount of scattering provided by the pixels of front display 150. In one or more embodiments, for example, regions of an image displayed by rear display 140 that have an image luminance above a threshold image luminance are detected. These regions may be white regions of an image including, but not limited to, white text or lettering. By diffusing light using display 150 in regions with image luminance exceeding a threshold image luminance, display 110 becomes easier to read through increased contrast in high ambient light conditions.

In the case of the color white, for example, processor 5008 is capable of performing white enhancement by controlling pixels in front display 150 that are aligned with regions of the image displayed by rear display 140 that appear white to diffuse light, thereby enhancing the white color of the displayed image and increasing contrast of display 110. A pixel of front display 150, for example, that is configured to scatter light, also scatters ambient light. In such configurations, the higher the level of ambient light, the greater the contrast produced by diffusing light using pixels of front display 150 that are superposed or aligned with the white regions (e.g., pixels) of the image generated by rear display 140 that appear white.

In particular embodiments, when performing white enhancement as described above in high ambient light environments, e.g., when the ambient light level exceeds a threshold as determined from the sensor data, processor 5008 is also capable of reducing the power and amount of light generated by rear display 140. For example, processor 5008 is capable of reducing the amount of light generated and/or backlight when rear display 140 is an LCD or an OLED display while still achieving sufficient or increased contrast.

In particular embodiments, one or more front displays 150 may be included where one or more of the different front displays 150 is dyed using a different color. For example, one of front displays 150 is capable of enhancing white. Another one of front displays 150 can have pixels with red dye so that the red dyed front display is capable of enhancing red. In the color enhancement mode, for example, the white front display 150 is controlled to diffuse light in regions of the front display that are superposed with regions of the image displayed by rear display 140 that appear white, thereby enhancing the white regions of the image through increased contrast. The front display 150 with red dye is controlled to diffuse light in regions of the front display that are superposed with regions of the image that appear red as displayed by rear display 140, thereby enhancing the red regions of the image. Additional ones of front display 150 can be added to enhance additional colors, e.g., green, blue, magenta, yellow, and black.

In general, referring to FIGS. 50-53, color enhancement refers to the situation where rear display 140 displays an image and front display 150, being a selected color, applies diffusion to regions of the image generated by rear display 140 that appear as the selected color. For example, white color enhancement can be implemented by controlling pixels of front display 150 to diffuse light (e.g., no longer be transparent, where pixels of front display 150 appear white) in regions of front display 150 that are aligned or superposed with regions of rear display 140 that appear white. For example, green (or another color) color enhancement can be implemented by controlling pixels of front display 150 to diffuse light (e.g., where pixels of front display are dyed green) in regions of front display 150 that are aligned or superposed with regions of rear display 140 that appear green.

Scattering refers to diffusing light using front display 150, where the pixels controlled to scatter light are not coordinated with like color regions from rear display 140. In should be appreciated that larger amounts of scattering can be achieved by stacking additional ones of front display 150 so that multiple ones of front display 150 can be controlled to scatter light in aligned regions or pixels.

Figure 54A:
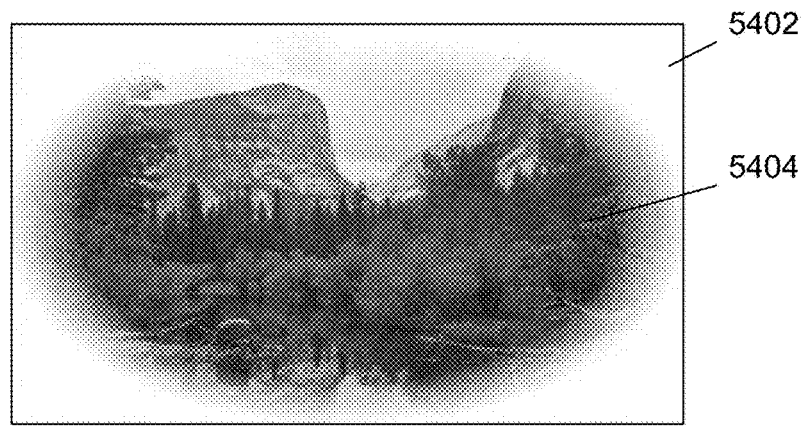

FIGS. 54A-54L illustrate examples of visual effects that can be implemented by display 110 as described in connection with FIGS. 50-53. FIG. 54A illustrates an example of scattering implemented by front display 150. In the example of FIG. 54A, display 150 scatters light to generate a blurring effect. The blurring effect is used to create a vignette 5402 (e.g., perform vignetting) over image 5404 displayed by rear display 140. Vignette 5402, in this example, appears white and opaque near the edges of display 110 and begins to exhibit increasing transparency moving toward the center of display 110 so as to allow image 5404 to be visible.

In one or more embodiments, vignette 5402 may be implemented by front display 150 in response to the processor decoding information from a signal that conveys scattering information. In one or more embodiments, the processor is capable of performing image processing on the received video signal to analyze the content of image 5404 and dynamically apply the visual effect in response to the image processing. In this example, the processor is capable of recognizing a landscape and, in response thereto, invoke blurring to create vignette 5402.

Figure 54B:

FIG. 54B illustrates an example of scattering light using front display 150 to create a speed or a motion effect for the image displayed by rear display 140. In FIG. 54B, the image displayed by rear display 140 is in focus or clear. Front display 150 is operative to scatter light in particular regions of the image displayed by rear display 140 to create the motion effect illustrated in FIG. 54B. As an illustrative example, processor 5008 is capable of performing optical flow detection to identify regions of an image in rapid motion. Using the known locations of the regions in the image with rapid motion (e.g., from frame to frame), processor 5008 causes pixels of front display 150 that are superposed with the regions determined to have rapid motion as displayed by rear display 140 to scatter light.

FIG. 54C illustrates an example of scattering light as implemented by front display 150 to apply a blurring effect to selected regions. The blurring effect creates a depth effect over the image displayed by rear display 140. In the example of FIG. 54C, for regions that are displayed by rear display 140 that include an object 5406 or imagery positioned closer in the field of view (e.g., in the foreground), front display 150 is controlled to be transparent. For regions that are displayed by rear display 140 that include objects, such as object 5408, or imagery positioned farther away in the field of view (e.g., in the background), front display 150 is controlled to apply blurring. For example, front display 150 is controllable to apply increasing blurring to objects that are farther away in the field of view. The blurring effect can be graduated to increase with increasing distance in the field of view from object 5406.

In one or more embodiments, the blurring effect is specified by a signal conveying scattering information. In one or more other embodiments, processor 5008 is capable of performing image processing and applying the blurring effect dynamically in response to determining that the image meets one or more conditions. In one example, processor 5008 is capable of determining that an object in the image, e.g., object 5406, takes up more than a threshold percentage of the field of view shown in the image. In that case, processor 5008 is capable of automatically applying the blurring described or another effect such as the vignette shown in FIG. 54A.

As illustrative and nonlimiting examples, processor 5008 is capable of applying an effect using front display 150 in response to detecting a portrait image, a landscape, an image of a food item, or the like. In performing image processing, processor 5008 is capable of performing operations including, but not limited to, object recognition, facial detection and/or recognition, detecting objects by comparing the image with a reference image database, performing optical character recognition and/or comparing detected text with a dictionary of terms. In response to detecting objects using the techniques described, processor 5008 is capable of causing front display 150 to apply one or more visual effects to the recognized objects.

FIG. 54D illustrates an example of scattering performed by front display 150 to implement a privacy filter effect. In the example of FIG. 54D, rear display 140 displays an image and front display 150 creates a privacy effect by scattering light in regions 5410 and 5412 so as to obscure the faces and/or identity of the persons shown in the image. The privacy filter effect of front display 150 is superposed over the regions of rear display 140 to be blurred. The effect illustrated in FIG. 54D may also be used as a censorship effect to mask or hide inappropriate content including portions of text.

In one or more embodiments, processor 5008 determines the regions to which the privacy filter is applied based upon scattering information received on a separate channel and/or embedded within a received video signal. In one or more other embodiments, processor 5008 recognizes the objects to which the privacy filters are to be applied in the image dynamically through image processing and applies the privacy filter(s) in response to recognizing the objects.

FIG. 54E illustrates an example of blurring and white enhancement to generate a layer effect. In the example of FIG. 54E, rear display 140 displays an image and front display 150 generates a layer atop of the image. The layer generated by front display 150, for example, uses blurring to create a blurred region 5414 that can include one or more graphics or touch controls (generated as white opaque pixels) such as text 5416. Front display 150 further may include a substantially transparent sub-region 5418 through which the image shown by rear display 140 is viewable.

FIGS. 54F-54H illustrate an example of applying scattering using front display 150 to create a transition and/or white enhancement effect. The transition effect is illustrated moving from FIG. 54F, to FIG. 54G, to FIG. 54H. The blurring and/or white enhancement generated by front display 150 can be adjusted over time to synchronize with a changing image or imagery displayed by rear display 150 to create a transition effect or motion effect.

Figure 54I:
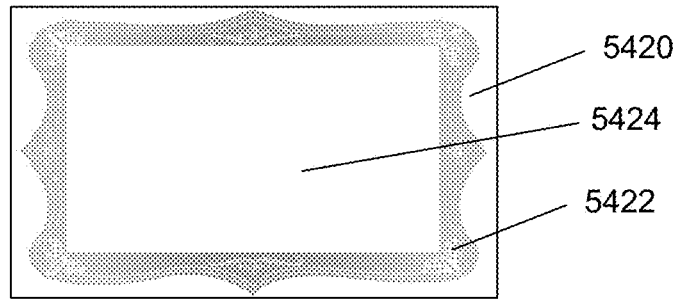

FIG. 54I illustrates an example of applying scattering using front display 150 to create a frame effect. The frame effect is similar to the vignette effect described in connection with FIG. 54A. In the case of the frame effect, front display 150 is controlled to generate sharper edges as opposed to transitioning from pixels with maximum blur (shown to be substantially opaque) to substantially transparent pixels more slowly. For example, as generated by front display 150, region 5420 applies a maximum amount of blur, region 5422 is grayscale (e.g., a median amount of blur), and region 5424 is transparent so that an image displayed by rear display 140 is viewable.

Figure 54J:

FIG. 54J illustrates an example of applying scattering using front display 150 to create a texture effect. In the example of FIG. 54J, scattering implemented by front display 150 is used to add texture to the image displayed by rear display 140.

Figure 54K:

FIG. 54K illustrates an example of color enhancement as performed using front display 150 to white regions of an image to increase contrast. For example, in response to detecting a level of ambient light that exceeds a threshold amount, front display 150 is controlled to apply blurring over regions where white text is detected in the image to enhance the image. The original image is illustrated on the left and the enhanced image with increased contrast as a result of the diffusion of light applied by front display 150 is on the right. FIG. 54K illustrates a highlight layer as applied to the text that increases contrast.

Figure 54L:
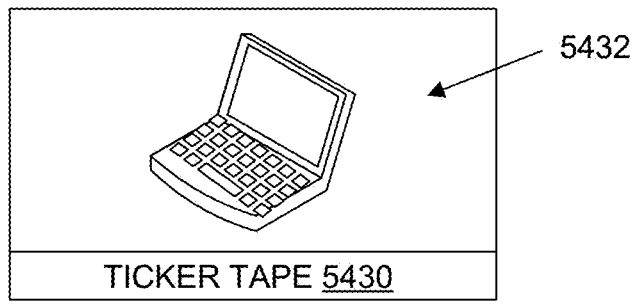

FIG. 54L illustrates an example where front display 150 is capable of generating a ticker tape 5430 over image 5432 displayed by rear display 140. Ticker tape 5430 can provide scrolling text to convey information using front display 150 while rear display 140 is capable of displaying image(s) as originally formatted.

In one or more embodiments, display 110 is capable of storing one or more user settings within memory such as memory 5010. The settings, for example, can indicate to processor 5008 whether to apply scattering for purposes of obscuring sensitive and/or inappropriate objects including text. Further, the settings can specify how aggressive processor 5008 applies the blurring described herein. As noted, in one or more embodiments, the amount of blur applied is increased by stacking additional front displays 150, where each front display 150 is capable of applying blur by configuring pixels to diffuse light.

Figure 55:
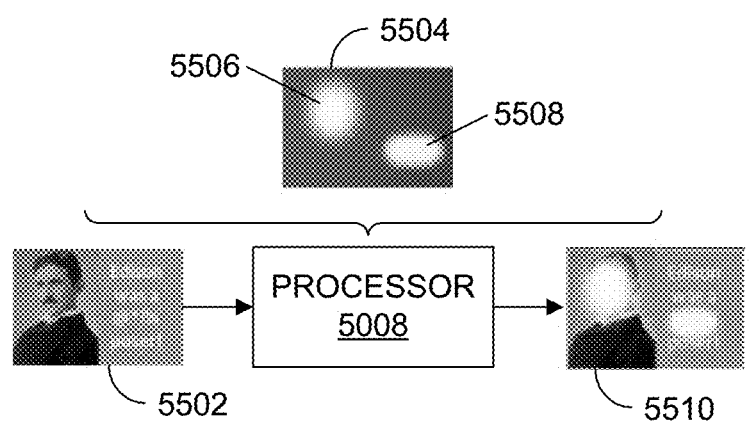
FIG. 55 illustrates an example showing content detection and application of visual effects.

FIG. 55 illustrates an example showing content detection and application of visual effects. In the example of FIG. 55, an image 5502 is shown. Image 5502 is displayed on rear display 140 of device 110. Image 5502 includes a person and text. In the example of FIG. 55, processor 5008 is capable of recognizing the face of the person in image 5502. Further, processor 5008 is capable of recognizing text within image 5502 and further determining that the text is inappropriate. For example, processor 5008 is capable of comparing the recognized text with text in a database. In response to determining that the text of the image matches text of the database, processor 5008 determines that the text of the image should be masked or blurred using a censorship effect.

Accordingly, processor 5008 is capable of generating a signal specifying scattering information that results in the creation of an image 5504 displayed by front display 150. The regions of image 5504 are transparent or substantially transparent except for scatter region 5506 and scatter region 5508. Scatter region 5506 corresponds to the location, size, and shape of the face in image 5502. Scatter region 5508 corresponds to the size, location, and shape of the text that is to be masked or censored from image 5502. Processor 5008 causes front display 150 to display image 5504 simultaneously with image 5502 so as to apply a privacy effect to the face and mask or censor the inappropriate text as shown in image 5510. Image 5510 is the image that is viewable by a user when looking at display 110 operating as described.

Figures 56, 57:
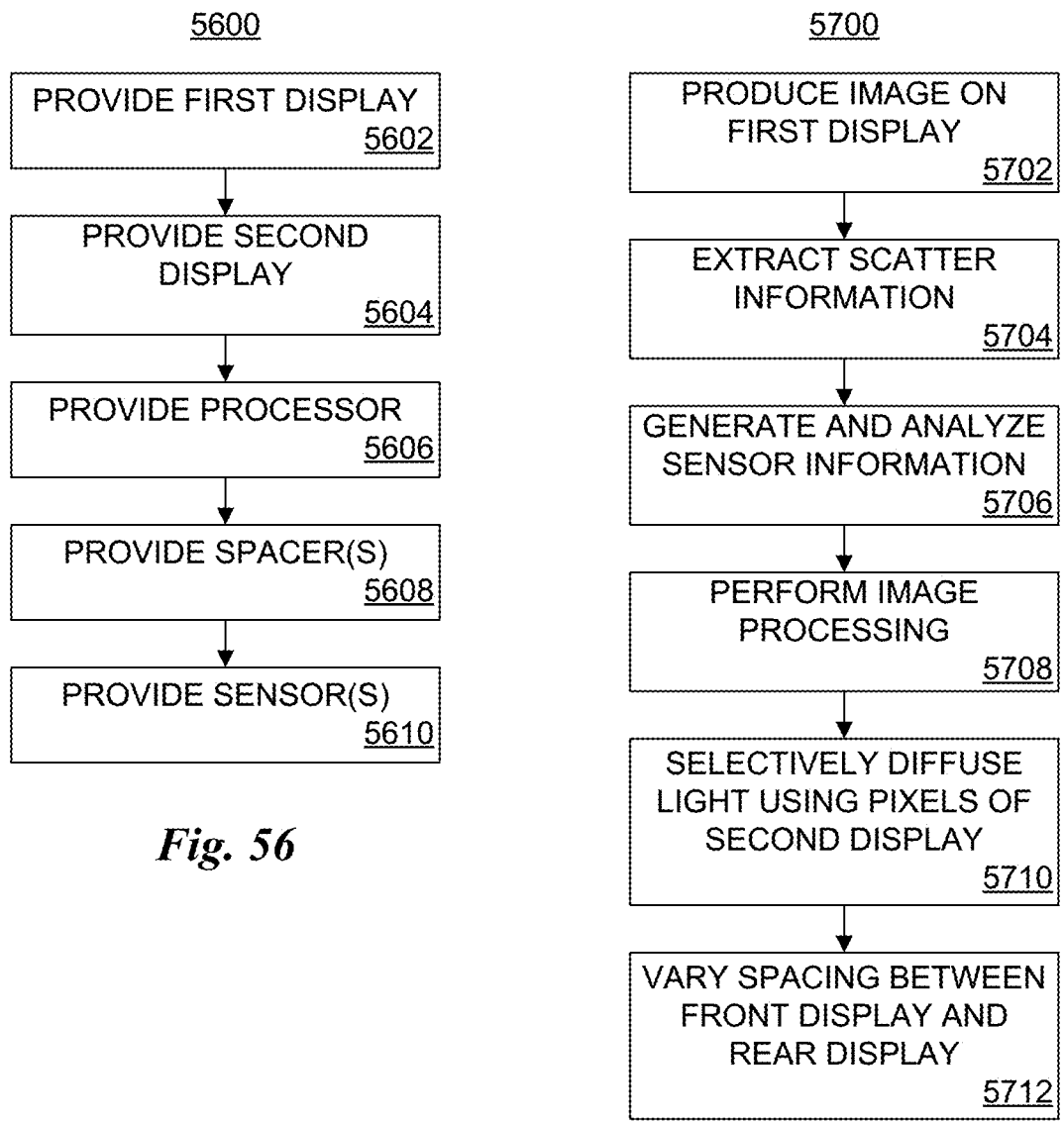
FIG. 56 illustrates an example method for implementing a display.
FIG. 57 illustrates an example method for operation of a display.

FIG. 56 illustrates an example method 5600 for implementing a display. In one or more embodiments, method 5600 is used to implement a display as described herein in connection with FIGS. 50-55.

In block 5602, a first display is provided. The first display is capable of displaying an image. In block 5604, a second display is provided. The second display can be non-emissive and transparent. Further, the second display can include a plurality of pixels that are electronically controllable to selectively diffuse light produced by the first display.

In one or more embodiments, the first display is an emissive display. For example, the emissive display can be an LCD, an LED display, a light enhanced layer, or an OLED display. The second display can be a polymer-dispersed liquid crystal display, an electrochromic display, an electro-dispersive display, a PSLC display, an electrowetting display, or an LCD including Smectic A liquid crystals.

In particular embodiments, the second display includes at least one pixel of the plurality of pixels that includes dye.

In particular embodiments, a region of the image produced by the first display is superposed with a region of the second display wherein selected pixels of the plurality of pixels in the region of the second display are configured to diffuse light. For example, the region may appear white.

In particular embodiments, the plurality of pixels are electronically controllable to selectively diffuse light produced by the first display to generate a visual effect applied to the image. Examples of the visual effects can include, but are not limited to, vignetting, speed, motion, depth, a highlight layer, a privacy filter, a transition, a frame, censorship, blocking (e.g., applying maximum blur), or texturing. In particular embodiments, the plurality of pixels are electronically controllable to selectively diffuse light produced by the first display to increase contrast of the image. The second display is further capable of scattering the light or enhancing the image. the plurality of pixels, for example, can be electronically controlled to selectively diffuse the light produced by the first display to increase contrast of the image.

In block 5606, a processor is optionally provided. As discussed, additional driver circuitry may be included. The driver circuitry can couple the processor to the first display and to the second display. In particular embodiments, the processor is capable of extracting scattering information embedded in the image and/or video signal to generate visual effects as specified by the extracted scattering information. In particular embodiments, the processor is capable of performing image processing on a video signal or the image in substantially real time to detect region(s) of the image to which visual effects are to be applied and control selected pixels of the plurality of pixels of the second display to generate visual effects for such regions.

In block 5608, one or more spacers are provided. The spacer(s) can be disposed between the first display and the second display. The spacer is capable of varying a distance between the first display and the second display.

In block 5610, one or more sensors are provided. The sensor is capable of generating sensor information. The plurality of pixels of the first display and/or the second display can be electronically controllable, at least in part, based upon the sensor information. In one or more embodiments, the sensor is configured to detect ambient light. In that case, the plurality of pixels can be electronically controllable, at least in part, to increase contrast of the image based upon a detected level of ambient light, e.g., in response to detecting a minimum level of ambient light. In one or more embodiments, the sensor is configured to detect an attribute of a user. Accordingly, the plurality of pixels can be electronically controllable, at least in part, to apply a visual effect to the image based upon the attribute of the user. For example, the attributes of the user can include any of the attributes previously described in this disclosure. Examples of visual effects that can be applied include, but are not limited to, increasing font size of text, enhancing text, and/or conveying personalized information on a ticker tape based upon the attributes (e.g., age, distance, location, and/or whether the user wears glasses).

FIG. 57 illustrates an example method 5700 for operation of a display. In one or more embodiments, the display is implemented as the example display described in connection with FIGS. 50-56.

In block 5702, an image is produced on a first display. In block 5704, a processor of the device optionally extracts scatter information from a received video signal specifying the image. For example, the processor is capable of analyzing the received video signal. If scatter information is embedded in the video signal, the processor is capable of extracting the scatter information.

In block 5706, the device optionally generates and analyzes sensor information. For example, sensor information can be generated using one or more sensors. In block 5708, image processing is optionally performed. For example, a processor is configured to perform image processing on the image to determine selected pixels of the plurality of electronically controllable pixels to adjust to diffuse the light.

In block 5710, the device selectively diffuses light using pixels of a second display. For example, light associated with the image as produced by the first display is selectively diffused using a plurality of electronically controllable pixels of the second display. The second display can be non-emissive and transparent.

In particular embodiments, selected pixels of the plurality of electronically controllable pixels are controlled based, at least in part, upon the sensor information and/or the image processing. For example, the sensor is configured to detect ambient light. Accordingly, the selected pixels of the plurality of electronically controllable pixels can be electronically controllable, at least in part, to increase contrast of the image based upon a detected level of the ambient light. In another example, the sensor is configured to detect an attribute of a user. Accordingly, the selected pixels of the plurality of electronically controllable pixels are electronically controllable based, at least in part, upon the attribute of the user. In particular embodiments, selected pixels of the plurality of electronically controllable pixels are controlled based, at least in part, upon the image processing (e.g., the regions determined by the processor by performing image processing). In particular embodiments, selected pixels of the plurality of electronically controllable pixels are controlled to selectively diffuse the light to generate a visual effect applied to the image and/or to selectively diffuse the light to increase contrast of the image.

In block 5712, the spacing between the front display and the read display can be varied. In particular embodiments, the spacing is varied automatically based upon sensor information and/or results from image processing. For example, in any of the situations described herein where increased diffusion of light is desired, the spacing between the front display and the rear display can be increased, e.g., in response to detecting particular user attributes, to increase the maximum blur available, based upon level of ambient light, or other condition.

In particular embodiments, the device displays the image so that a portion of the image is shown by having a region of the first display emit the portion of the image, and by having a region of the second display corresponding to the portion of the image diffuse light produced by the region of the first display. In general, the processor determines the location of the region or regions that are to diffuse light. The processor, for example, encodes the locations of diffusion and amount of diffusion to be applied in the signal that is generated and provided to the second (e.g., front) display. As discussed, the original content need not be modified in order to provide customized content using the front display.

In particular embodiments, the processor is capable of analyzing the image (e.g., the video signal) and determining whether image or video signal includes or specifies multi-media and text. In response to determining that the image includes multimedia content and text, the processor is capable of controlling the rear display to display the multi-media portion of the image and/or video signal and the front display to display the text portion of the image and/or video signal. By separating the multimedia content from the text within the image(s) that are displayed, the device is capable of operation with lower power consumption.

Figure 58:
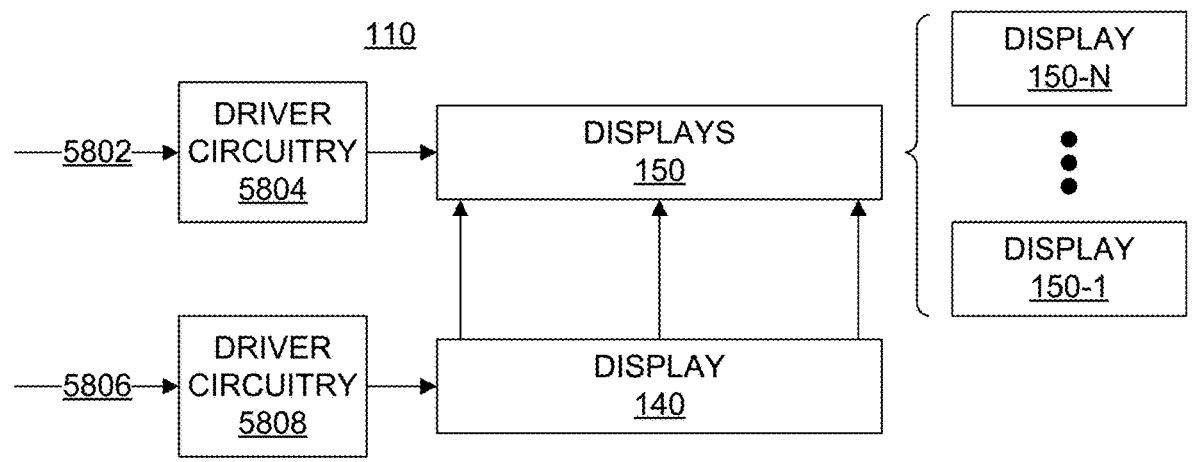
FIG. 58 illustrates an example of a display device.

FIG. 58 illustrates an example of a display device 110. In the example of FIG. 58, display device 110 implements an automultiscopic display that is capable of providing view dependent imagery that can be perceived by users without the aid of special eyewear (e.g., glasses).

In the example of FIG. 58, display 140 and displays 150 are electronically controllable. Display 140 and displays 150 are pixel addressable. The example illustrated in FIG. 58 may also include a touch input layer (not shown). Display 140 can be implemented as a light emitting display. For example, display 140 can be implemented as an LCD, an LED display, a light enhanced layer, or an OLED display. Displays 150 are formed using two or more displays 150-1 through 150-N. Displays 150 may be implemented as one or more transparent displays. In particular embodiments, displays 150 may be referred to as external layers. In one or more arrangements, display 140 and displays 150 are aligned as described within this disclosure. For example, the pixels of displays 150 and display 140 may be aligned so that their borders are situated directly over or under one another and/or so that the transparent regions of pixels of one display are superposed with the addressable regions of pixels of the other display, and vice versa.

In particular embodiments, display device 110 is configured to implement a volumetric display that is capable of generating a 3-dimensional (3D) view using a plurality of different displays. Each of displays 140 and 150, for example, is capable of displaying a 2D image. The particular display 140 or displays 150 upon which a given portion of the image is displayed generates the 3D view. For example, each of the displays 140 and 150 is capable of displaying a slice of the image to provide depth and the 3D view. The 3D view presented depends, at least in part, upon the spatial resolution corresponding to the space between layers. For example, in an (x, y, z) coordinate system, the x and y coordinates correspond to left-right and top-bottom directions, respectively, in a layer. The z coordinate is implemented by selecting display 140 or a particular one of displays 150 (e.g., a particular display in the plurality of displays representing the depth or z coordinate).

In particular embodiments, each of displays 140 and 150 are implemented as electronically controllable displays. Each display 150, for example, may be implemented as any of the various transparent displays described within this disclosure that are capable of reflecting, scattering, and/or diffusing light. For example, each of displays 150 may be implemented as a PDLC display, an electrochromic display, an electro-dispersive display, an electrowetting display, suspended particle device, an ITO display, or an LCD in any of its phases (e.g., nematic, TN, STN, Cholesteric, or SmA), or any LC display. Further, pixels of one or more of displays 150 may be dyed. Each of displays 150 is pixel addressable to display transparent to scatter, reflection, absorption or any intermediate step therebetween. For example, each of displays 150 is electronically controllable to reflect, scatter, or absorb ambient light and/or light from a backlight or frontlight. Display 140 may be implemented as a color display. In another example, display 140 may be implemented as a display that is capable of generating different light intensities for different pixels.

In particular embodiments, display device 110 is capable of implementing a parallax configuration that includes one or more parallax barriers. In a parallax configuration, display device 110 is capable of displaying different images to different points of view. For example, an image can be displayed on display 140. The image displayed on display 140 include two or more spatially multiplexed images therein. Each spatially multiplexed image is viewable from a different point of view. In particular embodiments, the points of view correspond to a user's eyes thereby producing a 3D image. In particular embodiments, the points view correspond to locations of different users so that different people are able to see different images displayed by display device 110 concurrently. In the latter case, each person sees a different image at the same time based upon the point of view of the person in relation to display device 110.

In a parallax configuration, each of displays 150 may be implemented as any one of a variety of the display types described within this disclosure that is capable of blocking, diffusing, and/or scattering light in a particular direction so as to form one or more parallax barriers to create a light field display. Each of displays 150 can be pixel addressable to display transparent to scatter, reflection, absorption or any intermediate step therebetween. For example, each of displays 150 is electronically controllable to reflect, scatter, or absorb ambient light and/or light from a backlight or frontlight. In one or more embodiments, one or more or all of displays 150 may be dyed.

In either the volumetric configuration or the parallax configuration, in particular embodiments, display 110 includes optional spacers between display 140 and/or displays 150. Spacers may be optionally be included between adjacent pairs of displays 150 as generally described herein with reference to FIG. 50. In alternative embodiments, some spacers may be omitted such that some pairs of adjacent displays have a spacer while other pairs of adjacent displays do not have a spacer. Spacers may be utilized in embodiments implementing volumetric displays and/or in embodiments implementing a parallax configuration.

In particular embodiments, spacers may be implemented as solid and fixed to create a particular distance between displays. In particular embodiments, the separation distance between adjacent displays may be adjusted mechanically using a motor, for example. In particular embodiments, the separation distance between adjacent displays may be adjusted electronically using piezo actuators, for example.

In particular embodiments where separation distance between at least one pair of adjacent displays is adjustable, the adjusting may be dynamically controlled during operation of display device 110. For example, a processor is capable of controlling the mechanical and/or electronic mechanisms utilized to adjust separation distance to compensate and/or modify the output of display device 110. The separation distance between two adjacent displays may be filled with an air gap or an index matching liquid.

In the example of FIG. 58, driver circuitry 5804 receives control signals 5802. In response to control signals 5802, driver circuitry 5804 is capable generating drive signals that drive displays 150. Control signals 5802 cause driver circuitry 5804 to control displays 150 to implement a volumetric display, one or more parallax barriers, or both a volumetric display and one or more parallax barriers (e.g., concurrently). Driver circuitry 5808 receives control signals 5806. In response to control signals 5806, driver circuitry 5808 is capable of generating drive signals capable of driving display 140. Control signals 5806 cause driver circuitry 5808 to control display 140.

For purpose of illustration and not limitation, driver circuitry 5804 receives control signals 5802 which cause driver circuitry 5804 to transmit drive signals that cause displays 150 to show different content to two or more users and/or each of the two or more transparent displays to block, diffuse, or scatter light so that multiple users can see different content on the display concurrently from different points of view. For example, each spatially multiplexed image within the image that is displayed by display device 110 is viewable from a particular point of view. As such, if each of a plurality of user is located a different one of the points of view, each user is able to see the spatially multiplexed image, e.g., different content, for that point of view.

Display 140 is filtered by displays 150 configured as multiple volumetric displays and/or one or more parallax barriers to form multiple different content images (e.g., the different spatially multiplexed images) which can be shown to multiple users at corresponding multiple different locations concurrently. For example, a first set of pixels in display 140 can be used to generate a content image 1 (e.g., a first of the spatially multiplexed images) that is shown to user 1 at location 1, a second set of pixels that can be used to generate a content image 2 (e.g., a second of the spatially multiplexed images) that is shown to user 2 at location 2, and a third set of pixels that can be used to generate a content image 3 (e.g., a third of the spatially multiplexed images) that is shown to user 3 at location 3, etc.

The light from display 140 can be blocked or pass through displays 150 (e.g., the multiple volumetric display/parallax barriers) thus creating the multiple different content images that are shown to the two or more different users at two or more different corresponding locations concurrently. For example, the blocking or passing through of light by displays 150 can cause content image 1 to be shown to user 1 at location 1, but can cause content image 1 to not be shown to user 2 at location 2 or to user 3 at location 3. Alternatively, or in addition, the light from display 140 may be blocked or pass through displays 150 in order to create a slice of the image at each of the multiple transparent displays 150-1 through 150-N to provide depth and a 3D effect to the image that is shown to one or more users.

Figure 59:
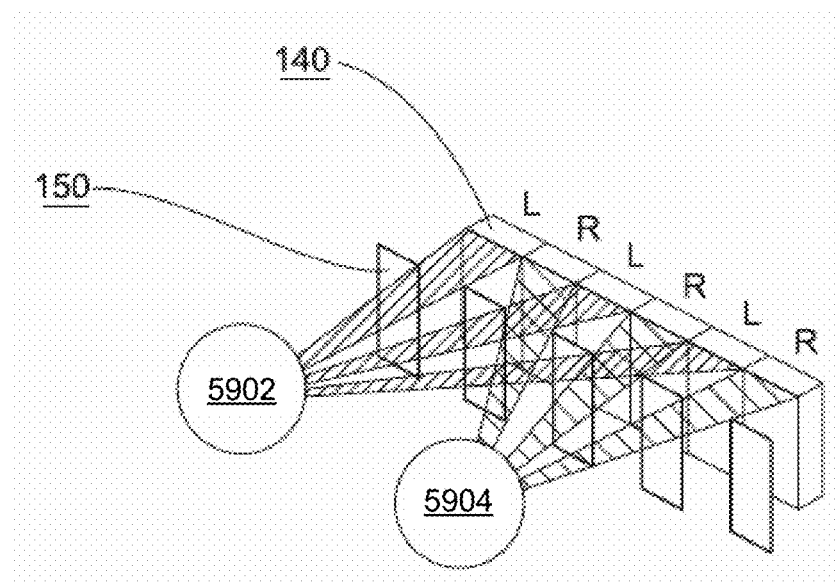
FIG. 59 illustrates an exploded view of an example parallax implementation of the display device of FIG. 58.

FIG. 59 illustrates an exploded view of an example parallax implementation of display device 110. In the example of FIG. 59, display 140 is displaying two different spatially multiplexed images. The pixels or regions labeled "L" represent portions of a first of the images that is viewable from a point of view 5902 located left of center when facing the front of display 110. The pixels or regions labeled "R" represent portions of a second of the image that is viewable from a point of view 5904 located right of center when facing the front of display 110.

As illustrated, display 150 implements a parallax barrier. In the example of FIG. 59, one of displays 150 is shown as the parallax barrier. Display 150, being the parallax barrier, generates regions of clear (transparent) and black as illustrated. Display 150 is controlled to block, diffuse, and/or scatter light in a particular direction. As such, from point of view 5902, one sees only the "L" portions corresponding to the first image. From point of view 5904, one sees only the "R" portions corresponding to the second image. In particular arrangements, the spacing of the regions in displays 140 and 150 are such that point of views 5902 and 5904 represent the location of a person's eyes. In that case, each eye of a user sees a different image at the same time resulting in a 3D effect based upon the two images displayed.

In particular arrangements, the spacing of regions in display 140 (e.g., L and R) and regions in display 150 may be larger such that points of view 5902 and 5904 represent different locations at which different persons may stand at the same time. In that case, a first person standing at point of view 5902 sees the first image when looking at the front of display 110. A second person standing at point of view 5904 at the same time that the first person stands at point of view 5902 sees the second image when looking at the front of display 110. As such, when the first person is located at point of view 5902 and the second person is located at point of view 5904, each person sees a different image at the same time.

Figure 60A:
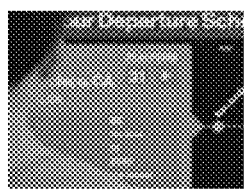
FIGS. 60A-60C illustrate example views of the parallax configuration of the display of FIG. 59.
Figure 60B:
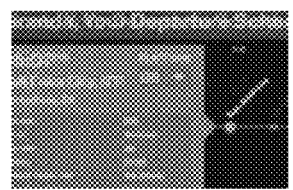
Figure 60C:
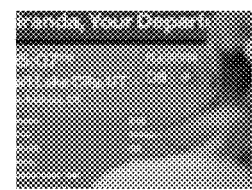

FIGS. 60A-60C illustrate example views of the parallax configuration of display device 110 of FIG. 59. FIG. 60A illustrates what a person located at point of view 5902 sees when looking at the front of display device 110. From point of view 5902, the person sees the first image. FIG. 60B illustrates what a person located between point of view 5902 and point of view 5904 sees when looking at the front of display 110. FIG. 60C illustrates what a person located at point of view 5904 sees when looking at the front of display 110. From point of view 5904, the person sees the second image, which is different than the first image. Again, the person located at point of view 5902 sees the first image simultaneously with the second person located at point of view 5904 seeing the second image.

In particular embodiments, additional parallax barrier layers may be added to display 110. As noted, displays 150, for example, may be formed of one or more different layers. With the addition of additional parallax barrier layers, display 110 is capable of displaying more than two different spatially multiplexed images simultaneously to users located at different points of view.

Figure 61:
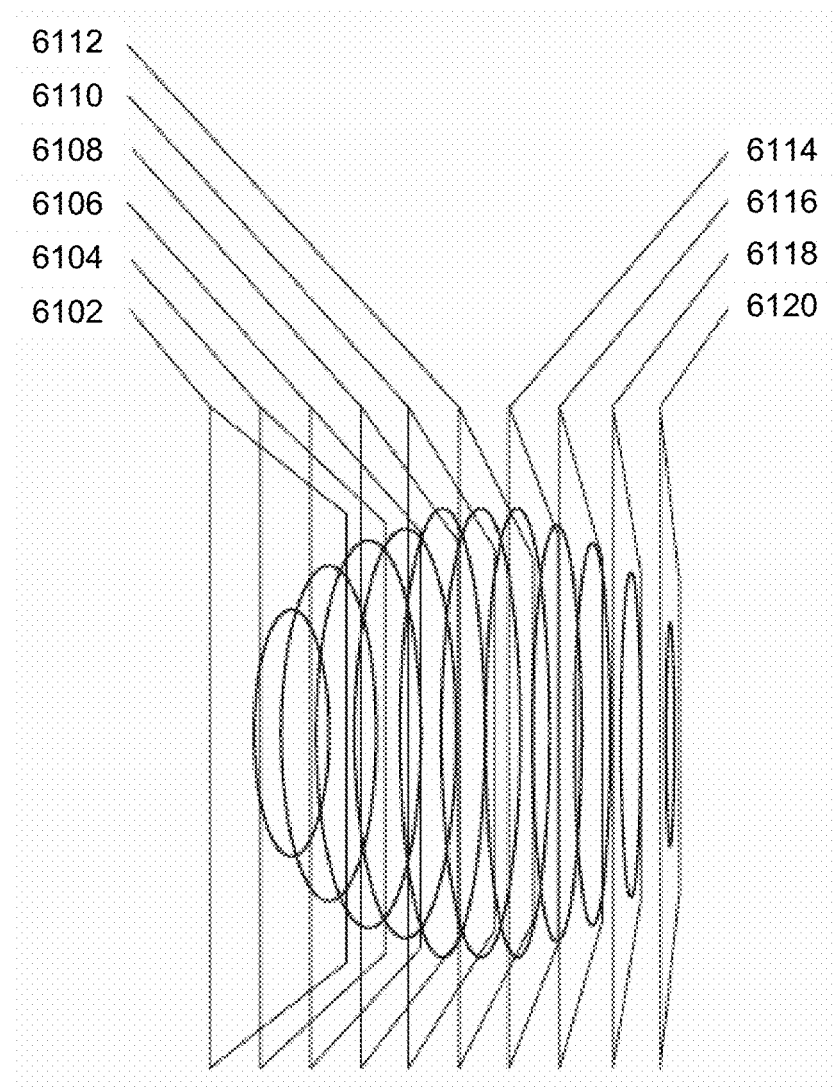
FIG. 61 illustrates an example of a volumetric implementation of the display device of FIG. 58.

FIG. 61 illustrates an exploded view of an example of a volumetric implementation of display 110 of FIG. 58. In the example of FIG. 61, display 110 is capable of generating 3D images. As pictured, display 110 includes layers 6102, 6104, 6104, 6106, 6108, 6110, 6112, 6114, 6116, 6118, and 6120. For example, display 140 may implement layer 6102. Displays 150 may implement layers 6104, 6104, 6106, 6108, 6110, 6112, 6114, 6116, 6118, and 6120. As pictured, layers 6102-6120, taken collectively, display a 3D view of a sphere. Layers 6102-6120 are electronically controllable, for example, using a processor and suitable interface/driver circuitry (e.g., a display controller not shown). In this example, each of layers 6102-6120 is pixel addressable to display a different slice or portion of the sphere (e.g., the image to be displayed in 3D).

In the example of FIG. 61, display device 110 may include backlighting or frontlighting. In the case of frontlighting, display device 110 may also include side illuminated layers. Further, display device 110 may include one or more color filters. In particular embodiments, the color filters may be one or more of the RGB color filter configurations as illustrated in connection with FIGS. 17 and 18A-18E. The example filter configurations of FIGS. 17 and 18A-18E may be used between layers of the volumetric display examples.

Figure 62:
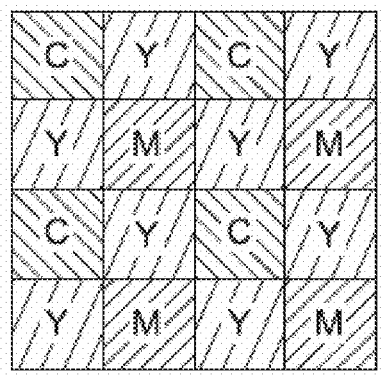
FIG. 62 illustrates another example of a color filter configuration.

FIG. 62 illustrates another example of a color filter configuration. In the example of FIG. 62, the color filter configuration is cyan, yellow, yellow, and magenta. The example filter configuration of FIG. 52 may be used between layers of the volumetric display examples.

Figure 63:
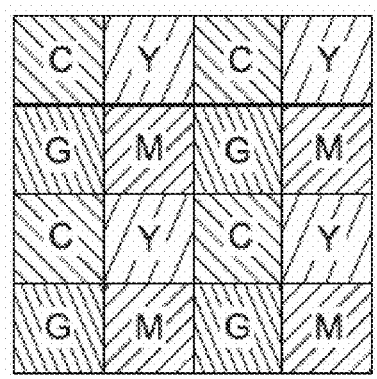
FIG. 63 illustrates another example of a color filter configuration.

FIG. 63 illustrates another example of a color filter configuration. In the example of FIG. 63, the color filter configuration is cyan, yellow, green, and magenta. The example filter configuration of FIG. 63 may be used between layers of the volumetric display examples.

Figure 64:
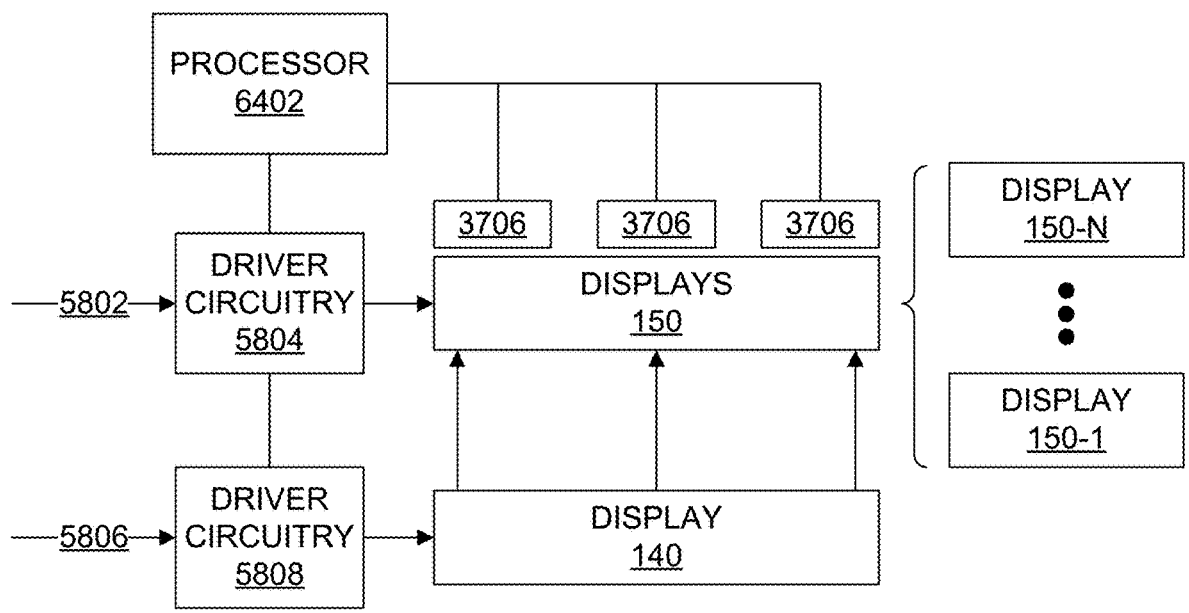
FIG. 64 illustrates another example display device.

FIG. 64 illustrates another example display device 110. In the example of FIG. 64, a processor 6402 is included. As pictured, processor 6402 is coupled to sensors 3706 and to driver circuitry 5804 and 5808. Sensors 3706 may be implemented as any of the various different types of sensors described within this disclosure, e.g., as described with reference to FIG. 37. For example, one or more of sensors 3706 is capable of detecting physical presence of a user, distance of a user to display 110, location(s) of users within a predetermined distance of display device 110, number of users within a predetermined a range or distance of display 110, and/or identity of the user. One or more of sensors 3706 is capable of detecting attributes of the user as described herein. In one or more embodiments, one or more sensors 3706 are capable of detecting a beacon that is associated with a user in order to determine the identity of the user. It should be appreciated that a sensor capable of detecting a beacon can be used in any of the various embodiments described within this disclosure where determination of a user identity is discussed. One or more sensors are capable of detecting light (e.g., intensity of light including ambient light).

In particular embodiments, one or more of sensors 3706 is implemented as a camera as generally described in connection with FIG. 47. Processor 6402 is operable to control display 140 and displays 150. Processor 6402, for example, is capable of calculating separation distance and adjusting separation distance between pair(s) of adjacent layers by controlling the spacer(s). Processor 6402 further is capable of analyzing image data obtained from the camera sensor to track the location and/or position of users and/or to perform gaze detection of users in the field of view of the camera (e.g., in the viewing cone) located in front of display device 110. Based upon the analysis, processor 6402 is capable of calculating the separation distance between layers and adjusting the separation distance between layers to achieve the calculated separation distance.

In particular embodiments, the camera can be incorporated into a computer vision system. The computer vision system is capable of tracking users' using facial recognition to determine identity of the users and/or viewpoint (e.g., gaze direction or viewing angle). In one or more embodiments, one or more of sensors 3706 can include a beamforming antenna. The beamforming antenna is capable of performing RFID interrogation to provide corroborating data for purposes of user identification from an RFID-enabled device or ticket. In one or more embodiments, the beamforming antenna is capable of interrogating a user's phone via a short range wireless communication protocol such as Bluetooth®, WiFi™, or another RF protocol. A system including a camera can be used to determine a user's position or location relative to display device 110, eye location, gaze direction, and identity of the user. In one or more embodiments, processor 6402 is capable of combining user location information with a model of display device 110 and sensor geometry to calculate each user's viewing frustum.

Processor 6402 is capable of controlling display 140 and/or any one or more or all of displays 150 based, at least in part, upon the sensor information. For example, using the sensor information, processor 6402 is capable of calculating the images and masks (parallax barrier(s)) to provide a private display to a user (i.e., a display that can only be viewed within a narrow angle around the user's viewing axis). For example, processor 6402 is capable of using multiple source images and the desired viewpoints as input, spatially multiplex the source images into a spatially multiplexed image that is displayed on display 140 and/or displays 150. As such, display device 110 is an example of an automultiscopic display as display 110 is capable of providing view-dependent imagery without the need for special eyewear.

Figures 65, 66:
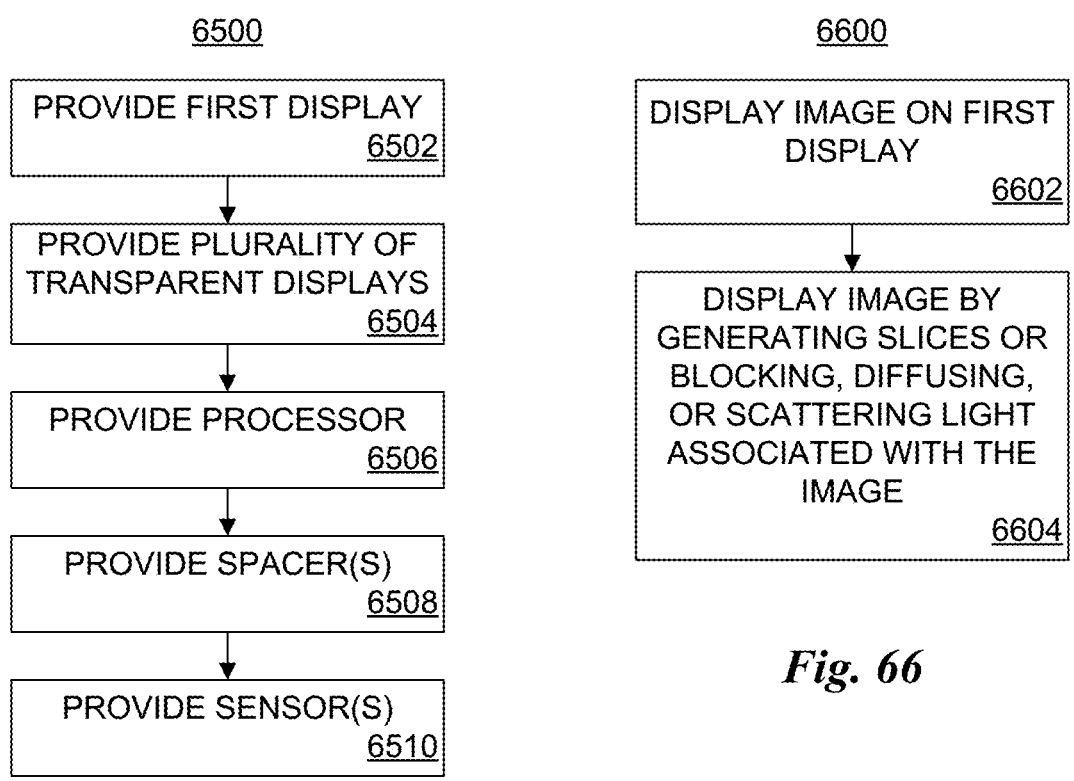
FIG. 65 illustrates an example method for implementing a display device.
FIG. 66 illustrates an example method for operation of a display device.

FIG. 65 illustrates an example method 6500 for implementing a display device. In block 6502, a first display is provided. The first display is capable of producing an image.

In block 6504, a plurality of transparent displays are provided. Each of the plurality of transparent displays is capable of producing a slice of the image to provide depth and a 3D effect to the image, or at least one of the plurality of transparent displays is capable of blocking, diffusing, or scattering light so that different ones of a plurality of users see different content derived from the image produced by the first display.

In particular embodiments, each of the transparent displays is substantially transparent. In particular embodiments, at least one of the two transparent displays is made using Smectic A liquid crystals.

In an aspect, each display includes a plurality of pixels.

In particular embodiments, the slice of the image is produced at each of the plurality of transparent displays to provide the depth and the 3D effect to the image and the at least one of the plurality of transparent displays blocks, diffuses, or scatters the light so that the different ones of the plurality of users see the different content on the 3D display.

In one or more embodiments, the first display is an emissive display and the plurality of transparent displays are non-emissive displays. In an example, each non-emissive display is at least 90% transparent. The non-emissive displays may have a level of transparency of approximately 90% or higher. For example, each of the non-emissive displays can have a transparency of approximately 95%. The emissive display can be implemented as an LCD, a LCD including Smectic A liquid crystals, an LED display, a light enhanced layer, or an OLED display.

In particular embodiments, at least one pixel of at least one of the non-emissive displays includes dye. In particular embodiments, at least one of the plurality of pixels of at least one of the non-emissive displays does not include dye and appears substantially white. In particular embodiments, at least one pixel of the plurality of pixels of at least one of the non-emissive displays includes dye in particles, liquid crystal droplets, or liquid crystals of the non-emissive display. In particular embodiments, each of the plurality of transparent displays includes a plurality of partially emissive pixels, wherein each partially emissive pixel comprises an addressable region and a clear region.

In block 6506, a processor is optionally provided. The processor can be coupled to driver circuitry, which may also be provided.

In block 6508, one or more spacers are optionally provided. In particular embodiments, the spacers are controllable to vary the distance between consecutive ones of the displays. For example, the spacers can be controlled by the processor. For example, the spacers can be configured to provide variable spacing by mechanical means (e.g., a gearing or track), electronic (e.g., an electrical motor), or via vibrations (e.g., piezo). The spacers can be used for either one or both of the volumetric display configuration or the parallax configuration. Different displays can have different spacing. In one or more embodiments, the processor is capable of dynamically modifying the spacing between different consecutive displays to modify the viewing cone for the user in the parallax configuration.

In block 6510, one or more sensors are optionally provided. The sensors are capable of generating sensor information. For example, at least one pixel of the plurality of pixels of at least one of the displays is adjusted based, at least in part, upon the sensor information.

In particular embodiments, the sensor information includes distance between each of a plurality of users to the display device and the at least one pixel of the plurality of pixels is adjusted based upon the distance(s). In particular embodiments, the sensor information specifies a number of the plurality of users detected within a predetermined distance of the display device and selected pixels of the plurality of pixels are adjusted, based at least in part on the number of users, so that each user of the plurality of users sees different content. For example, the processor is capable of adjusting the parallax layer and/or parallax layers (e.g., including implementing new or additional parallax layers) based upon the number of detected users so that each user is able to view different content and each user is able to view only the content for that user.

In particular embodiments, the sensor information includes location of one or more users within a predetermined distance of the display device. The processor is capable of adjusting one or more of the plurality of pixels based, at least in part, on the locations of the users. For example, the processor is capable of adjusting the parallax layer and/or parallax layers (e.g., including implementing new or additional parallax layers) based upon the number of detected users and/or location of each detected user so that each user is able to view different content and each user is able to view only the content for that user.

In particular embodiments, the sensor information specifies an identity of a user of the plurality of users and selected pixels of the plurality of pixels of at least one of the displays are adjusted, based at least in part, on the identity of the user. The processor, for example, in response to identifying the user, is capable of displaying content that is specific to the user. The processor, for example, by way of the sensor(s) is capable of accessing the user's mobile phone to access purchase history, preferences, browser history, phone calls, upcoming appointments, and/or other information. The processor is capable of selecting content that is related to the user based upon the determined identity and any other information obtained for the user.

In particular embodiments, the sensor information specifies one or more attributes of one or more users of a plurality of users within a predetermined distance of the display device. Accordingly, the processor of the display device is capable of adjusting selected pixels of the plurality of pixels of at least one of the displays based, at least in part, on one or more attributes of a user or users. The processor, for example, in response to determining a height of the user, is capable of adjusting viewing angle for content that is displayed on display device 110 so that content to be viewed at the point of view where the user is located can be viewed by the user. The attributes of the user can include any of the attributes described herein including, but not limited to, physical traits, e.g., age, whether the user wears glasses, and other attributes described herein. In particular embodiments, the spatially multiplexed image to be shown to a particular user can be modified based upon the attribute(s) of that user. For example, detecting that a user wears glasses may cause the processor to increase the size of the spatially multiplexed image for that user or increase the size of text in the spatially multiplexed image for that user.

FIG. 66 illustrates an example method 6600 for operation of a display device. In block 6602, the display device displays an image using the first display, e.g., the rear display. In block 6604, the display device displays the image by generate a slice of the image on each of a plurality of transparent displays to provide a depth and a 3D effect to the image, or locks, diffuses, or scatters light associated with the image using at least one of the plurality of transparent displays so that different ones of a plurality of users see different content derived from the image on a display device including the first display and the plurality of transparent displays. Each of the transparent displays can be substantially transparent. At least one of the two transparent displays is made using Smectic A liquid crystals.

In particular embodiments, each display includes a plurality of electronically controllable pixels. Accordingly, an appearance of one or more pixels of the plurality of electronically controllable pixels is adjusted based, at least in part, upon sensor information. The sensor information may be any of the different types of sensor information described herein, whether relating to the user, ambient light, or other data. For example, the processor, in response to processing the sensor information, is capable of adjusting the appearance of one or more of the pixels of one or more of the displays. The sensor information may be distance of the user to the display, the number of users, the identity of the user(s), or other information as described herein.

In an example, the sensor information specifies distance of a user (e.g., of a plurality of user) to the display device. Accordingly, the displaying the image by generating the slice of the image on each of the plurality of transparent displays or the blocking, diffusing, or scattering the light associated with the image can include adjusting the at least one pixel of the plurality of electronically controllable pixels of the at least one of the displays based, at least in part, upon the distance.

In another example, the sensor information specifies a number of the plurality of users detected within a predetermined distance of the display device. Accordingly, the displaying the image by generating the slice of the image on each of the plurality of transparent displays or the blocking, diffusing, or scattering the light associated with the image can include adjusting selected pixels of the plurality of electronically controllable pixels of the at least one of the displays based, at least in part, upon the number of the plurality of users so that each user of the plurality of users sees the different content.

In another example, the sensor information specifies an attribute of a selected user of the plurality of users. Accordingly, the displaying the image by generating the slice of the image on each of the plurality of transparent displays or the blocking, diffusing, or scattering the light associated with the image can include adjusting selected pixels of the plurality of electronically controllable pixels of at least one of the displays based, at least in part, upon the attribute of the selected user.

As discussed, the displaying the image by generating the slice of the image on each of the plurality of transparent displays, and the blocking, diffusing, or scattering light associated with the image using the at least one of the plurality of transparent displays can be performed concurrently. For example, the processor is capable of controlling display 140 and displays 150 to generate a volumetric view and create one or more parallax layers so that multiple different users at different locations can view different 3D content, e.g., spatially multiplexed 3D images, concurrently as presented by the display device.

As an illustrative and nonlimiting example, the font size in an image, e.g., in the volumetric mode or in a spatially multiplexed image in the parallax configuration can be adjusted based upon the distance of the user from the display and/or an attribute of the user. The font size can be increased, under control of the processor, in response to determining that the user is a minimum distance from the display or, for example, in response to determining that the user is at least a minimum age and/or wears glasses. In another example, the processor is capable of applying effects, image scaling, color adjustment and/or enhancement, or other image processing based upon user preferences determined in response to detecting the identity of the user, distance of the user to the display device, or other attributes of the user.

In another example, the processor is capable of shifting the image displayed by one or more of the displays based upon the user's viewing angle. Such shifting can include shifting the image displayed by the display(s) implementing the parallax layer(s). In another example, display 140 can be controlled by the processor to display an image with different content for each detected user. Further, one or more of displays 150 can be controlled by the processor to implement parallax barriers based upon the number of users that are detected to facilitate the display of different content to each detected user. For example, the processor can increase the number of displays that are used as parallax barriers based upon the number of detected users and the different content that is provided to each such user. As the number of parallax barriers increases, for example, so does angular selectivity and spatial image resolution, meaning that users will experience higher image quality and enhanced privacy.

In particular embodiments, one or more of the sensors is capable of detecting a direction of motion of the user. The processor, in response to receiving the sensor information, is capable of providing content that is tailored to the user based upon the detected direction the user is walking or traveling relative to the display device.

For example, in the case where display device 110 is located within an airport, train station, or other thoroughfare, the direction that the user is walking can indicate the likely destination of the user. A user walking toward the gates in an airport terminal is likely scheduled to depart on a flight and can be shown a schedule of departures as the content. A user walking away from the gates is likely leaving the airport and/or proceeding to the baggage claim. The processor is capable of providing that user with a map or information about where to pick up baggage for different flights. Using the parallax implementation, users walking or traveling in different directions see different content.

In addition to the direction the user is traveling, if the display is capable of accessing information from the user's mobile phone, such information may be used to select the particular content that is displayed to the user, whether advertising, maps, contextual information for a next appointment, or the like. As discussed, in the parallax implementation, content tailored to the user is not viewable by users located in other locations and, as such, is relatively private.

It should be appreciated that each of the various embodiments described herein, whether a projection system, a color enhancement layer, a visual effect layer, a volumetric display, and/or a parallax barrier implementation, any of the various sensors in any combination can be incorporated and/or included. The sensor information generated can be used to adjust the images displayed by any of the displays, whether by applying color correction, synchronization, alignment of images in stacked layers, shifting images, adjusting brightness, reducing and/or increasing power of a display (brightness), focusing images, reducing or enlarging images, displaying customized content, varying content and/or applying visual effects based upon distance of the user, location of the user, identity of the user, and/or number of users detected.

In particular embodiments, a display 150, e.g., one or more displays, as described herein can be incorporated with any of a variety of other displays 140. Display 150 can be controlled by a processor to perform any of a variety of different operations. In an illustrative and nonlimiting example, one or more or all of displays 150 can be set to operate in a transparent mode of operation where the pixels are controlled to be transparent. In response to a sensor detecting one or more users, the processor is capable of activating the parallax barrier mode by implementing a parallax barrier in one or more of the displays 150. As discussed, the number of parallax barriers implemented depends upon the number of users detected. Thus, the parallax barrier implementation need only be invoked as needed dynamically in response to detecting users (e.g., within a particular frustum and/or distance of the display device). In cases where no users are detected in a given range or area, display device 110 can operate as a regular display with displays 150 remaining transparent.

In one or more other embodiments, a front display 150 (e.g., a single display) can be added to an existing display, e.g., rear display 140. For example, in the case of a vending machine or other display that is used regularly by many different users, the surface of the display may be easily broken and/or become dirty or soiled from frequent use. In such an example, front display 150, which can be implemented as a touchscreen display, provides protection for rear display 140, which may be a higher quality display. Front display 150, for example, may be replaced when broken while rear display 140 remains operational and protected.

In one or more embodiments, a front display 150, e.g., one or more displays, can be positioned above a mirror or mirrored surface. When front display 150 is configured to be transparent, the mirror or mirrored surface is visible to users. In particular embodiments, front display 150 is implemented as a touchscreen. In that case, front display 150, which is left transparent, can be activated to display content to a user in response to a touch from the user. Thus, the content is superposed over the mirror or mirrored surface.

The terminology used herein is for the purpose of describing particular embodiments only and is not intended to be limiting. Notwithstanding, several definitions that apply throughout this document now will be presented.

A computer readable storage medium refers to a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

A computer-readable storage medium may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The term "processor" refers at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process. As defined herein, the term "user" means a human being.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," "in particular embodiments," "in one or more embodiments," and similar language throughout this disclosure may, but do not necessarily, all refer to the same embodiment.

The term "substantially" means that the recited characteristic, parameter, or value need not be achieved exactly, but that deviations or variations, including, for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions" or "instructions" as stored in memory.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A display device, comprising:
    a first display configured to produce an image; and
    a plurality of transparent displays in front of the first display;
    wherein at least one of the plurality of transparent displays is configured to block, diffuse, or scatter light associated with the image produced by the first display so that different ones of a plurality of users in front of the plurality of transparent displays see different content derived from the image produced by the first display;
    wherein each of the transparent displays is substantially transparent; and
    a spacer configured to provide variable spacing between at least one of the first display and a selected transparent display of the plurality of transparent displays consecutive with the first display, or two consecutive transparent displays of the plurality of transparent displays, wherein the spacer is configured to adjust an amount of scattering, produced by the selected transparent display or one of the two consecutive transparent displays, of the image from the first display.

2. The display device of claim 1, wherein each display includes a plurality of electronically controllable pixels.

3. The display device of claim 2, further comprising:
    a sensor configured to generate sensor information, wherein at least one pixel of the plurality of pixels of at least one of the displays is adjusted based, at least in part, upon the sensor information.

4. The display device of claim 3, wherein the sensor information specifies a distance of a user of the plurality of users to the display device and the at least one pixel of the plurality of pixels is adjusted based upon the distance.

5. The display device of claim 3, wherein the sensor information specifies a location of a selected user of the plurality of users relative to the display device and the at least one pixel of the plurality of pixels is adjusted based upon a viewing angle of the selected user determined using the location to adjust a parallax barrier implemented by at least one of the plurality of transparent displays.

6. The display device of claim 3, wherein:
    the sensor information specifies a number of the plurality of users detected within a predetermined distance of the display device and selected pixels of the plurality of pixels are adjusted based, at least in part, upon the number of the plurality of users so that each user of the plurality of users sees different content; or
    the sensor information specifies an attribute of a selected user of the plurality of users and selected pixels of the plurality of pixels of at least one of the displays are adjusted, based at least in part, upon the attribute of the selected user.

7. The display device of claim 1, wherein at least one of the plurality of transparent displays is made using Smectic A liquid crystals.

8. The display device of claim 1,
    wherein at least another one of the plurality of transparent displays is configured to produce a slice of the image to provide depth and a three-dimensional effect to the image.

9. The display device of claim 8, wherein the spacer is configured to modify a spatial resolution of the three-dimensional effect.

10. The display device of claim 1, wherein the spacer is configured to modify a viewing cone for the different ones of the plurality of users seeing the different content.

11. The display device of claim 1, wherein each of the plurality of transparent displays includes a plurality of partially emissive pixels, wherein each partially emissive pixel includes an addressable region and a clear region.

12. The display device of claim 2, wherein the first display is an emissive display and each transparent display of the plurality of transparent displays is a non-emissive display.

13. The display device of claim 12, wherein:
at least one pixel of the plurality of pixels of at least one of the non-emissive displays includes dye; or
at least one of the plurality of pixels of at least one of the non-emissive displays does not include dye and appears substantially white; or
at least one pixel of the plurality of pixels of at least one of the non-emissive displays includes dye in particles, liquid crystal droplets, or liquid crystals of the non-emissive display.

14. The display device of claim 12, wherein:
each non-emissive display is at least 90 percent transparent; and
the emissive display is a liquid-crystal display, a light-emitting diode display, a light enhanced layer, or an organic light-emitting diode display.

15. A method, comprising:
providing a first display configured to produce an image;
providing a plurality of transparent displays in front of the first display;
wherein at least another one of the plurality of transparent displays is configured to block, diffuse, or scatter light associated with the image produced by the first display so that different ones of a plurality of users in front of the plurality of transparent displays see different content derived from the image produced by the first display;
wherein each of the transparent displays is substantially transparent; and
providing a spacer configured to provide variable spacing between at least one of the first display and a selected transparent display of the plurality of transparent displays consecutive with the first display, or two consecutive transparent displays of the plurality of transparent displays, wherein the spacer is configured to adjust an amount of scattering, produced by the selected transparent display or one of the two consecutive transparent displays, of the image from the first display.

16. The method of claim 15, wherein each display includes a plurality of electronically controllable pixels.

17. The method of claim 16, further comprising:
providing a sensor configured to generate sensor information, wherein at least one pixel of the plurality of pixels of at least one of the displays is adjusted based, at least in part, upon the sensor information.

18. The method of claim 17, wherein the sensor information specifies a distance of a user of the plurality of users to a display device including the first display and the plurality of transparent displays, and the at least one pixel of the plurality of pixels is adjusted based upon the distance.

19. The method of claim 17, wherein the sensor information specifies a location of a selected user of the plurality of users relative to a display device including the first display and the plurality of transparent displays, and the at least one pixel of the plurality of pixels is adjusted based upon a viewing angle of the selected user determined using the location to adjust a parallax barrier implemented by at least one of the plurality of transparent displays.

20. The method of claim 17, wherein:
the sensor information specifies a number of the plurality of users detected within a predetermined distance of a display device including the first display and the plurality of transparent displays, and selected pixels of the plurality of pixels are adjusted based, at least in part, upon the number of the plurality of users so that each user of the plurality of users sees the different content; or
the sensor information specifies an attribute of a selected user of the plurality of users and selected pixels of the plurality of pixels of at least one of the displays are adjusted based, at least in part, upon the attribute of the selected user.

21. The method of claim 15, wherein at least one of the plurality of transparent displays is made using Smectic A liquid crystals.

22. The method of claim 15,
wherein at least another one of the plurality of transparent displays is configured to produce a slice of the image to provide depth and a three-dimensional effect to the image.

23. The method of claim 13, wherein the spacer is configured to modify a spatial resolution of the three-dimensional effect.

24. The method of claim 15, wherein the spacer is configured to modify a viewing cone for the different ones of the plurality of users seeing the different content.

25. The method of claim 15, wherein each of the plurality of transparent displays includes a plurality of partially emissive pixels, wherein each partially emissive pixel includes an addressable region and a clear region.

26. The method of claim 16, wherein the first display is an emissive display and each transparent display of the plurality of transparent displays is a non-emissive display.

27. The method of claim 26, wherein:
each non-emissive display is at least 90 percent transparent; and
the emissive display is a liquid-crystal display, a light-emitting diode display, a light enhanced layer, or an organic light-emitting diode display.

28. The method of claim 26, wherein:
at least one pixel of the plurality of pixels of at least one of the non-emissive displays includes dye; or
at least one of the plurality of pixels of at least one of the non-emissive displays does not include dye and appears substantially white; or
at least one pixel of the plurality of pixels of at least one of the non-emissive displays includes dye in particles, liquid crystal droplets, or liquid crystals of the non-emissive display.

29. A method, comprising:
displaying an image using a first display;
blocking, diffusing, or scattering light associated with the image produced by the first display using at least one of a plurality of transparent displays in front of the first display so that different ones of a plurality of users in front of the plurality of transparent displays see different content derived from the image produced by the first display;
wherein each of the plurality of transparent displays is substantially transparent; and
providing, using a spacer, variable spacing between at least one of the first display and a selected transparent display of the plurality of transparent displays consecutive with the first display, or two consecutive transparent displays of the plurality of transparent displays, wherein the spacer is configured to adjust an amount of scattering, produced by the selected transparent display or one of the two consecutive transparent displays, of the image from the first display.

30. The method of claim 29, wherein each display includes a plurality of electronically controllable pixels, the method further comprising:

adjusting an appearance of at least one pixel of the plurality of electronically controllable pixels of at least one of the displays based, at least in part, upon sensor information.

31. The method of claim 30, wherein:

the sensor information specifies distance of a user of the plurality of users to a display device including the first display and the plurality of transparent displays, wherein the at least one pixel of the plurality of electronically controllable pixels of the at least one of the displays is adjusted based, at least in part, upon the distance; or the sensor information specifies a number of the plurality of users detected within a predetermined distance of a display device including the first display and the plurality of transparent displays, wherein selected pixels of the plurality of electronically controllable pixels of the at least one of the displays are adjusted based, at least in part, upon the number of the plurality of users so that each user of the plurality of users sees the different content, or the sensor information specifies an attribute of a selected user of the plurality of users, wherein the selected pixels of the plurality of electronically controllable pixels of at least one of the displays based are adjusted based, at least in part, upon the attribute of the selected user.

32. The method of claim 29, wherein at least one of the plurality of transparent displays is made using Smectic A liquid crystals.

33. The method of claim 29, wherein the spacer is configured to modify a viewing cone for the different ones of the plurality of users seeing the different content.

34. The method of claim 29, wherein at least another one of the plurality of transparent displays is configured to produce a slice of the image to provide depth and a three-dimensional effect to the image.

* * * * *